US011190224B2

(12) United States Patent
Weissman et al.

(10) Patent No.: US 11,190,224 B2
(45) Date of Patent: Nov. 30, 2021

(54) TRANSCEIVER CONFIGURATION FOR MILLIMETER WAVE WIRELESS COMMUNICATIONS

(71) Applicant: QUALCOMM Incorporated, San Diego, CA (US)

(72) Inventors: Haim Mendel Weissman, Haifa (IL); Lior Raviv, Poole (IL); Xiaoyin He, San Diego, CA (US); Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/922,811

(22) Filed: Jul. 7, 2020

(65) Prior Publication Data

US 2020/0336159 A1 Oct. 22, 2020

Related U.S. Application Data

(62) Division of application No. 14/838,672, filed on Aug. 28, 2015, now Pat. No. 10,784,904.
(Continued)

(51) Int. Cl.
*H04B 1/00* (2006.01)
*H04B 15/00* (2006.01)
(Continued)

(52) U.S. Cl.
CPC ............ *H04B 1/0064* (2013.01); *H04B 1/40* (2013.01); *H04B 7/0695* (2013.01); *H04W 72/0453* (2013.01)

(58) Field of Classification Search
None
See application file for complete search history.

(56) References Cited

U.S. PATENT DOCUMENTS

| 6,091,788 A | 7/2000 | Keskitalo et al. |
| 6,233,466 B1 | 5/2001 | Wong et al. |

(Continued)

FOREIGN PATENT DOCUMENTS

| CN | 101272573 A | 9/2008 |
| CN | 101373983 A | 2/2009 |

(Continued)

OTHER PUBLICATIONS

European Search Report—EP19155757—Search Authority—Munich—dated May 28, 2019 (151749EPD1).
(Continued)

*Primary Examiner* — Tuan A Tran
(74) *Attorney, Agent, or Firm* — Holland & Hart LLP

(57) ABSTRACT

Methods, systems, and devices are described for transceiver architecture for millimeter wave wireless communications. A device may include two transceiver chip modules configured to communicate in different frequency ranges. The first transceiver chip module may include a baseband sub-module, a first radio frequency front end (RFFE) component and associated antenna array. The second transceiver chip module may include a second RFFE component and associated antenna array. The second transceiver chip module may be separate from the first transceiver chip module. The second transceiver chip module may be electrically coupled to the baseband sub-module of the first transceiver chip module.

9 Claims, 28 Drawing Sheets

Related U.S. Application Data

(60) Provisional application No. 62/119,764, filed on Feb. 23, 2015, provisional application No. 62/199,766, filed on Feb. 23, 2015, provisional application No. 62/120,815, filed on Feb. 25, 2015.

(51) Int. Cl.
  *H04W 72/04* (2009.01)
  *H04B 1/40* (2015.01)
  *H04B 7/06* (2006.01)

(56) References Cited

U.S. PATENT DOCUMENTS

| | | | |
|---|---|---|---|
| 6,246,364 B1 * | 6/2001 | Rao | H01Q 1/288 |
| | | | 342/368 |
| 6,470,192 B1 * | 10/2002 | Karlsson | H01Q 1/246 |
| | | | 455/25 |
| 6,792,290 B2 * | 9/2004 | Proctor, Jr. | H01Q 1/246 |
| | | | 342/367 |
| 7,013,165 B2 * | 3/2006 | Yoon | H01Q 1/246 |
| | | | 342/370 |
| 7,539,458 B2 * | 5/2009 | Jafarkhani | H04B 7/0617 |
| | | | 342/368 |
| 7,889,701 B2 * | 2/2011 | Malik | H04B 7/0408 |
| | | | 370/334 |
| 7,920,533 B2 * | 4/2011 | Koo | H04B 17/0085 |
| | | | 370/338 |
| 7,929,918 B2 * | 4/2011 | Niu | H01Q 3/26 |
| | | | 455/69 |
| 8,023,909 B2 | 9/2011 | Ripley et al. | |
| 8,045,926 B2 | 10/2011 | Martikkala et al. | |
| 8,054,223 B2 * | 11/2011 | Lakkis | H04B 7/0417 |
| | | | 342/367 |
| 8,139,670 B1 | 3/2012 | Son et al. | |
| 8,213,982 B2 | 7/2012 | Marlett et al. | |
| 8,254,988 B2 * | 8/2012 | Hosoya | H04B 7/0617 |
| | | | 455/553.1 |
| 8,478,204 B2 * | 7/2013 | Qin | H04B 7/0617 |
| | | | 455/69 |
| 8,548,385 B2 * | 10/2013 | Sofer | H04B 7/0805 |
| | | | 455/63.4 |
| 8,625,565 B2 * | 1/2014 | Cordeiro | H04B 7/0619 |
| | | | 370/339 |
| 8,630,588 B2 * | 1/2014 | Liu | H04B 7/0617 |
| | | | 455/63.1 |
| 8,743,838 B2 * | 6/2014 | Gong | H04B 7/0617 |
| | | | 370/334 |
| 8,897,712 B2 * | 11/2014 | Sofer | H04B 7/04 |
| | | | 455/63.4 |
| 8,918,055 B2 * | 12/2014 | Ramachandran | H04B 7/0408 |
| | | | 455/63.4 |
| 8,948,706 B2 | 2/2015 | Napoles et al. | |
| 8,989,809 B2 | 3/2015 | Gu et al. | |
| 9,059,779 B2 | 6/2015 | Li et al. | |
| 9,219,531 B2 * | 12/2015 | Sofer | H04B 7/0805 |
| 9,401,732 B2 | 7/2016 | He et al. | |
| 9,467,195 B2 | 10/2016 | Shapira et al. | |
| 10,491,281 B2 * | 11/2019 | Soffer | H04B 7/088 |
| 2003/0207668 A1 | 11/2003 | McFarland et al. | |
| 2005/0151599 A1 | 7/2005 | Ido et al. | |
| 2007/0047560 A1 | 3/2007 | Tsai et al. | |
| 2008/0205509 A1 | 8/2008 | Le et al. | |
| 2010/0202557 A1 | 8/2010 | Harris | |
| 2012/0200458 A1 | 8/2012 | Jalali et al. | |
| 2012/0309325 A1 | 12/2012 | Carbone et al. | |
| 2012/0309331 A1 | 12/2012 | Yehezkely et al. | |
| 2013/0147664 A1 | 6/2013 | Lin | |
| 2013/0237233 A1 | 9/2013 | Radulescu et al. | |
| 2013/0272220 A1 | 10/2013 | Li et al. | |
| 2014/0004869 A1 | 1/2014 | Jung | |
| 2014/0210666 A1 | 7/2014 | Maltsev et al. | |
| 2016/0248451 A1 | 8/2016 | Weissman et al. | |

FOREIGN PATENT DOCUMENTS

| | | |
|---|---|---|
| CN | 101442838 A | 5/2009 |
| CN | 101741803 A | 6/2010 |
| CN | 101772216 A | 7/2010 |
| CN | 102104405 A | 6/2011 |
| CN | 103532574 A | 1/2014 |
| CN | 103596245 A | 2/2014 |
| CN | 103781202 A | 5/2014 |
| CN | 104022363 A | 9/2014 |
| WO | WO-0124385 A2 | 4/2001 |
| WO | WO-2013134563 A1 | 9/2013 |
| WO | WO-2013154584 A1 | 10/2013 |

OTHER PUBLICATIONS

International Search Report and Written Opinion—PCT/US2016/015980—ISA/EPO—dated Jul. 26, 2016 (151749WO).

ISA/EPO, Partial International Search Report of the International Searching Authority, Int'l. App. No. PCT/US2016/015980, dated May 3, 2016, European Patent Office, Rijswijk, NL, 7 pgs.

Ranta T., et al., "RF Front End Adapts for Increased Mobile Data Demand," Electronics Engineering Times, Oct. 25, 2010, 8 pages.

* cited by examiner

TRANSCEIVER CONFIGURATION FOR MILLIMETER WAVE WIRELESS COMMUNICATIONS

CROSS REFERENCES

The present Application for Patent is a Divisional of U.S. patent application Ser. No. 14/838,672 by Weissman et al., entitled "Transceiver Configuration For Millimeter Wave Wireless Communications" filed Aug. 28, 2015, which claims priority to U.S. Provisional Patent Application No. 62/119,764 by Weissman et al., entitled "Transceiver Configuration for Millimeter Wave Wireless Communications," filed Feb. 23, 2015, U.S. Provisional Patent Application No. 62/119,766 by Weissman et al., entitled "Transceiver Architecture for Millimeter Wave Wireless Communications," filed Feb. 23, 2015, and U.S. Provisional Patent Application No. 62/120,815 by Weissman et al., entitled "Multiple Array MMW Transceiver Operation," filed Feb. 25, 2015 assigned to the assignee hereof, and expressly incorporated by reference herein.

BACKGROUND

Field of the Disclosure

The present disclosure relates to wireless communication systems, and more particularly to a transceiver configuration for millimeter wave wireless communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). The UEs may support communications using different frequency ranges for the same or different wireless communications systems.

The UEs may support communications on different frequencies using two transceivers. Some transceivers may use a zero-intermediate frequency (ZIF) transceiver architecture or a sliding-intermediate frequency (SIF) transceiver architecture. In a ZIF transceiver architecture, the transceiver converts the radio frequency (RF) signals directly to and from baseband signals, e.g., analog baseband data signals, to eliminate circuitry associated with employing an intermediate frequency (IF). In contrast, a SIF transceiver architecture converts RF signals to an IF signal, and in some cases two IF signals, before converting the IF signal to the baseband signal, and vice versa. For communicating in the millimeter wave (mmW) frequency ranges, e.g., 28 GHz, 40 GHz, 60 GHz, etc., current configurations include separate circuitry for each transceiver configuration. For instance, a ZIF mmW transceiver architecture may include a baseband circuitry (e.g., oscillator(s), modem(s), etc.) soldered onto the module/circuit board having the RF front end (RFFE) and associated antenna array for the ZIF mmW transceiver. A SIF mmW transceiver, however, may have one module/circuit board for the baseband circuitry and another one for the RFFE and associated antenna array. Current configurations, therefore, utilize separate circuitry, modules, and circuit boards for each transceiver configuration which results in added hardware components, excessive hardware footprints, and associated power requirements.

The UEs may support communications on different frequencies using two transceivers. Some transceivers may use a sliding-intermediate frequency (SIF) transceiver architecture or a super heterodyne transceiver architecture. In SIF transceiver architecture, a local oscillator (LO) is used to convert the baseband signal to an intermediate frequency (IF) first, and then to the radio frequency (RF) frequency for wireless transmission. In a super heterodyne transceiver architecture, two LOs may be used, one for the IF conversion and another for the RF conversion. For communicating in the millimeter wave (mmW) frequency ranges, e.g., 28 GHz, 40 GHz, 60 GHz, etc., current configurations include separate circuitry for each transceiver configuration. For instance, and for dual transceiver functionality, two modules/printed circuit boards (PCBs) may be used to implement each mmW transceiver. For example, each transceiver may include a baseband board (e.g., oscillator(s), modem(s), etc.) soldered onto one module/PCB and a RF front end (RFFE) and associated antenna array soldered onto a different module/PCB. For the dual transceiver functionality, that results in four modules/PCBs being used. Current configurations, therefore, utilize separate circuitry, modules, and circuit boards for each transceiver configuration which results in added hardware components, an excessive hardware footprint, and associated power requirements.

In some cases, a wireless communications system may utilize beamforming to increase the throughput between a base station and a UE. The throughput may depend on the antenna arrangement and the distance between the transmitter and receiver. A system design that does not take into account the increased throughput available at short distances may have a reduced throughput limit. Furthermore, a system with single antenna array with a limited number of elements at a base station may involve an increased number of antenna elements at a UE to achieve a desired throughput.

SUMMARY

The described features generally relate to one or more improved systems, methods, and/or devices for transceiver architecture in a millimeter wave wireless communication system. Generally, the described transceiver architecture may provide two transceivers positioned on separate chip modules and connected using a single coaxial cable. The two transceivers may share a baseband sub-module to reduce the hardware footprint. In some examples, a first transceiver chip module may include the baseband sub-module and the first RFFE circuitry and associated antenna array. A second transceiver chip module may include a second RFFE circuitry and associated antenna array. The second transceiver chip module may be located separate from the first transceiver chip module, but connected to the baseband sub-module via a coaxial cable. The first transceiver chip module may have a ZIF transceiver architecture and the second chip module may have a SIF transceiver architecture.

Accordingly, the coaxial cable may carry an IF signal, in addition to other signaling and/or control information, between the baseband sub-module of the first transceiver chip module and the RFFE circuitry of the second transceiver chip module. Accordingly, the dual-transceiver module configuration of the present description may provide for two transceivers, each of which may communicate on different frequency ranges, but which are positioned on different parts of a wireless device.

In an illustrative set of examples, an apparatus for wireless communication is provided. The apparatus may include: a first transceiver chip module comprising a baseband sub-module associated with a baseband signal, a first radio frequency front end (RFFE) component and associated first antenna array, the first RFFE component and associated first antenna array configured to communicate in a first frequency range; and a second transceiver chip module comprising a second RFFE component and associated second antenna array, the second transceiver chip module separate from and electrically coupled with the baseband sub-module of the first transceiver chip module, the second RFFE component and associated second antenna array configured to communicate in a second frequency range different from the first frequency range.

In some examples, the apparatus may include a single coaxial cable electrically coupling the second transceiver chip module with the baseband sub-module. The second transceiver chip module may be configured to receive at least one of the baseband signal, or a local oscillator signal, a control signal, or combinations thereof, from the baseband sub-module of the first transceiver chip module. The second transceiver chip module may include: a frequency converter configured to up-convert the baseband signal received from the baseband sub-module and output a signal within the second frequency range for wireless transmission, the frequency converter being further configured to down-convert a signal received from the second RFFE component for wireless reception and output a signal having a frequency of the baseband signal.

In some examples, the baseband sub-module may include a first modem configured to communicate in the first frequency range, and a second modem configured to communicate in the second frequency range. The apparatus may include a switching component configured to switch an information signal between the first modem for communications in the first frequency range and the second modem for communications in the second frequency range. The baseband sub-module may include a dual-band modem configured to communicate in the first frequency range and in the second frequency range.

In some examples, signals of the first frequency range are time-division multiplexed with signals of the second frequency range. The first RFFE component may be a zero-intermediate frequency (IF) RFFE and the second RFFE component may be a sliding IF RFFE. The baseband signal may be within the first frequency range, the baseband signal being used as an intermediate frequency (IF) for the second transceiver chip module and converted to the second frequency range. The first frequency range may be lower than the second frequency range.

In some examples, the first frequency range may be associated with a wireless telecommunication system and the second frequency range may be associated with a Wi-Fi communication system. The first frequency range may be associated with a communications protocol operating at or about the 28 GHz frequency range and the second frequency range may be associated with a communications protocol operating at or about the 60 GHz frequency range. The first frequency range may be associated with a communications protocol operating at or about the 40 GHz frequency range and the second frequency range may be associated with a communications protocol operating at or about the 60 GHz frequency range. The first frequency range and the second frequency range may be millimeter wave frequency ranges.

In another illustrative set of examples, an apparatus for wireless communications is provided. The apparatus may include: means for communicating via a first transceiver chip module that comprises a baseband sub-module associated with a baseband signal, a first radio frequency front end (RFFE) component and associated first antenna array, the first RFFE component and associated first antenna array configured to communicate in a first frequency range; and means for communicating via a second transceiver chip module that comprises a second RFFE component and associated second antenna array, the second transceiver chip module separate from and electrically coupled with the baseband sub-module of the first transceiver chip module, the second RFFE component and associated second antenna array configured to communicate in a second frequency range different from the first frequency range.

In some examples, the apparatus may include means for electrically coupling, using a single coaxial cable, the second transceiver chip module with the baseband sub-module. The second transceiver chip module may be configured to receive at least one of the baseband signal, a local oscillator signal, a control signal, or combinations thereof, from the baseband sub-module of the first transceiver chip module. The second transceiver chip module may include means for providing a frequency converter configured to up-convert the baseband signal received from the baseband sub-module and output a signal within the second frequency range for wireless transmission, wherein the frequency converter being further configured to down-convert a signal received from the second RFFE component for wireless reception and output a signal having a frequency of the baseband signal.

In some examples, the baseband sub-module may include means for providing a first modem configured to communicate in the first frequency range, and means for providing a second modem configured to communicate in the second frequency range. The apparatus may include means for providing a switching component configured to switch an information signal between the first modem for communications in the first frequency range and the second modem for communications in the second frequency range. The baseband sub-module may include means for providing a dual-band modem configured to communicate in the first frequency range and in the second frequency range. Signals of the first frequency range may be time-division multiplexed with signals of the second frequency range.

In some examples, the first RFFE component is a zero-intermediate frequency (IF) RFFE and the second RFFE component is a sliding IF RFFE. The baseband signal may be within the first frequency range, the baseband signal being used as an intermediate frequency (IF) for the second transceiver chip module and converted to the second frequency range. The first frequency range may be lower than the second frequency range. The first frequency range may be associated with a wireless telecommunication system and the second frequency range may be associated with a Wi-Fi communication system.

In some examples, the first frequency range may be associated with a communications protocol operating at or about the 28 GHz frequency range and the second frequency range may be associated with a communications protocol operating at or about the 60 GHz frequency range. The first frequency range may be associated with a communications protocol operating at or about the 40 GHz frequency range and the second frequency range may be associated with a communications protocol operating at or about the 60 GHz frequency range. The first frequency range and the second frequency range may be millimeter wave frequency ranges.

In another illustrative set of examples, a method for wireless communication is provided. The method may include: communicating in a first frequency range via a first transceiver chip module, the first transceiver chip module comprising a baseband sub-module associated with a baseband signal and a first radio frequency front end (RFFE) component and associated first antenna array, the first RFFE component and associated first antenna array configured to communicate in the first frequency range; and communicating in a second frequency range via a second transceiver chip module, the second transceiver chip module comprising a second RFFE component and associated second antenna array, the second transceiver chip module separate from and electrically coupled with the baseband sub-module of the first transceiver chip module, the second RFFE component and associated second antenna array configured to communicate in the second frequency range different from the first frequency range.

In some examples, the method may include coupling, the baseband sub-module of the first transceiver chip module with the second transceiver chip module using a single coaxial cable.

A method of wireless communication is described. The method may include performing a beam sweep operation on beams created by two or more arrays of a plurality of antenna arrays, and selecting an array from the plurality of antenna arrays for communication with a target wireless device based at least in part on the beam sweep operation.

An apparatus for wireless communication is described. The apparatus may include means for performing a beam sweep operation on beams created by two or more arrays of a plurality of antenna arrays, and means for selecting an array from the plurality of antenna arrays for communication with a target wireless device based at least in part on the beam sweep operation.

A further apparatus for wireless communication is described. The apparatus may include a processor, memory in electronic communication with the processor, and instructions stored in the memory and operable, when executed by the processor, to cause the apparatus to perform a beam sweep operation on beams created by two or more arrays of a plurality of antenna arrays, and select an array from the plurality of antenna arrays for communication with a target wireless device based at least in part on the beam sweep operation.

A non-transitory computer-readable medium storing code for wireless communication is described. The code may include instructions executable to perform a beam sweep operation on beams created by two or more arrays of a plurality of antenna arrays, and select an array from the plurality of antenna arrays for communication with a target wireless device based at least in part on the beam sweep operation.

Some examples of the method, apparatuses, or non-transitory computer-readable medium described herein may further include processes, features, means, or instructions for determining that a target throughput is greater than a threshold, determining that a transceiver for the target wireless device is available, the transceiver operating in a first mmW frequency range, and transmitting a handoff signal to the target wireless device based at least in part on the determination that the target throughput is greater than the threshold, the determination that the transceiver is available, and the beam sweep operation, wherein the handoff signal directs the target wireless device to use the transceiver for communication. Additionally or alternatively, some examples may include processes, features, means, or instructions for transmitting an activation signal to the target wireless device directing the target wireless device to activate the transceiver, and communicating with the target wireless device using the selected array and the transceiver.

In some examples of the method, apparatuses, or non-transitory computer-readable medium described herein, the activation signal is transmitted using a second mmW frequency range, the second mmW frequency range being different from first mmW frequency range. Additionally or alternatively, in some examples the threshold is 1 Gbps.

In some examples of the method, apparatuses, or non-transitory computer-readable medium described herein, the first mmW frequency range is a 60 GHz range. Additionally or alternatively, some examples may include processes, features, means, or instructions for selecting an initial array from the plurality of antenna arrays for the beam sweep operation, wherein performing the beam sweep operation comprises sweeping through each of a first plurality of beams associated with the initial array.

Some examples of the method, apparatuses, or non-transitory computer-readable medium described herein may further include processes, features, means, or instructions for selecting a subsequent array from the plurality of antenna arrays for the beam sweep operation, wherein performing the beam sweep operation comprises sweeping through each of a second plurality of beams associated with the subsequent array. Additionally or alternatively, some examples may include processes, features, means, or instructions for determining that a channel parameter associated with the array satisfies a threshold condition based at least in part on the beam sweep operation, wherein selecting the array is based at least in part on the determination.

In some examples of the method, apparatuses, or non-transitory computer-readable medium described herein, a first array of the plurality of antenna arrays is located at an opposite side of the mmW base station relative to a second array of the plurality of arrays based at least in part on a spatial diversity configuration. Additionally or alternatively, in some examples at least one array of the plurality of antenna arrays is configured for operation in a mmW frequency range.

In some examples of the method, apparatuses, or non-transitory computer-readable medium described herein, the at least one array is configured for operation in a first mmW frequency range that operates at or about 28 GHz or in a second mmW frequency range that operates at or about 40 GHz. Additionally or alternatively, in some examples the at least one array is paired with at least one adjacent array configured for operation in a third mmW frequency range that operates at or about 60 GHz.

In some examples of the method, apparatuses, or non-transitory computer-readable medium described herein, each of the plurality of antenna arrays is configured with an increased number of antenna elements.

In another illustrative set of examples, an apparatus for wireless communication is provided. The apparatus may include: a baseband chip module comprising first baseband circuitry for baseband processing of wireless communications in a first frequency range and second baseband circuitry for baseband processing of wireless communications in a second frequency range; and a dual-transceiver chip module separate from and in electrical communication with the baseband chip module, the dual-transceiver chip module comprising a dual-band radio frequency front end (RFFE) component, a first antenna array adapted for wireless communications in the first frequency range, and a second antenna array adapted for wireless communications in the second frequency range, the dual-band RFFE component coupled with the first antenna array and the second antenna array, wherein at least one of the first frequency range and the second frequency range may be millimeter wave frequency ranges.

In some examples, the apparatus may include a single coaxial wire electrically coupling the dual-transceiver chip module with the baseband chip module. The first antenna array may be positioned on an opposing side of the dual-transceiver chip module with respect to the second antenna array. The first antenna array may be positioned on a different layer of the dual-transceiver chip module with respect to the second antenna array. The first baseband circuitry may include a first modem configured to communicate in the first frequency range and a second modem configured to communicate in the second frequency range.

In some examples, the baseband chip module may include a common interface circuitry configured to communicate information associated with the first modem and the second modem. The baseband chip module may include a first communication interface circuitry configured to communicate information associated with the first modem, and a second communication interface circuitry configured to communicate information associated with the second modem. The baseband chip module may include a first multiplexer and the dual-transceiver chip module may include a second multiplexer, the first multiplexer and the second multiplexer configured to multiplex and de-multiplex electrical signals exchanged between the baseband chip module and the dual-transceiver chip module.

In some examples, the dual-transceiver chip module being in electrical communication with the baseband chip may include communicating at least one of an intermediate frequency (IF) signal, or an oscillator signal, or a control signal, or combinations thereof. The dual-transceiver chip module may be in electrical communication with the baseband chip module via a cable, the cable configured to support communications of high bandwidth signals, wherein the high bandwidth signals comprise a first intermediate frequency (IF) signal associated with the first frequency range and a second IF signal associated with the second frequency range, the first IF signal being different than the second IF signal.

In some examples, the first frequency range may be lower than the second frequency range. The first frequency range may be associated with a wireless telecommunication system and the second frequency range may be associated with a Wi-Fi communication system. The first frequency range and the second frequency range may be millimeter wave frequency ranges.

In another illustrative set of examples, an apparatus for wireless communication is provided. The apparatus may include: means for communicating, using a baseband chip module and a dual-transceiver chip module, in a first frequency range via a first baseband circuitry of the baseband chip module, the dual-transceiver chip module comprising a dual-band radio frequency front end (RFFE) coupled to a first antenna array adapted to communicate wireless signals in the first frequency range; and means for communicating, using the baseband chip module and the dual-transceiver chip module, in a second frequency range via a second baseband circuitry of the baseband chip module, the dual-transceiver chip module comprising the dual-band RFFE coupled to a second antenna array adapted to communicate wireless signals in the second frequency range, wherein at least one of the first frequency range and the second frequency range may be millimeter wave frequency ranges.

In some examples, the apparatus may include means for electrically coupling the dual-transceiver chip module with the baseband chip module using a single coaxial cable. The first antenna array may be positioned on an opposing side of the dual-transceiver chip module with respect to the second antenna array. The first antenna array may be positioned on a different layer of the dual-transceiver chip module with respect to the second antenna array. The first baseband circuitry may include a first modem configured to communicate in the first frequency range and a second modem configured to communicate in the second frequency range.

In some examples, the baseband chip module may include means for providing a common interface circuitry configured to communicate information associated with the first modem and the second modem. The baseband chip module may include means for providing a first communication interface circuitry configured to communicate information associated with the first modem, and means for providing a second communication interface circuitry configured to communicate information associated with the second modem. The baseband chip module may include a first multiplexer and the dual-transceiver chip module may include a second multiplexer, the first multiplexer and the second multiplexer configured to multiplex and de-multiplex electrical signals exchanged between the baseband chip module and the dual-transceiver chip module.

In some examples, the dual-transceiver chip module being in electrical communication with the baseband chip may include communicating at least one of an intermediate frequency (IF) signal, or an oscillator signal, or a control signal, or combinations thereof. The dual-transceiver chip module may be in electrical communication with the baseband chip module via a cable, the cable configured to support communications of high bandwidth signals, wherein the high bandwidth signals may include a first intermediate frequency (IF) signal associated with the first frequency range and a second IF signal associated with the second frequency range, the first IF signal being different than the second IF signal.

In some examples, the first frequency range may be lower than the second frequency range. The first frequency range may be associated with a wireless telecommunication system and the second frequency range may be associated with a Wi-Fi communication system. The first frequency range and the second frequency range may be millimeter wave frequency ranges.

In another illustrative set of examples, a method for wireless communication is provided. The method may include: communicating, using a baseband chip module and a dual-transceiver chip module, in a first frequency range via a first baseband circuitry of the baseband chip module, the dual-transceiver chip module comprising a dual-band radio frequency front end (RFFE) component coupled to a first antenna array adapted to communicate wireless signals in the first frequency range; and communicating, using the baseband chip module and the dual-transceiver chip module, in a second frequency range via a second baseband circuitry of the baseband chip module, the dual-transceiver chip module comprising the dual-band RFFE component coupled to a second antenna array adapted to communicate wireless signals in the second frequency range, wherein at least one of the first frequency range and the second frequency range may be millimeter wave frequency ranges.

In some examples, the dual-transceiver chip module being in electrical communication with the baseband chip may include communicating at least one of an intermediate frequency (IF) signal, or an oscillator signal, or a control signal, or combinations thereof. The dual-transceiver chip module may be in electrical communication with the baseband chip module via a cable, the cable configured to support communications of high bandwidth signals, wherein the high bandwidth signals may include a first intermediate frequency (IF) signal associated with the first frequency range and a second IF signal associated with the second frequency range, the first IF signal being different than the second IF signal.

In some examples, the first frequency range may be lower than the second frequency range. The first frequency range may be associated with a wireless telecommunication system and the second frequency range may be associated with a Wi-Fi communication system. The first frequency range and the second frequency range may be millimeter wave frequency ranges.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
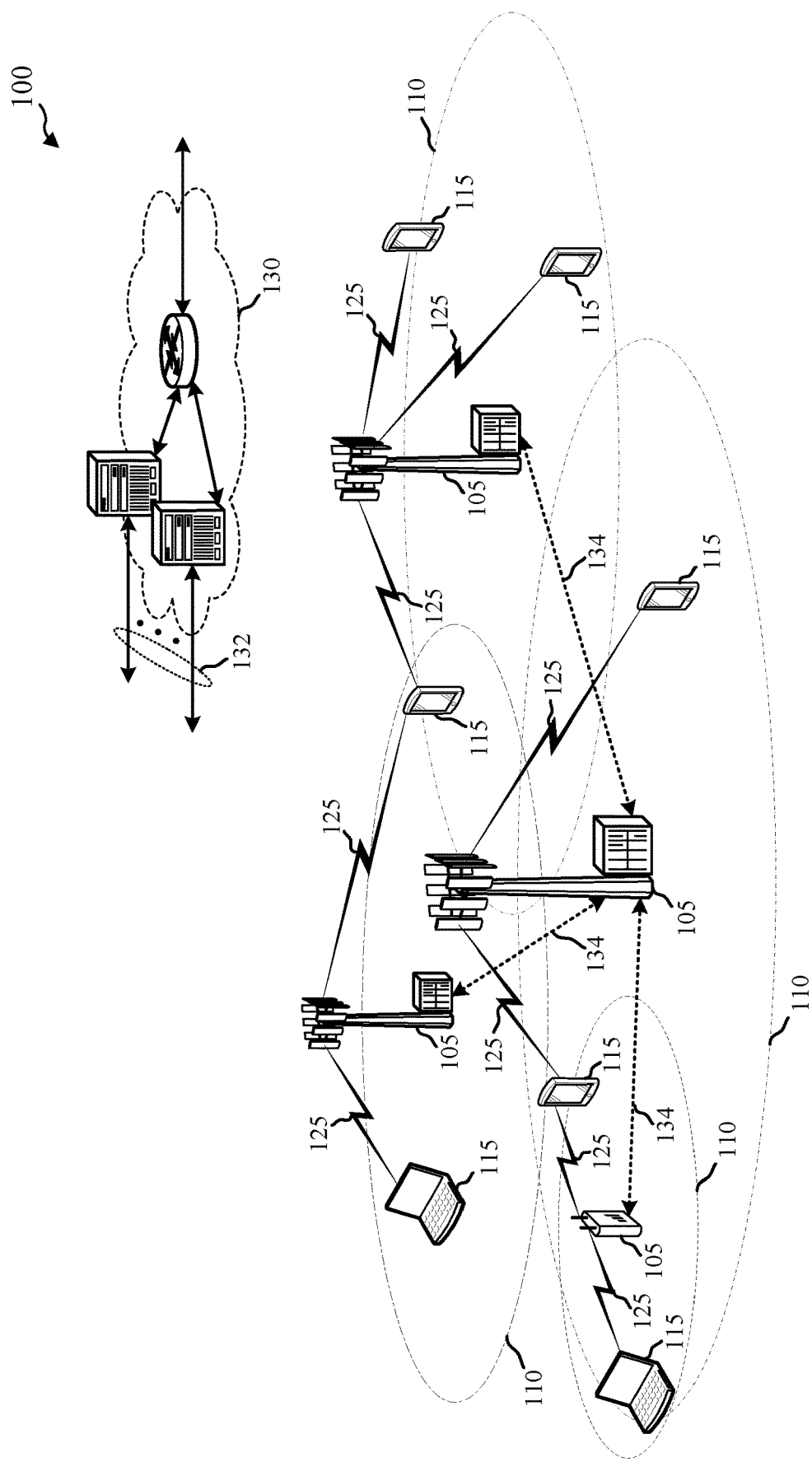
FIG. 1 shows a block diagram of a wireless communication system, in accordance with various aspects of the present disclosure.

Evolving wireless communication systems may communicate using one or more of several mmW frequency ranges, e.g., 28 GHz, 40 GHz, 60 GHz, etc. Different mmW frequency ranges may be used for different communication systems protocols, e.g., Wi-Fi communication systems, telecommunication systems, etc. Communications using such mmW frequencies, however, introduce design difficulties from an operational perspective (e.g., limited propagation distance) as well as from a hardware perspective. For example, processing signals in the mmW frequency range requires careful consideration and selection of components, component/module spacing limitations, etc., in order to reduce signal loss. Other considerations include spacing and positioning of antenna arrays for each frequency range in a device that has limited available space and that avoids interference caused by the user, e.g., how a user may typically hold the device.

Millimeter wave systems may be used for a variety of functions, such as within communication systems, for research, weapon systems, medical purposes, screening systems, etc. In some cases, mmW systems may include mobile base stations, such as operating at 28 GHz or 40 GHz. A multi-array transceiver may be used for enhanced coverage of a mmW transceiver (such as a base station of a wireless communications system). This may enable reduced power consumption and enlarged link capacity by another device (such as user equipment (UE) in close proximity to a base station). In some cases, a transceiver device configured for enhanced mmW operations may be backwards compatible with devices based on different technologies.

Typically, devices adapted to communicate in the mmW frequency range using two transceivers adopt an approach that includes each transceiver having independent baseband circuitry. For example, each transceiver would include its own baseband circuitry, RFFE components, and associated antenna array. This configuration may allow for independent placement of the two transceivers on the device, but also requires additional hardware for each baseband circuitry. This also results in increased power usage at the device and, additionally requires routing audio/data signals to each transceiver.

Typically, devices adapted to communicate in the mmW frequency range using two transceivers adopt an approach that includes each transceiver configuration having independent baseband circuitry modules and transceiver RFFE component modules. For example, each transceiver would include one module for the baseband circuitry and a separate module for the RFFE components, and associated antenna array. This configuration may allow for independent placement of the two transceivers on the device, but also requires additional hardware footprint for each transceiver. This also results in increased power usage at the device and, additionally requires routing audio/data signals to each transceiver.

According to aspects of the present disclosure, a device may utilize two transceiver chip modules. A first transceiver chip module includes a baseband sub-module in addition to the RFFE and associated antenna array. The baseband sub-module may include modem(s) that provide for communicating using the first RFFE and associated antenna array or using a second transceiver chip module, which includes a second RFFE and associated antenna array. The second transceiver chip module may be separate from the first transceiver chip module, but connected to the baseband sub-module using a coaxial cable. The coaxial cable may be a wide bandwidth cable and may carry an IF frequency between the baseband sub-module and the second transceiver chip module. In some aspects, the first transceiver chip and the second transceiver chip modules may communicate on a first frequency range and a second frequency range, respectively, where the first frequency range is different than the second frequency range. In some aspects, the first RFFE may be a ZIF transceiver architecture where the second RFFE may be a SIF transceiver architecture. In some examples, aspects of the IF associated with the SIF transceiver architecture of the second transceiver chip module may be used as the RF band for the ZIF transceiver architecture of the first transceiver chip module.

According to aspects of the present disclosure, a device may utilize two modules to implement two transceivers that are configured to communicate on different frequency ranges. A first of the modules includes a baseband chip module. The baseband chip module includes baseband circuitry for processing of wireless communications in the first frequency range and the second frequency range. The first and second frequency ranges may be the same or may be different. The second module includes a dual-transceiver chip module. The dual-transceiver chip module may include a dual-band RFFE component. The dual-band RFFE component may include RF circuitry for processing wireless communications in the first frequency range and the second frequency range. Accordingly, the dual-transceiver chip module may include two antenna arrays, one antenna array for each of the first and second frequency ranges. The dual-band RFFE component is coupled to each of the two antenna arrays. In some aspects, the dual-band RFFE component may be configured such that, for each frequency range, the transceiver may utilize a SIF transceiver architecture or a super-heterodyne transceiver architecture.

Millimeter wave base stations may use antenna arrays to transmit and receive beam-formed signals. In some cases, UE transceivers may use antenna arrays and beam-forming as well. When an array transceiver is transmitting, N power amplifiers may be used to ignite an N-array antenna. A base station may have an N antennae array while a UE may have an M antennae array, often with M being less than N. A capacity of 1 Gbps at medium and small distances from the base station may be possible, though the maximum planned capacity does not account for the small distance scenario where the link budget rises above the required link budget for increased throughput.

A mmW transceiver, such as for a base station, may include a multi-array antenna, which may increase spatial diversity and enhance coverage. Each array may have an increased number of antenna elements for better effective isotropic radiated power (EIRP) and, possibly, an increased link budget. A dual standard transceiver may be used, such as with one transceiver for one set of mmW standards, such as 28 GHz or 40 GHz bands, while another transceiver may be used for other standards, such as for 60 GHz bands. A UE transceiver may also include a multi-array antenna, which may increase spatial diversity and enhance coverage. In some cases, each array may have a reduced number of antennae for transmit and receive power saving. The UE may also include another transceiver for 60 GHz transmissions, such as for high capacity or close proximity communications.

A UE transceiver configured in this manner may be capable of power saving. For example, using a higher number of antenna elements at a base station may allow for a reduction in the number of antenna elements at the UE. The link budget may be reduced by reducing the number of antennae at the UE, while the link budget may be increased by increasing the number of antennae at the base station. As a result, the UE may consume less power. By using a high number of arrays at a base station, a UE may have higher coverage for reception and may consume less power. Some systems may include a transceiver that operates at or about 60 GHz for communications at a close proximity to a base station. The link will perform handoff to this system at close proximity and may allow for capacity to be increased, such as beyond 1 Gbps.

With a single antenna array, the antenna covers as wide an area as possible, which may result in a half sphere beam on the broad side of the antenna array. In order to cover the widest angle with a good signal to noise ratio (SNR), beam sweeping may be used by creating beams in different directions and sweeping through them. This may consume time (calculated as the product of the beam transmit time and the number of beams). In one example, multiple antenna arrays may be used, which reduces the coverage area for each individual antenna array. In this case, beam sweep time may be decreased as each array covers a narrower angle. In some cases this may also impact time used for beam steering.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., 51, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Wireless communication system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter wave band (or mmW), since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

One or more of the UEs 115 may be configured to communicate in more than one EHF frequency ranges, e.g., on different mmW frequency bands. In certain aspects, the UE 115 may be configured according to the presently described transceiver architecture and may include first and second transceiver chip modules. Each transceiver chip module may be adapted to communicate (e.g., transmit and/or receive) on a different mmW frequency range. A first of the transceiver chip modules may include a baseband sub-module that may be associated with one or more baseband signals. The first transceiver chip module may also include a first RFFE component and associated first antenna array. The first RFFE component and associated antenna array may be configured to communicate in the first frequency range. The second transceiver chip module may include a second RFFE and associated second antenna array. The second RFFE component and associated antenna may be configured to communicate in the second frequency range.

The second transceiver chip module may be separate from the first transceiver chip module, but electrically coupled to the baseband sub-module of the first transceiver chip module. For example, a signal coaxial cable may be used to electrically couple the second transceiver chip module to the baseband sub-module of the first transceiver chip module. The coaxial cable may be a high bandwidth cable and carry IF signal(s), local-oscillator (LO) signal(s), as well as control signaling. The second transceiver chip module being separate from, but electrically coupled to, the first transceiver chip module may permit utilizing the baseband submodule functions for the second RFFE and associated antenna array. Also, the second transceiver chip module being separate may provide certain flexibility as to where the second antenna array can be positioned on the UE 115, e.g., to avoid or reduce interference.

One or more of the UEs 115 may be configured to communicate in more than one EHF frequency ranges, e.g., on different mmW frequency bands. In certain aspects, the UE 115 may be configured according to the described transceiver architecture and may include a first module having baseband circuitry and a second module having a dual-transceiver RFFE component and associated antenna arrays. For example, the baseband chip module may include first and second baseband circuitry, the first baseband circuitry for communicating in the first frequency range and the second baseband circuitry for communicating in the second frequency range. The dual-transceiver chip module may include the RFFE component coupled with first and second antenna arrays (associated with communicating in the first and second frequency ranges, respectively). The baseband chip module and the dual-transceiver chip module may be connected using a single coaxial cable, which may provide for flexible placement of the dual-transceiver chip module (and by extension the first and second antenna arrays) on the UE 115. The coaxial cable may carry an IF signal and, in some cases, the LO signal and control information associated with communicating in the first and second frequency ranges.

In some aspects, multiplexers may be utilized at the baseband chip module and the dual-transceiver chip module to multiplex one or more IF signal(s), LO signal(s), control information, and the like. Accordingly, the coaxial cable may be adapted to carry high bandwidth signals. Further, each transceiver function of the dual-RFFE component may utilize a SIF transceiver architecture and/or a super-heterodyne transceiver architecture.

Multipath propagation may also impact the use of directional beamforming. It may be caused by different copies of a wireless signal reaching a receiver via different paths with varying path lengths. The different path lengths may be based on, for example, atmospheric reflection and refraction, or reflection from buildings, water, and other surfaces. Multipath propagation may result in a time delay (or a phase shift) for one copy of a signal, which cause constructive or destructive interference (between consecutive symbols, inter-symbol interference (ISI), or within a single symbol). A guard interval (GI) (which may include a cyclic prefix) may be prepended to transmissions to mitigate the effects of channel spreading caused by multipath propagation.

In some cases, a BS 105 may use a plurality of antenna arrays when communicating with a UE 115. By using the plurality of antenna arrays, the BS 105 may increase coverage, increase link budget, or increase the number of systems with which the system may operate. Further, the UE 115 may use a plurality of antenna arrays when communicating with the BS 105. By using the plurality of antenna arrays, the UE 115 may enhance coverage, save transmit/receive power (e.g., due to a decreased number of antennae in each array), or increase the number of systems with which the system may operate.

A device, such as a BS 105 or a UE 115, may use a number of antenna arrays. Each antenna array may be swept, such as through beam formed sweeping, over a smaller spatial coverage area, as an increase in the number of antenna arrays may allow each antenna array to cover less area. Additionally, a preferred antenna may be stored, such as a recently used antenna if the two devices have previously communicated. The beam formed sweeping may initially use the preferred antenna, if one is present, which may reduce the time necessary to find a suitable antenna array.

In some cases, a device, such as a BS 105 or a UE 115, may operate using an enhanced mmW antenna arrangement, such as a 60 GHz system. The device may be enabled to operate using a number of systems, such as 28 GHz systems, 40 GHz systems, and/or 60 GHz systems. A determination may be made, such as by a BS 105, a UE 115, or another network component, whether the communication link between the devices requires an enhanced mmW antenna arrangement. If the communication link requires an enhanced mmW antenna arrangement, then the enhanced mmW antenna arrangement may be initiated and used for communication. Further, if the communication link does not require an enhanced mmW antenna arrangement, the device may use systems other than the enhanced mmW antenna arrangement for communication.

Figure 2A:
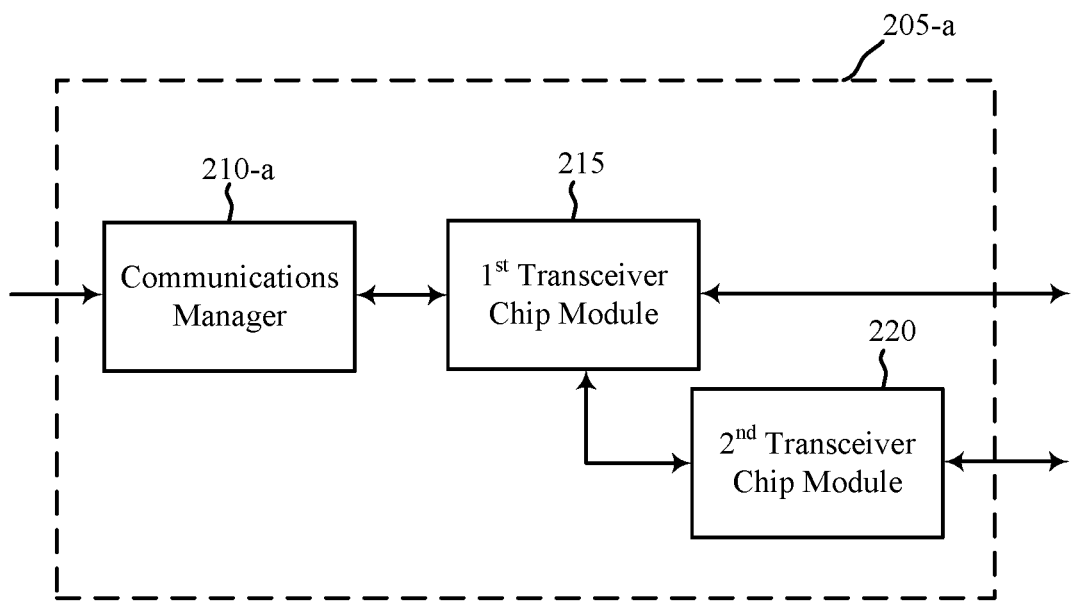
FIG. 2A shows a block diagram of a device configured for use in wireless communication, in accordance with various aspects of the present disclosure.

FIG. 2A shows a block diagram 200-*a* of a device 205-*a* for use in wireless communication, in accordance with various aspects of the present disclosure. The device 205-*a* may be an example of one or more aspects of a UE 115 described with reference to FIG. 1. The device 205-*a* may include a communications manager 210-*a*, a first transceiver chip module 215, and/or a second transceiver chip module 220. The device 205-*a* may also be or include a processor (not shown). Each of these modules may be in communication with each other.

The components of the device 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The communications manager 210-*a* may monitor, control, or otherwise manage various aspects for communications of the device 205-*a*. For example, the communications manager 210-*a* may receive one or more signals from other components, systems, protocols, etc., of the device 205-*a* for transmission via the first transceiver chip module 215 and/or the second transceiver chip module 220. The communications manager 210-*a* may, for reception functions, receive signals containing information from the first transceiver chip module 215 or the second transceiver chip module 220 and communicate such information to the other components, systems, etc., of the device 205-*a*. In addition to content to be communicated, the communications manager may also receive, determine, or process various control signals associated with communications using the first transceiver chip module 215 or the second transceiver chip module 220. For example, control signals may include transmit power control signals, modulation-coding scheme signals, etc.

In some aspects, the communications manager 210-*a* may have more than one interface connections to the first transceiver chip module 215, e.g., an interface to each of two modems of the first transceiver chip module 215. Accordingly, the communications manager 210-*a* may determine which interface connection to route information signals for transmission via the first transceiver chip module 215 or the second transceiver chip module 220. Accordingly, the communications manager 210-*a* may route information signals for transmission via the first frequency range or the second frequency range. In some examples, the communications manager 210-*a* may route information signals to both interface connections for transmission on both of the first and second frequency ranges.

The first transceiver chip module 215 may monitor, control, or otherwise manage aspects of communicating in a first frequency range. The first transceiver chip module 215 may include one or more sub-modules (e.g., baseband circuitry, transceiver circuitry, etc.) that receive the information (e.g., a baseband signal) from the communications manager 210-*a*, encode the information, and up-convert the information to at least one frequency within the first frequency range for transmission. The first transceiver chip module 215 may include an antenna array for transmitting the information in the first frequency range. In some examples, the first transceiver chip module 215 is a ZIF transceiver chip configuration where the baseband signal is converted directly to the communication frequency without being converted to an IF signal.

The second transceiver chip module 220 may monitor, control, or otherwise manage aspects of communicating in a second frequency range. The second frequency range may be different from the first frequency range. The second transceiver chip module 220 may be positioned separately from the first transceiver chip module 215, but be electrically coupled to the baseband circuitry of the first transceiver chip module 215 via a coaxial cable. In some aspects, the second transceiver chip module 220 may be a SIF transceiver architecture and the coaxial cable may carry an IF signal between the baseband circuitry of the first transceiver chip module 215 and the second transceiver chip module 220.

The second transceiver chip module 220 may include transceiver circuitry that receives the IF signal from the baseband circuitry of the first transceiver chip module 215 and converts it to at least one frequency within the second frequency range. The second transceiver chip module 220 may include an associated antenna array and transmit the frequency within the second frequency range using the antenna array.

Figure 2B:
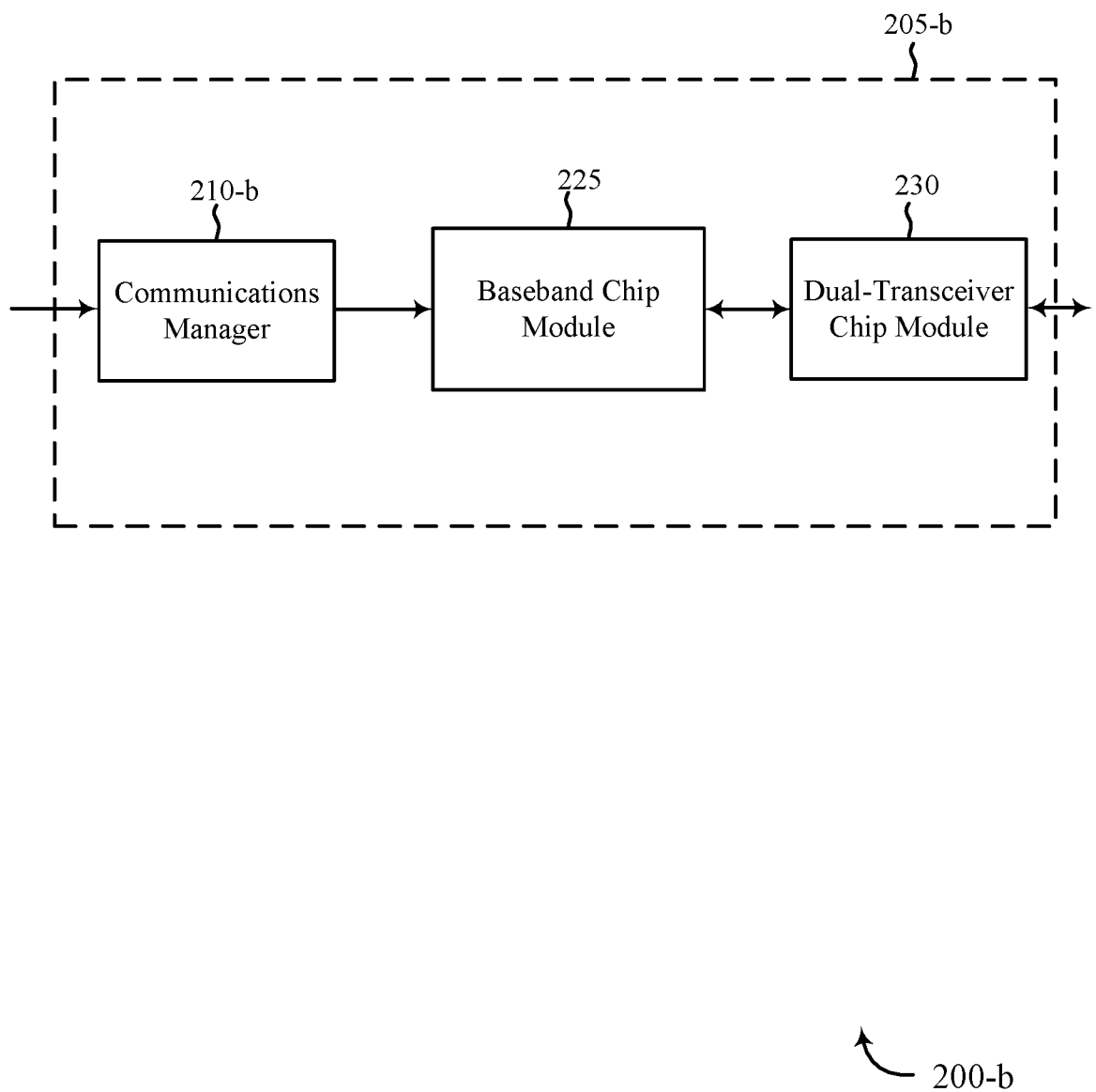
FIG. 2B shows a block diagram of a device configured for use in wireless communication, in accordance with various aspects of the present disclosure.

FIG. 2B shows a block diagram 200-*b* of a device 205-*b* for use in wireless communication, in accordance with various aspects of the present disclosure. The device 205-*b* may be an example of one or more aspects of a UE 115 described with reference to FIG. 1. The device 205-*b* may include a communications manager 210-*b*, a baseband chip module 225, and/or a dual-transceiver chip module 230. The device 205-*b* may also be or include a processor (not shown). Each of these modules may be in communication with each other.

The components of the device 205-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The communications manager 210-*b* may monitor, control, or otherwise manage various aspects for communications of the device 205-*b*. For example, the communications manager 210-*b* may receive one or more signals from other components, systems, protocols, etc., of the device 205-*b* for transmission via the first frequency range and/or the second frequency range. The communications manager 210-*b* may, for reception functions, receive signals containing information from the baseband chip module 225 and communicate such information to the other components, systems, etc., of the device 205-*b*. In addition to content to be communicated, the communications manager 210-*b* may also receive, determine, or process various control signals associated with communications using the baseband chip module 225 or the dual-transceiver chip module 230. For example, control signals may include transmit power control signals, modulation-coding scheme signals, etc.

In some aspects, the communications manager 210-*b* may have more than one interface connection to the baseband chip module 225, e.g., an interface to each of two modems of the baseband chip module 225. Accordingly, the communications manager 210-*b* may determine which interface connection to route information signals for transmission via the first frequency range or the second frequency range. In some examples, the communications manager 210-*b* may route information signals to both interface connections for transmission on both of the first and second frequency ranges.

The baseband chip module 225 may monitor, control, or otherwise manage aspects of processing wireless communications in the first and/or second frequency ranges. The baseband chip module 225 may include one or more sub-modules (e.g., baseband circuitry, interface circuitry, etc.) that receives the information (e.g., a baseband signal) from the communications manager 210-*b*, encodes the information, and up-converts the information to at least one IF. For example, the baseband chip module 225 may include first baseband circuitry for processing of wireless communications in the first frequency range and second baseband circuitry for processing of wireless communications in the second frequency range. Example baseband circuitry may include, but is not limited to, interface circuitry, mixer(s), amplifier(s), filter(s), and the like. Accordingly, the baseband chip module 225 may output one or more IF signals carrying the information signals for wireless transmission.

The dual-transceiver chip module 230 may monitor, control, or otherwise manage aspects of communicating in the first and the second frequency ranges. The second frequency range may be different from the first frequency range and, in some examples, the first frequency range may be lower than the second frequency range. The dual-transceiver chip module 230 may be positioned separately from the baseband chip module 225, but be electrically coupled to baseband chip module 225 via a coaxial cable. In some aspects, the dual-transceiver chip module 230 may be utilize a SIF transceiver architecture and/or a super-heterodyne transceiver architecture and the coaxial cable may carry one or more IF signal(s) between the baseband chip module 225 and the dual-transceiver chip module 230.

Figure 3A:
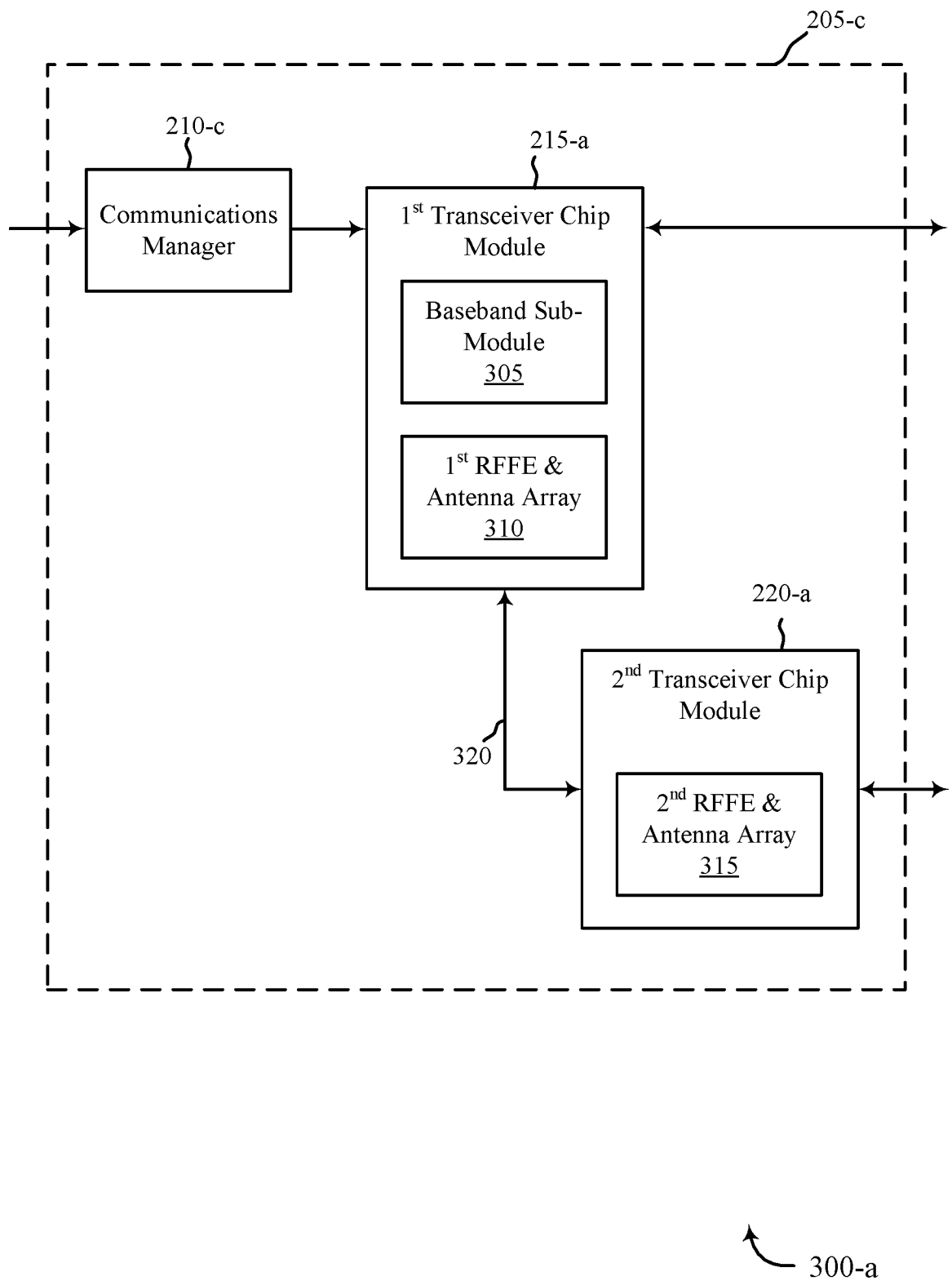
FIG. 3A shows a block diagram of a device configured for use in wireless communication, in accordance with various aspects of the present disclosure.

The dual-transceiver chip module 230 may include transceiver circuitry that receives the IF signal(s) from the baseband chip module 225 and converts it to at least one frequency within the first and/or the second frequency ranges for wireless transmission. The dual-transceiver chip module 230 may include a dual-band RFFE component that provides two transceiver functionality, each transceiver functionality associated with one of the communications in the first frequency range or the second frequency range. The dual-transceiver chip module 230 may also include two antenna arrays, where a first antenna array is for communicating in the first frequency range and the second antenna array is for communicating in the second frequency range. The dual-band RFFE component may be coupled for the first and second antenna arrays. That is, the dual-band RFFE component may be soldered or otherwise integrated onto the same module/PCB as the first and second antenna arrays are printed on FIG. 3A shows a block diagram 300-a of a device 205-c for use in wireless communication, in accordance with various examples. The device 205-c may be an example of one or more aspects of a UE 115 described with reference to FIG. 1. The device 205-c may also be an example of a device 205 described with reference to FIG. 2A or 2B. The device 205-c may include a communications manager 210-c, a first transceiver chip module 215-a, and/or a second transceiver chip module 220-a, which may be examples of the corresponding modules of device 205-a. The device 205-c may also include a processor (not shown). Each of these components may be in communication with each other. The first transceiver chip module 215-a may include a baseband sub-module 305 and/or a first RFFE and antenna array 310. The second transceiver chip module 220-a may include a second RFFE and antenna array 315. The communications manager 210-c may perform the functions of the communications manager 210 described with reference to FIG. 2A or 2B.

The baseband sub-module 305 may monitor, control, or otherwise manage aspects of a baseband signal for the device 205-c. The baseband sub-module 305 may be associated with a baseband signal and, in some examples, more than one baseband signal. The baseband sub-module 305 may receive one or more information (or baseband) signals from the communications manager 210-c for transmission in the first frequency range, the second frequency range, or both frequency ranges. In some examples, the baseband sub-module 305 may also receive control data indicating which frequency range the information is to be transmitted in, at which transmit power level, and the like. The baseband sub-module 305 may include oscillator/mixer/modem circuitry and upconvert the information at the baseband signal to a frequency within the first frequency range for transmission via the first RFFE and antenna array 310. In some aspects, the baseband sub-module 305 may output a signal to the first RFFE and antenna array 310 at an operating frequency of the first RFFE and antenna array 310 for wireless transmission.

When being transmitted via the second transceiver chip module 220-a, the baseband sub-module 305 may upconvert the information to an IF signal that is electrically coupled to the second transceiver chip module 220-a via signal path 320 for wireless transmission. Signal path 320 may be a coaxial cable and adapted to carry wideband signals, e.g., an IF signal for the second transceiver chip module 220-a. In some examples, the signal path 320 may also carry a LO signal as well as control data for wireless transmissions in the second frequency range.

The first RFFE and antenna array 310 may receive the signal from the baseband sub-module 305 and prepare the signal for wireless transmission via the first antenna array. For example, the first RFFE and antenna array 310 may include amplification circuitry, filtering circuitry, etc., for ensuring the signal is transmitted at the correct frequency, or frequencies for MIMO/CA transmissions, and at the proper transmit power. In some aspects, the first RFFE and antenna array 310 may receive control data from the baseband sub-module 305 including information indicative of the transmit frequency, power, etc. The antenna array may include a plurality of antenna elements adapted to communicate in the first frequency range, e.g., to transmit and/or receive one or more signals within the first frequency range.

The second RFFE and antenna array 315 may receive the signal from the baseband sub-module 305 via the signal path 320 and prepare the signal for wireless transmission via the second antenna array. For example, the second RFFE and antenna array 315 may include amplification circuitry, filtering circuitry, etc., for ensuring the information is transmitted at the correct frequency, or frequencies for MIMO/CA transmissions, and at the proper transmit power. In some aspects, the second RFFE and antenna array 315 may receive control data from the baseband sub-module 305 including information indicative of the transmit frequency, power, etc. The antenna array may include a plurality of antenna elements adapted to communicate in the second frequency range, e.g., to transmit and/or receive one or more signals within the second frequency range.

Figure 3B:
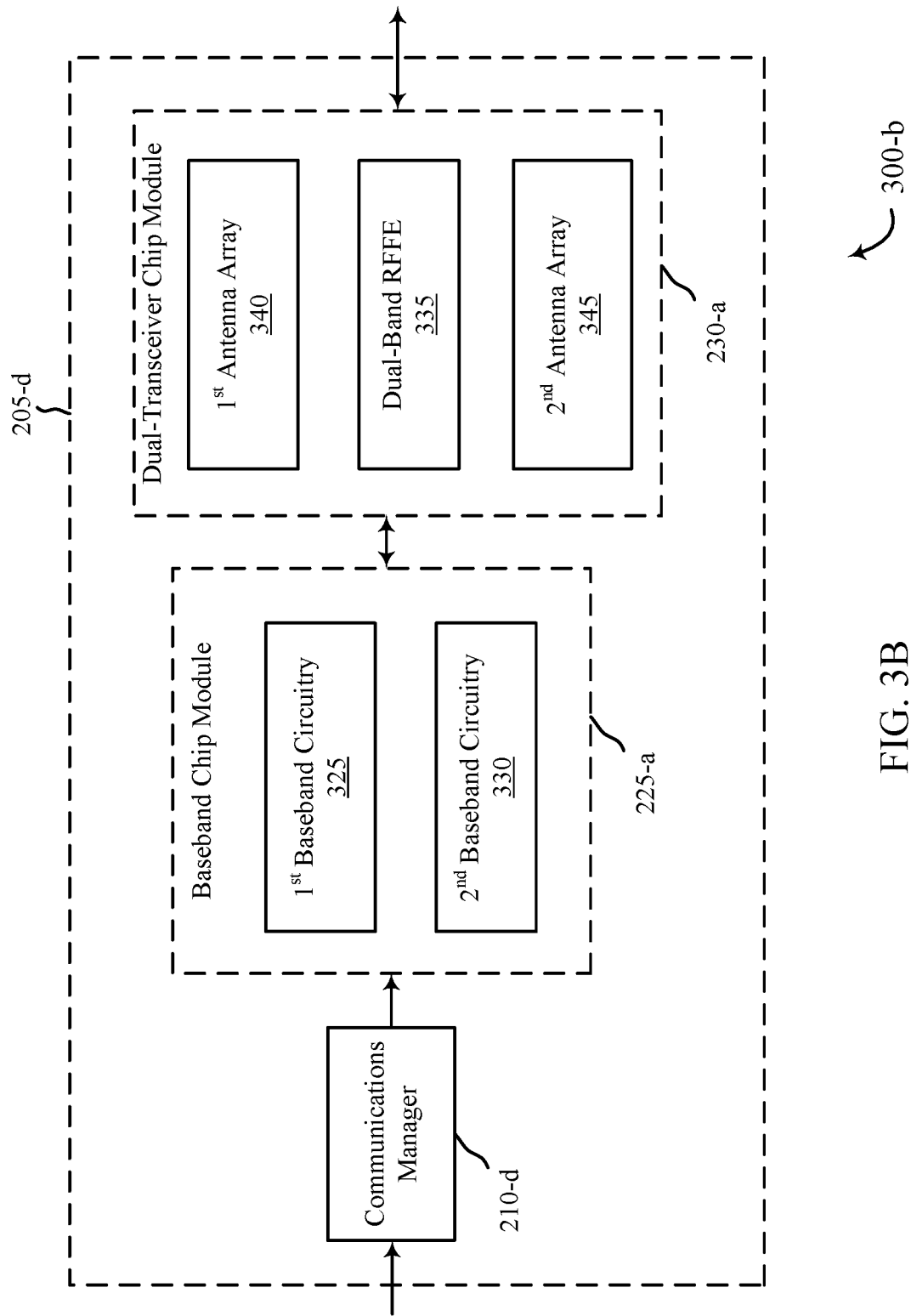
FIG. 3B shows a block diagram of a device configured for use in wireless communication, in accordance with various aspects of the present disclosure.

FIG. 3B shows a block diagram 300-b of a device 205-d for use in wireless communication, in accordance with various examples. The device 205-d may be an example of one or more aspects of a UE 115 described with reference to FIG. 1. The device 205-d may also be an example of a device 205 described with reference to FIG. 2A, 2B, or 3A. The device 205-d may include a communications manager 210-d, a baseband chip module 225-a, and/or a dual-transceiver chip module 230-a, which may be examples of the corresponding modules of device 205. The device 205-d may also include a processor (not shown). Each of these components may be in communication with each other. The baseband chip module 225-a may include a first baseband circuitry 325 and/or a second baseband circuitry 330. The dual-transceiver chip module 230-a may include a dual-band RFFE 335, a first antenna array 340, and/or a second antenna array 345. The communications manager 210-d may perform the functions of the communications manager 210 described with reference to FIG. 2A, 2B, or 3A.

The first baseband circuitry 325 may monitor, control, or otherwise manage aspects of processing of wireless communications in the first frequency range for the device 205-d. The first baseband circuitry 325 may be associated with a first baseband signal. The first baseband circuitry 325 may receive one or more information (or baseband) signals from the communications manager 210-d for transmission in the first frequency range. In some examples, the first baseband circuitry 325 may also receive control data indicating which frequency within the first frequency range the information is to be transmitted at, at which transmit power level, and the like. The first baseband circuitry 325 may include various hardware/software/logic functionality, e.g., one or more oscillator(s), mixer(s), modem circuitry, and the like, and up-convert the information contained in the baseband signal to an IF signal associated with the first frequency range for wireless transmission. In some aspects, the first baseband circuitry 325 may output the IF signal to the dual-transceiver chip module 230-a to convey the baseband signal.

Similarly, the second baseband circuitry 330 may monitor, control, or otherwise manage aspects of processing of wireless communications in the second frequency range for the device 205-d. The second baseband circuitry 330 may be associated with a second baseband signal. In some aspects, the first baseband signal and the second baseband signal may be the same or may be different baseband signals. The second baseband circuitry 330 may receive one or more information (or baseband) signals from the communications manager 210-d for transmission in the second frequency range. In some examples, the second baseband circuitry 330 may also receive control data indicating which frequency within the second frequency range the information is to be transmitted at, at which transmit power level, and the like. The second baseband circuitry 330 may include various hardware/software/logic functionality, e.g., one or more oscillator(s), mixer(s), modem circuitry, and the like, and up-convert the information contained in the second baseband signal to an IF signal associated with the second frequency range for wireless transmission. In some aspects, the second baseband circuitry 330 may output the IF signal to the dual-transceiver chip module 230-a to convey the baseband signal.

In some aspects, the second baseband circuitry 330 may support super-heterodyne transceiver operations for communicating in the second frequency range. For example, the second baseband circuitry 330 may include or access two oscillator circuits to up-convert the baseband signal to a first IF signal and then up-convert the IF signal to a second IF signal, the second IF signal being at a higher IF frequency than the first IF signal.

In some aspects, each of the first baseband circuitry 325 and the second baseband circuitry 330 may be manufactures separately and connected to the baseband chip module 225-a, e.g., soldered. Alternatively, both of the first baseband circuitry 325 and the second baseband circuitry 330 may be formed on a single die.

The dual-transceiver chip module 230-a may be separate from the baseband chip module 225-a. The dual-transceiver chip module 230-a may be electrically coupled to the baseband chip module 225-a using a single coaxial cable, e.g., a wideband cable adapted to carry one or more IF signal(s), LO signal(s), control data, etc.

The dual-band RFFE 335 may monitor, control, or otherwise manage aspects of communicating in the first frequency range and the second frequency range for the device 205-d. Generally, the dual-band RFFE 335 may include two transceiver circuits adapted to simultaneously communicate in the first and second frequency ranges. In some aspects, the first transceiver circuit, the second transceiver circuit, or both transceiver circuits may utilize a SIF transceiver architecture and/or a super-heterodyne transceiver architecture. The first transceiver circuit may be adapted to process signals in the first frequency range and the second transceiver circuit may be adapted to process signals in the second frequency range.

In some aspects, each of the first and second transceiver circuits of the dual-band RFFE 335 may be manufactures separately and connected to the dual-transceiver chip module 230-a, e.g., soldered. Alternatively, both of the first and second transceiver chips may be formed on a single die. One of the first or second transceiver circuitry may be a cellular telecommunications transceiver and the other transceiver circuitry may be a Wi-Fi communication transceiver. In some examples, both of the transceiver circuits may be a cellular telecommunications transceiver or a Wi-Fi communication transceiver.

The first antenna array 340 may be adapted to wirelessly communicate at one or more frequencies within the first frequency range. The first antenna array 340 may include one or more antenna elements and support MIMO communications, carrier aggregation communication techniques, beamforming communication techniques, and the like, for communicating in the first frequency range.

Similarly, the second antenna array 345 may be adapted to wirelessly communicate at one or more frequencies within the second frequency range. The second antenna array 345 may include one or more antenna elements and support MIMO communications, carrier aggregation communication techniques, beamforming communication techniques, and the like, for communicating in the second frequency range.

Figure 4A:
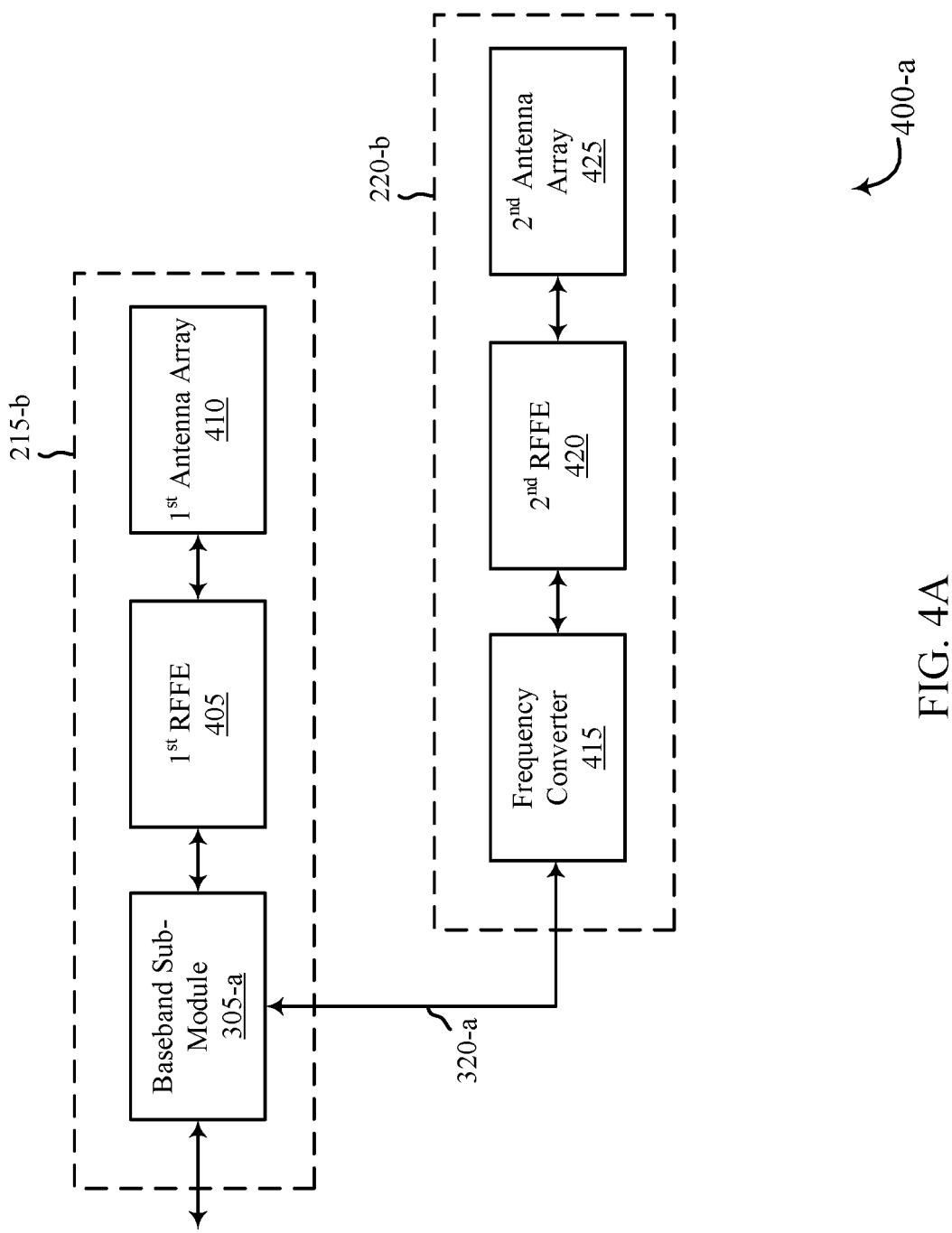
FIG. 4A shows a block diagram of example transceiver chip modules for use in wireless communication, in accordance with various aspects of the present disclosure.

In some aspects, the first antenna array 340 and the second antenna array 345 may be printed, soldered, etc., on or within the same module/PCB that the dual-band RFFE 315 is printed, soldered, etc., on. Each of the first antenna array 340 and the second antenna array 345 may be mmW antenna arrays. FIG. 4A shows a block diagram 400-a of a first transceiver chip module 215-b and a second transceiver chip module 220-b for use in wireless communication, in accordance with various examples. The first transceiver chip module 215-b and/or the second transceiver chip module 220-b may be an example of one or more aspects of a UE 115 described with reference to FIG. 1. The first transceiver chip module 215-b and/or the second transceiver chip module 220-b may also be an example of a device 205 described with reference to FIGS. 2A, 2B, 3A, and 3B. The first transceiver chip module 215-b may include a baseband sub-module 305-a, a first RFFE 405 and/or a first antenna array 410. The second transceiver chip module 220-b may include a frequency converter 415, a second RFFE 420, and/or a second antenna array 425. The baseband sub-module 305-a may be an example of and perform the functions of the baseband sub-module 305 described with reference to FIG. 3A.

The baseband sub-module 305-a may be associated with a baseband signal. The baseband signal may be a signal carrying information, e.g., data, control information, etc., for wireless communications. The baseband sub-module 305-a may output a signal within the first frequency range, for example. In some aspects, the signal output from the baseband sub-module 305-a may be used as an IF signal and provided to the second transceiver chip module 220-b for conversion to an operating frequency within the second frequency range.

In some aspects, the baseband sub-module 305-a may include two modems. A first of the two modems may be configured to communicate in the first frequency range while the second of the two modems may be configured to communicate in the second frequency range. For example, the first modem may be coupled to the first RFFE 405 were the second modem is coupled to the second RFFE 420. In certain aspects of the two-modem configuration for the baseband sub-module 305-a, a switching component may be included. The switching component may switch an information signal between the first modem and the second modem. Accordingly, the switching component may switch the information signal for transmission via the first frequency range or the second frequency range, respectively.

In some aspects, the baseband sub-module 305-a may include one modem. The single modem may be a dual-band modem that is adapted to communicate in the first frequency range and/or the second frequency range. For example, the single modem may have two outputs—a first output for the first RFFE 405 and a second output for the second RFFE 420. Alternatively, the dual-band modem may include one output and a switching component coupling the output information signal to the desired RFFE.

The first RFFE 405 may monitor, control, or otherwise manage aspects of RF circuitry for the wireless transmissions in the first frequency range. Generally, the first RFFE 405 may include circuitry associated with processing the RF signal for transmission/reception in the first frequency range. For example, the first RFFE 405 may include impedance matching circuitry, filtering circuitry, amplification circuitry, etc., for providing the RF signal to the first antenna array 410 at the proper amplitude, at the proper frequency, and without unwanted signals. The first RFFE 405 may be a ZIF transceiver architecture where the signal received from the baseband sub-module 305-*a* is already at the operating frequency for transmissions in the first frequency range. Accordingly, the first RFFE 405 may not have a mixer circuit to up-convert the signal received from the baseband sub-module 305-*a*.

In some aspects, the first RFFE 405 may be positioned on the same module or printed circuit board (PCB) as the baseband sub-module 305-*a* and the first antenna array 410. Accordingly, signal loss between said components may be minimized, at least to the extent possible. The first antenna array 410 may, accordingly, be directly connected to the first RFFE 405 and exchange RF signals for wireless communications. The first antenna array 410 may include a plurality of antenna elements and be adapted to communicate using various wireless transmission schemes, e.g., MIMO transmissions, beam-forming transmissions, multi-carrier transmissions, etc.

The frequency converter 415 may manage aspects of signal up-converting and/or down-converting for the second transceiver chip module 220-*b*. For example, the frequency converter 415 may be electrically coupled to the baseband sub-module 305-*a* and exchange an IF signal. While the IF signal may, in some examples, be the operating frequency for the first RFFE 405, the frequency converter 415 may convert the IF signal to a higher frequency for transmission in the second frequency range, i.e., up-convert. That is, the frequency converter 415 may up-convert the signal received from the baseband sub-module 305-*a* and output a signal within the second frequency range for wireless transmission. For reception, the frequency converter 415 may down-convert the signal within the second frequency range and output a signal having a frequency for the baseband signal.

The frequency converter 415 may be electrically coupled to the baseband sub-module 305-*a* via signal path 320-*a*. Generally, signal path 320-*a* may be a single coaxial cable and may be adapted to carry wideband signals. In some examples, the IF signal as well as a LO signal and/or control information may be carried by the signal path 320-*a*. Moreover, the coaxial cable forming the signal path 320-*a* may permit the second transceiver chip module 220-*b* to be positioned separate from the first transceiver chip module 215-*b*. This may provide for strategically positioning the first transceiver chip module 215-*b* (and associated first antenna array 410) and the second transceiver chip module 220-*b* (and associated second antenna array 425) at locations on a UE to ensure optimal communications.

The second RFFE 420 may monitor, control, or otherwise manage aspects of RF circuitry for the wireless transmissions in the second frequency range for the second transceiver chip module 220-*b*. Generally, the second RFFE 420 may include circuitry associated with processing the RF signal for transmission/reception in the second frequency range. For example, the second RFFE 420 may include impedance matching circuitry, filtering circuitry, amplification circuitry, etc., for providing the RF signal to the second antenna array 425 at the proper amplitude, at the proper frequency, and without unwanted signals. The second RFFE 420 may be a SIF transceiver architecture where the IF signal received from the baseband sub-module 305-*a* is applied to the frequency converter 415 to be up-converted to the operating frequency for transmissions in the second frequency range.

In some aspects, the second RFFE 420 and associated second antenna array 425 may be positioned on a different module or PCB from the first transceiver chip module 215-*b*. The second antenna array 425 may be directly connected to the second RFFE 420 and exchange RF signals for wireless communications. The second antenna array 425 may include a plurality of antenna elements and be adapted to communicate using various wireless transmission schemes, e.g., MIMO transmissions, beam-forming transmissions, multi-carrier transmissions, etc.

In some aspects, the first frequency range may be lower than the second frequency range. For example, the first frequency range may be associated with a wireless telecommunication system and the second frequency range may be associated with a Wi-Fi communication system. The first frequency range and the second frequency range may be mmW frequency ranges. For example, the first frequency range may be associated with a communications protocol operating at or about the 28 GHz frequency range, at or about the 40 GHz frequency range, and the like. The second frequency range may be associated with a communications protocol operating at or about the 40 GHz frequency range, at or about the 60 GHz frequency range, or the like, respectively.

Figure 4B:
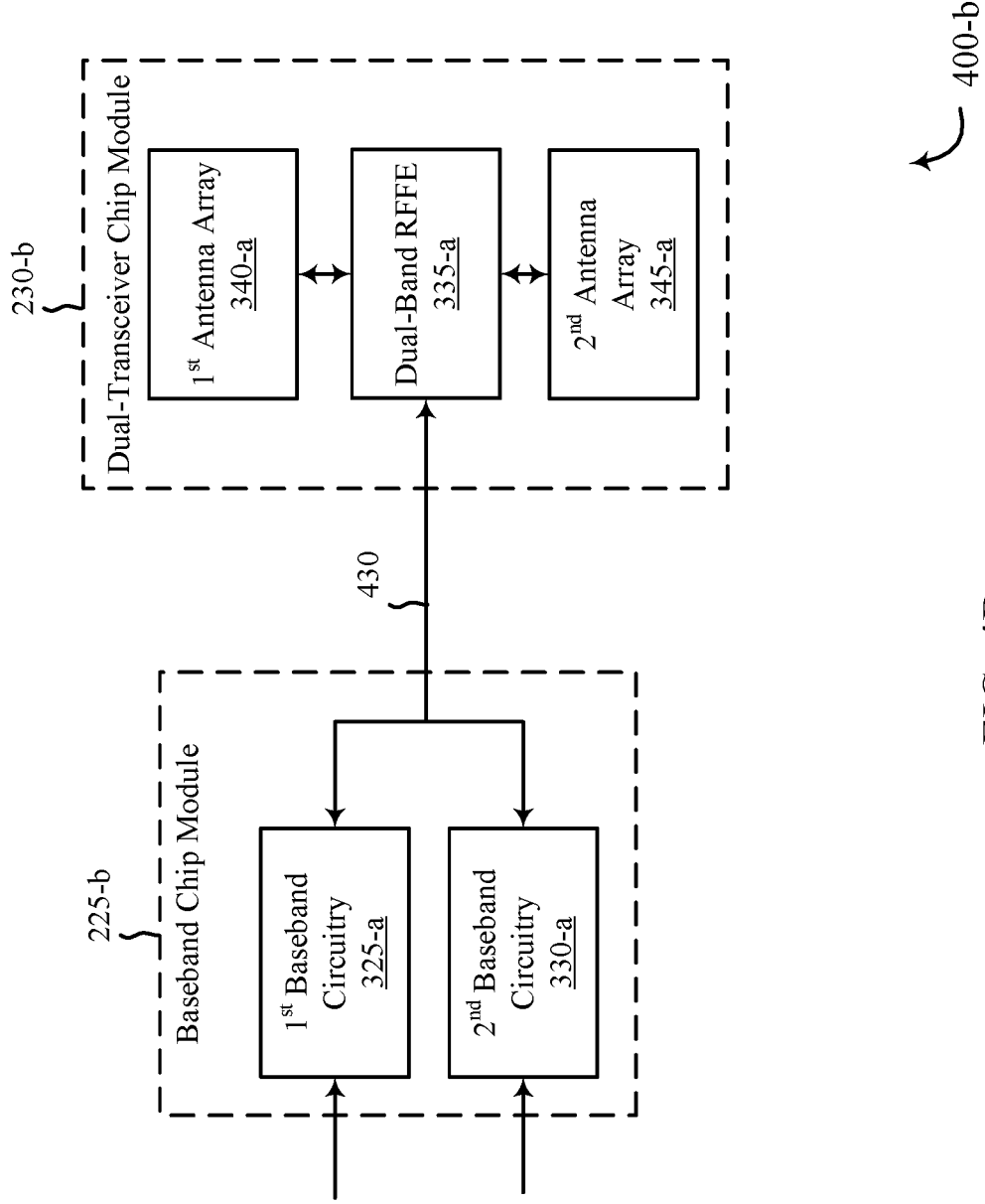
FIG. 4B shows a block diagram of an example baseband chip module and a dual-transceiver chip module for use in wireless communication, in accordance with various aspects of the present disclosure.

FIG. 4B shows a block diagram 400-*b* of a baseband chip module 225-*b* and a dual-transceiver chip module 230-*b* for use in wireless communication, in accordance with various examples. The baseband chip module 225-*b* and/or the dual-transceiver chip module 230-*b* may be an example of one or more aspects of a UE 115 described with reference to FIG. 1. The baseband chip module 225-*b* and/or the dual-transceiver chip module 230-*b* may also be an example of a device 205 described with reference to FIG. 2B or 3B. The baseband chip module 225-*b* may include a first baseband circuitry 325-*a* and/or a second baseband circuitry 330-*a*. The dual-transceiver chip module 230-*b* may include a dual-band RFFE 335-*a*, a first antenna array 340-*a*, and/or a second antenna array 345-*a*. The baseband chip module 225-*b* may be an example of and perform the functions of the baseband chip module 225 described with reference to FIGS. 2B and 3B. The dual-transceiver chip module 230-*b* may be an example of and perform the functions of the dual-transceiver chip module 230 described with reference to FIGS. 2B and 3B. The baseband chip module 225-*b* may be separate from and electrically coupled to the dual-transceiver chip module 230-*b* via signal path 430.

The baseband chip module 225-*b* may be associated with a baseband signal and, in some examples, more than one baseband signal. The one or more baseband signals may be a signal carrying information, e.g., data, control information, etc., for wireless communications in a first frequency range, a second frequency range, or both frequency ranges. Other control information may provide instructions pertaining to the wireless communications, e.g., power, frequency, and the like.

The first baseband circuitry 325-*a* may provide for baseband processing of wireless communications in the first frequency range. The second baseband circuitry 330-*a* may provide for baseband processing of wireless communications in the second frequency range. The first baseband circuitry 325-*a* may include a first modem associated with communicating in the first frequency range and the second baseband circuitry 330-*a* may include a second modem associated with communicating in the second frequency range. In some aspects, the baseband chip module 225-*b* may include interface circuitry. For example, the baseband chip module 225-*b* may include a first communication interface circuitry associated with the first modem and a second communication interface associated with the second modem. The first communication interface circuitry may be associated with and provide input/output functionality for the first baseband circuitry 325-*a* and the second communication interface circuitry may be associated with and provide input/output functionality for the second baseband circuitry 330-*a*. In another example, the baseband chip module 225-*b* may include a common interface circuitry. The common interface circuitry may be associated with communicating information via the first modem and the second modem. The common interface circuitry may include a switching function that determines which information is provided to the first mode, to the second modem, or to both the first and second modems.

The first baseband circuitry 325-*a* may output a first IF signal associated with communicating in the first frequency range. The second baseband circuitry 330-*a* may output a second IF signal associated with communicating in the second frequency range. In some examples, the second IF signal may be at a higher frequency than the first IF signal. The first and second IF signals may be output to the dual-transceiver chip module 230-*b*.

The dual-band RFFE 335-*a* may monitor, control, or otherwise manage aspects of communicating in the first frequency range and the second frequency range. Generally, the dual-band RFFE 335-*a* may include two transceiver circuits adapted to simultaneously communicate in the first and second frequency ranges. In some aspects, the first transceiver circuit, the second transceiver circuit, or both transceiver circuits may utilize a SIF transceiver architecture and/or a super-heterodyne transceiver architecture. The first transceiver circuit may be adapted to process signals in the first frequency range and the second transceiver circuit may be adapted to process signals in the second frequency range.

In some aspects, each of the first and second transceiver circuits of the dual-band RFFE 335-*a* may be manufactures separately and connected to the dual-transceiver chip module 230-*b*, e.g., soldered. Alternatively, both of the first and second transceiver chips may be formed on a single die. One of the first or second transceiver circuitry may be a cellular telecommunications transceiver and the other transceiver circuitry may be a Wi-Fi communication transceiver. In some examples, both of the transceiver circuits may be a cellular telecommunications transceiver or a Wi-Fi communication transceiver.

The first antenna array 340-*a* may be adapted to wirelessly communicate at one or more frequencies within the first frequency range. The first antenna array 340-*a* may include one or more antenna elements and support MIMO communications, carrier aggregation communication techniques, beamforming communication techniques, and the like, for communicating in the first frequency range.

Similarly, the second antenna array 345-*a* may be adapted to wirelessly communicate at one or more frequencies within the second frequency range. The second antenna array 345-*a* may include one or more antenna elements and support MIMO communications, carrier aggregation communication techniques, beamforming communication techniques, and the like, for communicating in the second frequency range.

In some aspects, the first antenna array 340-*a* and the second antenna array 345-*a* may be printed, soldered, etc., on or within the same module/PCB that the dual-band RFFE 315-*a* is printed, soldered, etc., on. Each of the first antenna array 340-*a* and the second antenna array 345-*a* may be mmW antenna arrays.

The signal path 430 may provide for electrically coupling the baseband chip module 225-*b* to the dual-transceiver chip module 230-*b*. The signal path 430 may be a single coaxial cable. The coaxial cable may be adapted to carry high bandwidth signals. For example, the coaxial cable may carry one or more IF signal(s), one or more oscillator signal(s), control signaling. In one example, the coaxial cable is configured to support communications of high bandwidth signals, e.g., a first IF signal associated with the first frequency range and a second IF signal associated with the second frequency range. The first IF signal may be different than the second IF signal.

In some examples, multiplexing circuitry may be used to electrically couple the baseband chip module 225-*b* to the dual-transceiver chip module 230-*b*. For example, the baseband chip module may include a first multiplexer and the dual-transceiver chip module 230-*b* may include a second multiplexer. The multiplexers may be configured to multiplex and de-multiplex signals exchanged between the baseband chip module 225-*b* and the dual-transceiver chip module 230-*b*. For example, the multiplexers may multiplex/de-multiplex IF signal(s), oscillator signal(s), control signaling, and the like. Accordingly, the coaxial cable forming signal path 430 may support communicating signals having a high bandwidth.

Figure 5A:
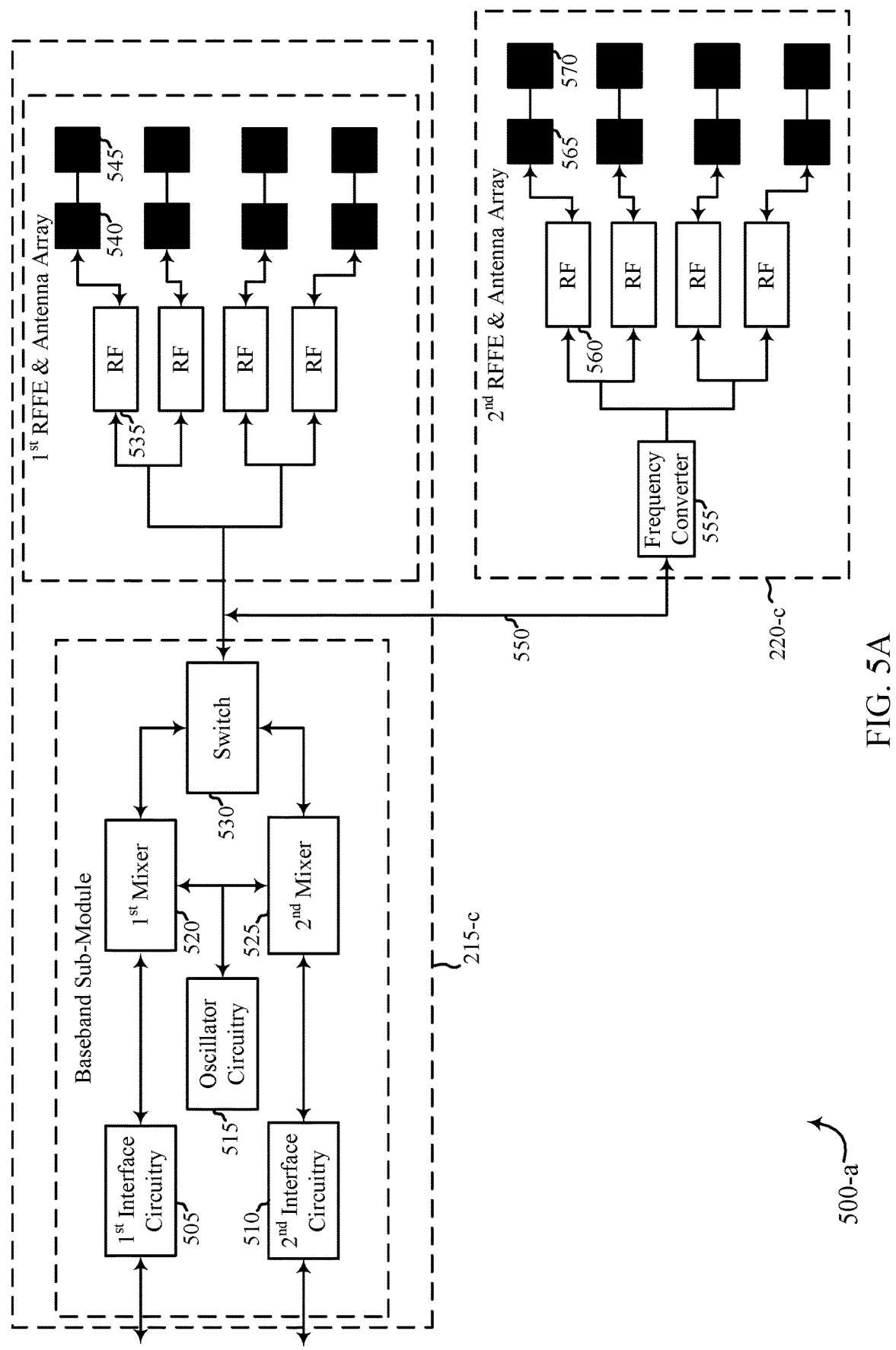
FIG. 5A shows another block diagram of example transceiver chip modules for use in wireless communication, in accordance with various aspects of the present disclosure.

In some aspects, the first frequency range may be lower than the second frequency range. For example, the first frequency range may be associated with a wireless telecommunication system and the second frequency range may be associated with a Wi-Fi communication system. The first frequency range and the second frequency range may be mmW frequency ranges. For example, the first frequency range may be associated with a communications protocol operating at or about the 28 GHz frequency range, at or about the 40 GHz frequency range, and the like. The second frequency range may be associated with a communications protocol operating at or about the 40 GHz frequency range, at or about the 60 GHz frequency range, or the like, respectively. FIG. 5A shows a block diagram 500-*a* of a first transceiver chip module 215-*c* and a second transceiver chip module 220-*c* for use in wireless communication, in accordance with various examples. The first transceiver chip module 215-*c* and/or the second transceiver chip module 220-*c* may be an example of one or more aspects of a UE 115 described with reference to FIG. 1. The first transceiver chip module 215-*c* and/or the second transceiver chip module 220-*c* may also be an example of a device 205 described with reference to FIGS. 2A, 2B, 3A, and 3B. The first transceiver chip module 215-*c* may include a baseband sub-module that includes a first interface circuitry 505, a second interface circuitry 510, an oscillator circuitry 515, a first mixer 520, a second mixer 525, and a switch 530. The first transceiver chip module 215-*c* may also include a first RFFE and antenna array that includes a plurality of RF circuitry components 535 and antenna elements 540 and 545. The second transceiver chip module 220-*c* may include a second RFFE and antenna array that includes a frequency converter 555, a plurality of RF circuitry components 560 and associated antenna elements 565 and 570.

The first and second interface circuitry 505 and 510, respectively, may include components associated with receiving and sending data, control information, etc., associated with wireless transmission. For example, each interface circuitry may include a modem, filters, amplifiers, etc., adapted to process and control such data, control information, and the like. Oscillator circuitry 515 may include one, or more than one oscillators for generating a signal at a predetermined frequency. For instance, the oscillator circuitry 515 may output a local oscillator signal, a signal in the IF frequency range, and the like. The oscillator circuitry 515 may output one of more of said signals to the first mixer 520 and/or the second mixer 525. In some aspects, the first mixer 520 may mix the output signal of the oscillator circuitry 515 with the signal received from the first interface circuitry 505 to output a signal having a frequency in the first frequency range. The first mixer 520 may output the mixed signal at the first frequency range to the switch 530.

Similarly, second mixer 525 may mix the output signal of the oscillator circuitry 515 with the signal received from the second interface circuitry 510 and output a signal having a frequency in the first frequency range. The second mixer 525 may output the mixed signal at the first frequency range to the switch 530. The switch 530 may route the outputs of the first mixer 520, the second mixer 525, or the outputs of both mixers, to the desired RFFE and antenna array. For example, the switch 530 may route the output of the first mixer 520 to the first RFFE and antenna array. As the first RFFE and antenna array are positioned on the same module or PCB as the baseband sub-module, the switch may be directly connected to the first RFFE. For example, the switch 530 may route the output signal to one or more of the plurality of RF components 535 (only one being labeled for ease of reference). The RF components 535 may process the received signal and output a signal in the first frequency range to one or more of the antenna elements 540, 545 of the first antenna array. Only antenna elements 540 and 545 are labeled for each of reference. From the antenna elements 540, 545, the signal is wirelessly transmitted to a receiving device. It can be appreciated that for receive operations, the foregoing functions may be performed in reverse for the received signal.

Additionally or alternatively, the switch 530 may route the outputs of the first mixer 520, the second mixer 525, or the outputs of both mixers, to the frequency converter 55 of the second transceiver chip module 220-c via the signal path 550. The signal path 550 may be a coaxial cable that permits the second transceiver chip module 220-c to be separate from the first transceiver chip module 215-c, but be electrically coupled. The switch 530 may also route control information, a LO signal, etc., from the baseband sub-module to the second transceiver chip module 220-c. The frequency converter 555 may upconvert the IF signal received from the switch 530 to a signal within the second frequency range. The frequency converter 555 may route the up-converted signal to one or more of the plurality of RF components 560 (only one being labeled for ease of reference). The RF components 560 may process the received signal and output a signal in the second frequency range to one or more of the antenna elements 565, 570 of the second antenna array. Only antenna elements 565 and 570 are labeled for each of reference. From the antenna elements 565, 570, the signal is wirelessly transmitted to a receiving device. It can be appreciated that for receive operations, the foregoing functions may be performed in reverse for the received signal.

Figure 5B:
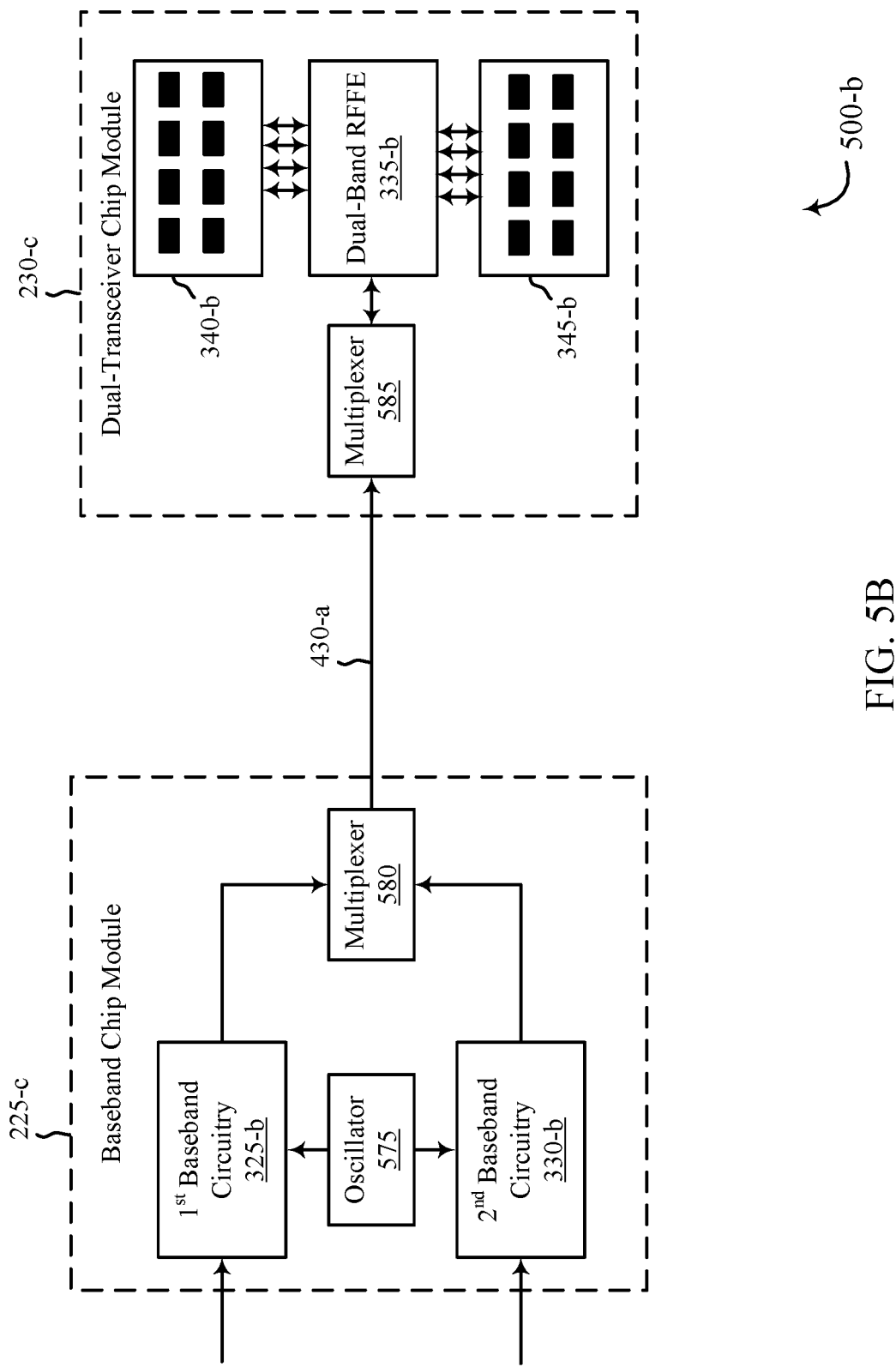
FIG. 5B shows another block diagram of an example baseband chip module and a dual-transceiver chip module for use in wireless communication, in accordance with various aspects of the present disclosure.

FIG. 5B shows a block diagram 500-b of a baseband chip module 225-c and a dual-transceiver chip module 230-c for use in wireless communication, in accordance with various examples. The baseband chip module 225-c and/or the dual-transceiver chip module 230-c may be an example of one or more aspects of a UE 115 described with reference to FIG. 1. The baseband chip module 225-c and/or the dual-transceiver chip module 230-c may also be an example of a device 205 described with reference to FIGS. 2A, 2B, 3A, and 3B. The baseband chip module 225-c may include a first baseband circuitry 325-b, a second baseband circuitry 330-b, an oscillator 575 and a multiplexer 580. The dual-transceiver chip module 230-c may include a multiplexer 585, a dual-band RFFE 335-b, a first antenna array 340-b and a second antenna array 345-b.

The baseband chip module 225-c may be associated with a baseband signal and, in some examples, more than one baseband signal. The one or more baseband signals may be a signal carrying information, e.g., data, control information, etc., for wireless communications in a first frequency range, a second frequency range, or both frequency ranges. Other control information may provide instructions pertaining to the wireless communications, e.g., power, frequency, and the like.

The first baseband circuitry 325-b may provide for baseband processing of wireless communications in the first frequency range. The second baseband circuitry 330-b may provide for baseband processing of wireless communications in the second frequency range. The oscillator 575 may provide a signal, or more than one signal, associated with communicating in the first frequency range, the second frequency range, or both the first and second frequency ranges. For example, the oscillator may include one or more oscillator circuits, e.g., voltage-controlled oscillators, that may output a first IF signal associated with communicating in the first frequency range, a second IF signal associated with communicating in the second frequency range, or both. In some examples, the second IF signal may be at a higher frequency than the first IF signal. The first and second IF signals may be output to the first baseband circuitry 325-b and the second baseband circuitry 330-b, respectively.

The dual-band RFFE 335-b may monitor, control, or otherwise manage aspects of communicating in the first frequency range and the second frequency range. Generally, the dual-band RFFE 335-b may include two transceiver circuits adapted to simultaneously communicate in the first and second frequency ranges. In some aspects, the first transceiver circuit, the second transceiver circuit, or both transceiver circuits may utilize a SIF transceiver architecture and/or a super-heterodyne transceiver architecture. The first transceiver circuit may be adapted to process signals in the first frequency range and the second transceiver circuit may be adapted to process signals in the second frequency range.

In some aspects, each of the first and second transceiver circuits of the dual-band RFFE 335-b may be manufactures separately and connected to the dual-transceiver chip module 230-c, e.g., soldered. Alternatively, both of the first and second transceiver chips may be formed on a single die. One of the first or second transceiver circuitry may be a cellular telecommunications transceiver and the other transceiver circuitry may be a Wi-Fi communication transceiver. In some examples, both of the transceiver circuits may be a cellular telecommunications transceiver or a Wi-Fi communication transceiver.

The first antenna array 340-b may include a plurality of antenna elements and be adapted to wirelessly communicate at one or more frequencies within the first frequency range. The first antenna array 340-b may support MIMO communications, carrier aggregation communication techniques, beamforming communication techniques, and the like, for communicating in the first frequency range.

Similarly, the second antenna array 345-*b* may include a plurality of antenna elements and be adapted to wirelessly communicate at one or more frequencies within the second frequency range. The second antenna array 345-*b* may also support MIMO communications, carrier aggregation communication techniques, beamforming communication techniques, and the like, for communicating in the second frequency range.

In some aspects, the first antenna array 340-*b* and the second antenna array 345-*b* may be printed, soldered, etc., on or within the same module/PCB that the dual-band RFFE 335-*b* is printed, soldered, etc., on.

The signal path 430-*a* may provide for electrically coupling the baseband chip module 225-*c* to the dual-transceiver chip module 230-*c*. The signal path 430-*a* may be a single coaxial cable. The coaxial cable may be adapted to carry high bandwidth signals. For example, the coaxial cable may carry one or more IF signal(s), one or more oscillator signal(s), control signaling, etc. In one example, the coaxial cable is configured to support communications of high bandwidth signals, e.g., a first IF signal associated with the first frequency range and a second IF signal associated with the second frequency range. The first IF signal may be different than the second IF signal.

Figure 6:
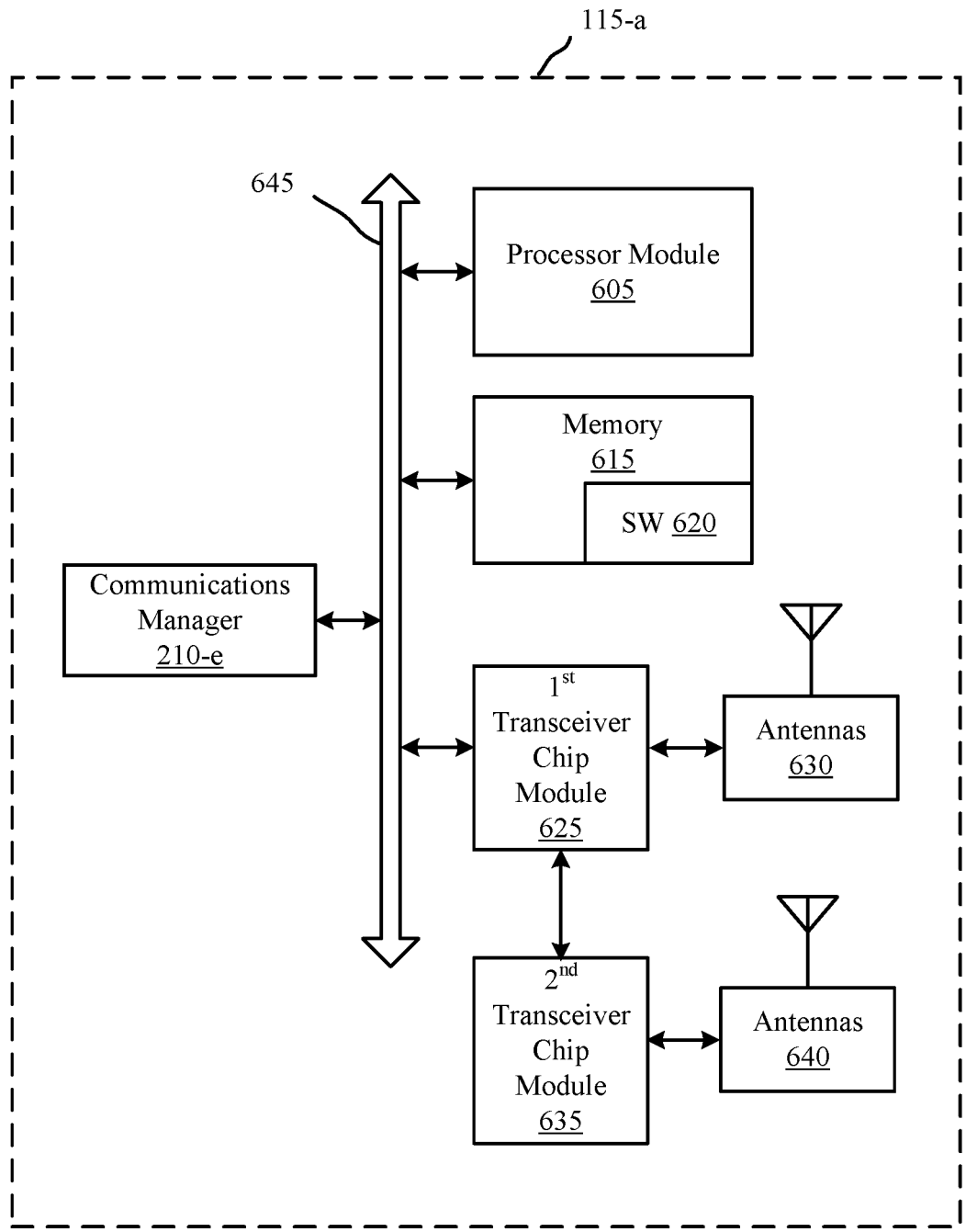
FIG. 6 shows a block diagram of a wireless communication system, in accordance with various aspects of the present disclosure.

In some examples, multiplexer 580 and multiplexer 585 may be used to electrically couple the baseband chip module 225-*c* to the dual-transceiver chip module 230-*c*. For example, the multiplexer 580 of the baseband chip module 225-*c* and the multiplexer 585 of the dual-transceiver chip module 230-*c* may be adapted to multiplex, mix, etc., the various IF, LO, control signaling, etc., for communication along the coaxial cable. The multiplexers 580 and 585 may be configured to multiplex and de-multiplex signals exchanged between the baseband chip module 225-*c* and the dual-transceiver chip module 230-*c*. For example, the multiplexers 580 and 585 may multiplex/de-multiplex IF signal(s), oscillator signal(s), control signaling, and the like. Accordingly, the coaxial cable forming signal path 430-*a* may support communicating signals having a high bandwidth. FIG. 6 shows a system 600 for use in wireless communication, in accordance with various examples. System 600 may include a UE 115-*a*, which may be an example of the UEs 115 of FIG. 1. UE 115-*a* may also be an example of one or more aspects of devices 205 of FIGS. 2A, 2B, 3A, and 3B. The UE 115-*a* may also incorporate aspects of the first transceiver chip module 215 and/or the second transceiver chip module 220 described with reference to FIGS. 2A, 3A, 4A, and 5A.

The UE 115-*a* may generally include components for bi-directional voice and data communications including components for transmitting communications and components for receiving communications. The UE 115-*a* may include a first transceiver chip module 625 and associated antenna(s) 630, a second transceiver chip module 635 and associated antenna(s) 640, a processor module 605, a memory 615 (including software (SW) 520), and a communications manager 210-*e*, which each may communicate, directly or indirectly, with each other (e.g., via one or more buses 645). The first transceiver chip module 625 and associated antenna(s) 630 may be configured to communicate bi-directionally in a first frequency range, with one or more networks, as described above. For example, the first transceiver chip module 625 may be configured to communicate bi-directionally with base stations 105 with reference to FIG. 1. The transceiver module 625 may include a baseband sub-module configured to modulate the packets and provide the modulated packets to the antenna(s) 630 for transmission, and to demodulate packets received from the antenna(s) 630.

The second transceiver chip module 635 may be separate from the first transceiver chip module 625 and be electrically coupled to a baseband sub-module. The second transceiver chip module 635 and associated antenna(s) 640 may be configured to communicate bi-directionally in a second frequency range, with one or more networks, as described above. For example, the second transceiver chip module 635 may be configured to communicate bi-directionally with base stations 105 with reference to FIG. 1. The second transceiver chip module 635 may exchange an IF signal, a LO signal, and/or control data with the baseband sub-module of the first transceiver chip module 625. The baseband sub-module may also include a modem for modulating and de-modulating information signals to be transmitted in the second frequency range via the second transceiver chip module 635. Generally, the antenna(s) 630 and the antenna(s) 640 are antenna arrays, each configured to communicate in the first and second frequency ranges, respectively. The UE 115-*a* may be capable of concurrently transmitting and/or receiving multiple wireless transmissions in the first and/or the second frequency ranges.

The UE 115-*a* may include a communications manager 210-*e*, which may perform the functions described above for the communications manager 210 of device 205 of FIGS. 2A, 2B, 3A, and 3B.

The memory 615 may include random access memory (RAM) and read-only memory (ROM). The memory 615 may store computer-readable, computer-executable software/firmware code 620 containing instructions that are configured to, when executed, cause the processor module 605 to perform various functions described herein (e.g., communications in first and second frequency ranges via the first transceiver chip module 625 and the second transceiver chip module 635, respectively, etc.). Alternatively, the computer-readable, computer-executable software/firmware code 620 may not be directly executable by the processor module 605 but be configured to cause a computer (e.g., when compiled and executed) to perform functions described herein. The processor module 605 may include an intelligent hardware device, e.g., a central processing unit (CPU), a microcontroller, an application-specific integrated circuit (ASIC), etc.

Figure 7:
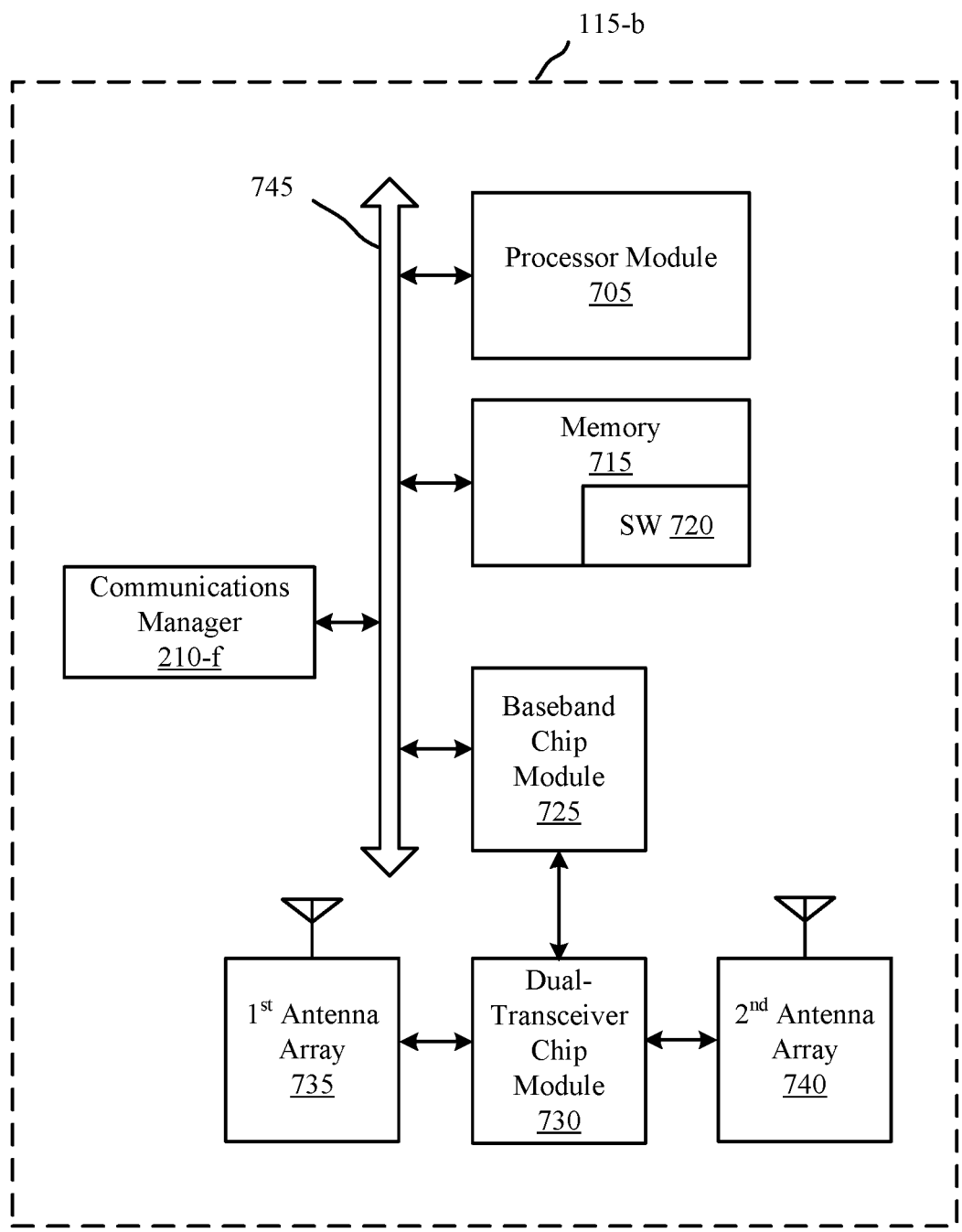
FIG. 7 shows a block diagram of a wireless communication system, in accordance with various aspects of the present disclosure.

FIG. 7 shows a system 700 for use in wireless communication, in accordance with various examples. System 700 may include a UE 115-*b*, which may be an example of the UEs 115 of FIG. 1 or 6. UE 115-*a* may also be an example of one or more aspects of devices 205 of FIGS. 2A, 2B, 3A, and 3B. The UE 115-*b* may also incorporate aspects of the baseband chip module 225 and/or the dual-transceiver chip module 230 described with reference to FIGS. 2B, 3B, 4B, and 5B.

The UE 115-*b* may generally include components for bi-directional voice and data communications including components for transmitting communications and components for receiving communications. The UE 115-*b* may include a baseband chip module 725, a dual-transceiver chip module 730, and associated first antenna array 735 and second antenna array 740, a processor module 705, a memory 715 (including software (SW) 720), and a communications manager 210-*f*, which each may communicate, directly or indirectly, with each other (e.g., via one or more buses 745). The baseband chip module 725, the dual-transceiver chip module 730, and associated antenna arrays 735 and 740 may be configured to communicate bi-directionally in a first frequency range and a second frequency range, with one or more networks, as described above. The baseband chip module 725 may include one or more modems configured to modulate the packets and provide the modulated packets to the dual-transceiver chip module 730 for up-conversion and sending on to antenna arrays 735 and/or 740 for transmission, and to demodulate packets received from the antenna arrays 735 and 740.

The dual-transceiver chip module 730 may be separate from the baseband chip module 725 and be electrically coupled to the baseband chip module 725. The dual-transceiver chip module 730 may exchange an IF signal, a LO signal, and/or control data with the baseband chip module 725. The UE 115-*b* may be capable of concurrently transmitting and/or receiving multiple wireless transmissions in the first and/or the second frequency ranges.

The UE 115-*b* may include a communications manager 210-*f*, which may perform the functions described above for the communications manager 210 of device 205 of FIGS. 2A, 2B, 3A, and 3B.

The memory 715 may include random access memory (RAM) and read-only memory (ROM). The memory 715 may store computer-readable, computer-executable software/firmware code 720 containing instructions that are configured to, when executed, cause the processor module 705 to perform various functions described herein (e.g., communications in first and second frequency ranges via the baseband chip module 725 and the dual-transceiver chip module 730, etc.). Alternatively, the computer-readable, computer-executable software/firmware code 720 may not be directly executable by the processor module 705 but be configured to cause a computer (e.g., when compiled and executed) to perform functions described herein. The processor module 705 may include an intelligent hardware device, e.g., a central processing unit (CPU), a microcontroller, an application-specific integrated circuit (ASIC), etc.

Figure 8:
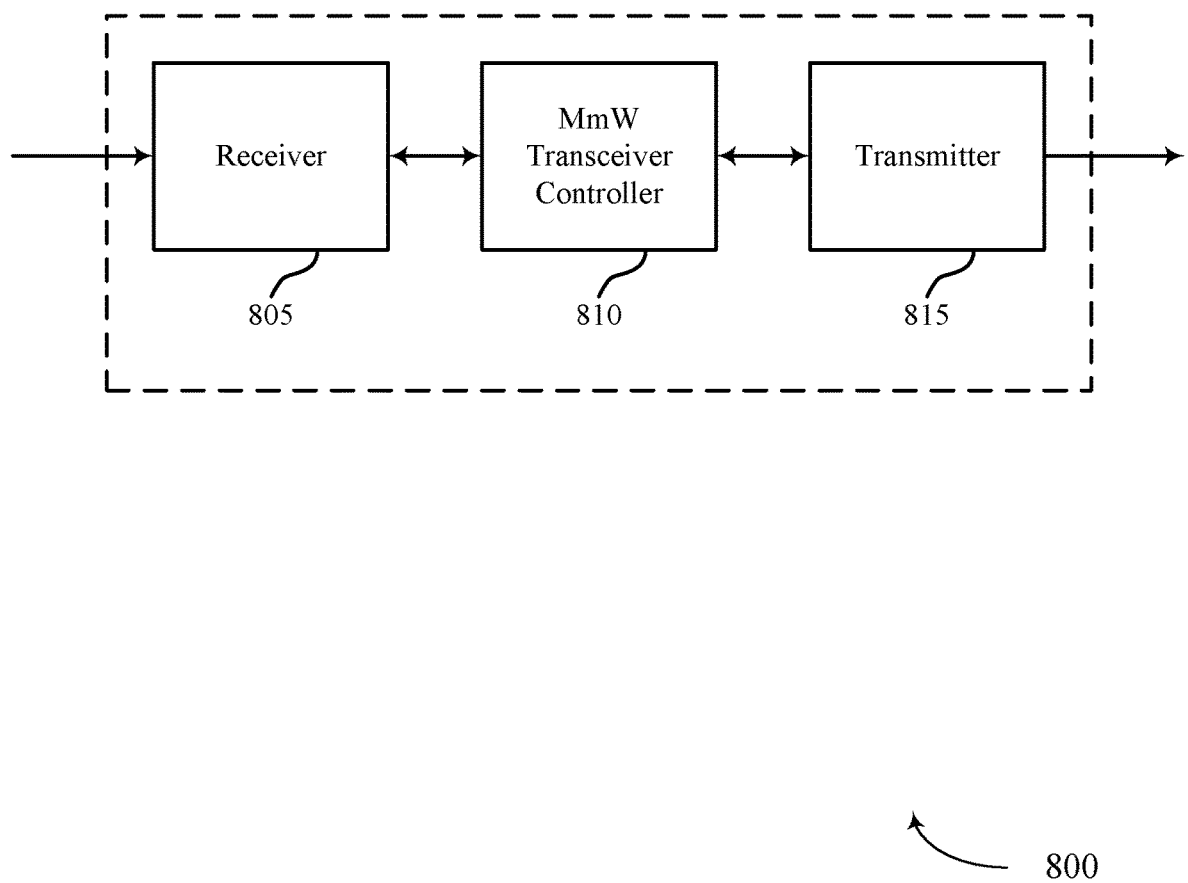
FIG. 8 shows a block diagram of a wireless device that supports multiple array mmW transceiver operation in accordance with various aspects of the present disclosure.

FIG. 8 shows a block diagram of a wireless device 800 configured for multiple array mmW transceiver operation in accordance with various aspects of the present disclosure. Wireless device 800 may be an example of aspects of a base station 105 described with reference to FIGS. 1, and 13-16. Wireless device 800 may include a receiver 805, a mmW transceiver controller 810, or a transmitter 815. Wireless device 800 may also include a processor. Each of these components may be in communication with each other.

The receiver 805 may receive information such as packets, user data, or control information associated with various information channels (e.g., control channels, data channels, and information related to multiple array mmW transceiver operation, etc.).

Information may be passed on to the mmW transceiver controller 810, and to other components of wireless device 800.

The mmW transceiver controller 810 may perform a beam sweep operation on beams created by one or more arrays of a plurality of antenna arrays, and select an array from the plurality of antenna arrays for communication with a target wireless device based at least in part on the beam sweep operation.

The transmitter 815 may transmit signals received from other components of wireless device 800. In some examples, the transmitter 815 may be collocated with the receiver 805 in a transceiver module. The transmitter 815 may include a single antenna, or it may include a plurality of antennas. In some examples, the transmitter 815 may communicate with a target wireless device using a selected array of the base station 105 and a selected transceiver of the UE 115.

Figure 9:
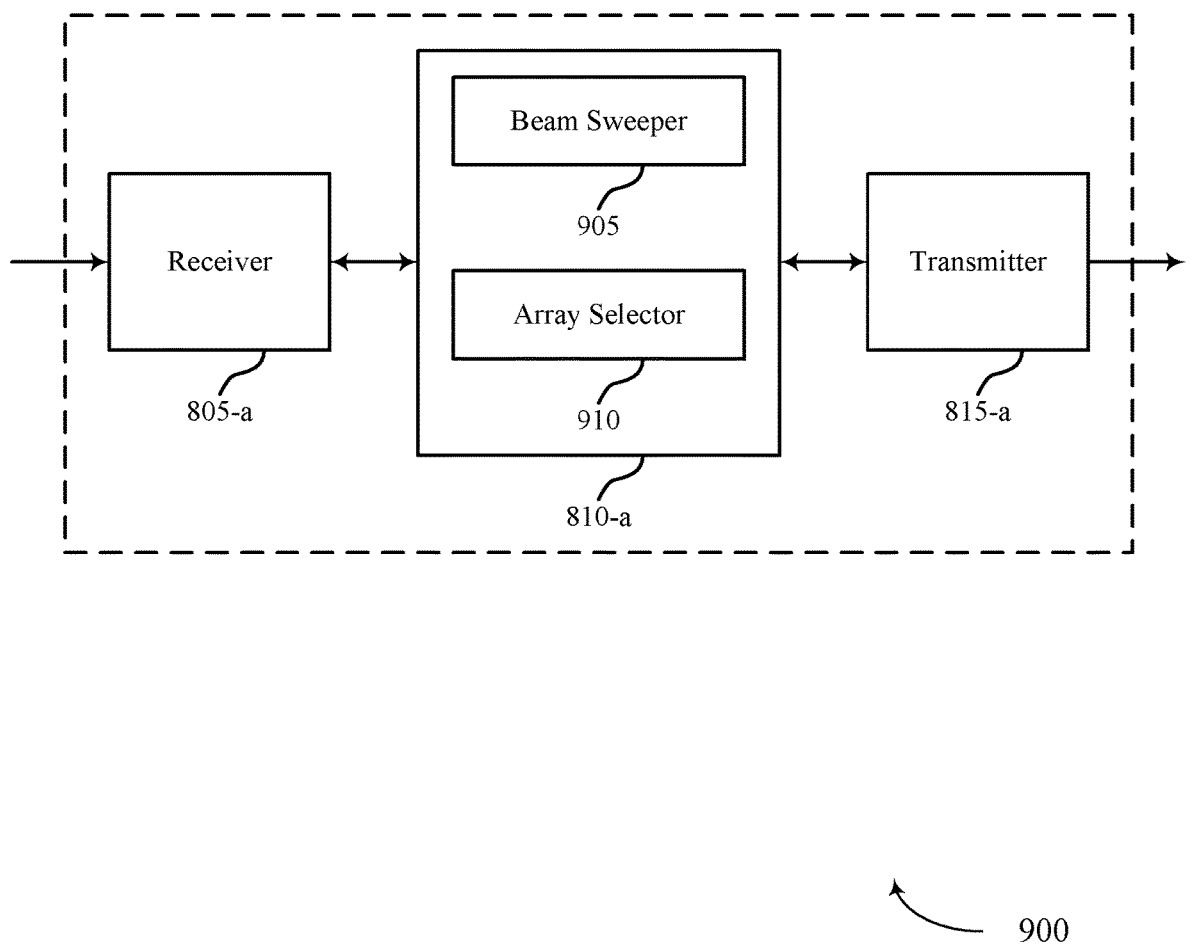
FIG. 9 shows a block diagram of a wireless device that supports multiple array mmW transceiver operation in accordance with various aspects of the present disclosure.

FIG. 9 shows a block diagram of a wireless device 900 for multiple array mmW transceiver operation in accordance with various aspects of the present disclosure. Wireless device 900 may be an example of aspects of a wireless device 205 or a base station 105 described with reference to FIGS. 1-5B, and 13-16. Wireless device 900 may include a receiver 805-*a*, a mmW transceiver controller 810-*a*, or a transmitter 815-*a*. Wireless device 900 may also include a processor. Each of these components may be in communication with each other. The mmW transceiver controller 810-*a* may also include a beam sweeper 905, and an array selector 910.

The receiver 805-*a* may receive information which may be passed on to mmW transceiver controller 810-*a*, and to other components of a base station 105. The mmW transceiver controller 810-*a* may perform the operations described herein with reference to FIG. 8. The transmitter 815-*a* may transmit signals received from other components of wireless device 900.

The beam sweeper 905 may perform a beam sweep operation on beams created by one or more arrays of a plurality of antenna arrays as described herein with reference to FIGS. 13-16. For example, the beam sweeper 905 may select an initial array from the plurality of antenna arrays for the beam sweep operation, wherein performing the beam sweep operation comprises sweeping through each of a first plurality of beams associated with the initial array. The beam sweeper 905 may also select a subsequent array from the plurality of antenna arrays for the beam sweep operation, wherein performing the beam sweep operation comprises sweeping through each of a second plurality of beams associated with the subsequent array. In some examples, a first array of the plurality of antenna arrays may be located at an opposite side of the mmW base station relative to a second array of the plurality of antenna arrays based at least in part on a spatial diversity configuration. In some examples, at least one array of the plurality of antenna arrays may be configured for operation in a mmW frequency range. In some examples, the at least one array may be configured for operation in a first mmW frequency range that operates at or about 28 GHz or in a second mmW frequency range that operates at or about 40 GHz. In some examples, the at least one array may be paired with at least one adjacent array configured for operation in a third mmW frequency range that operates at or about 60 GHz. In some examples, each of the plurality of antenna arrays may be configured with an increased number of antenna elements.

The array selector 910 may select an array from the plurality of antenna arrays for communication with a target wireless device based at least in part on the beam sweep operation as described herein with reference to FIGS. 13-16. The array selector 910 may also determine that a channel parameter associated with the array satisfies a threshold condition based at least in part on the beam sweep operation, wherein selecting the array is based at least in part on the determination.

Figure 10:
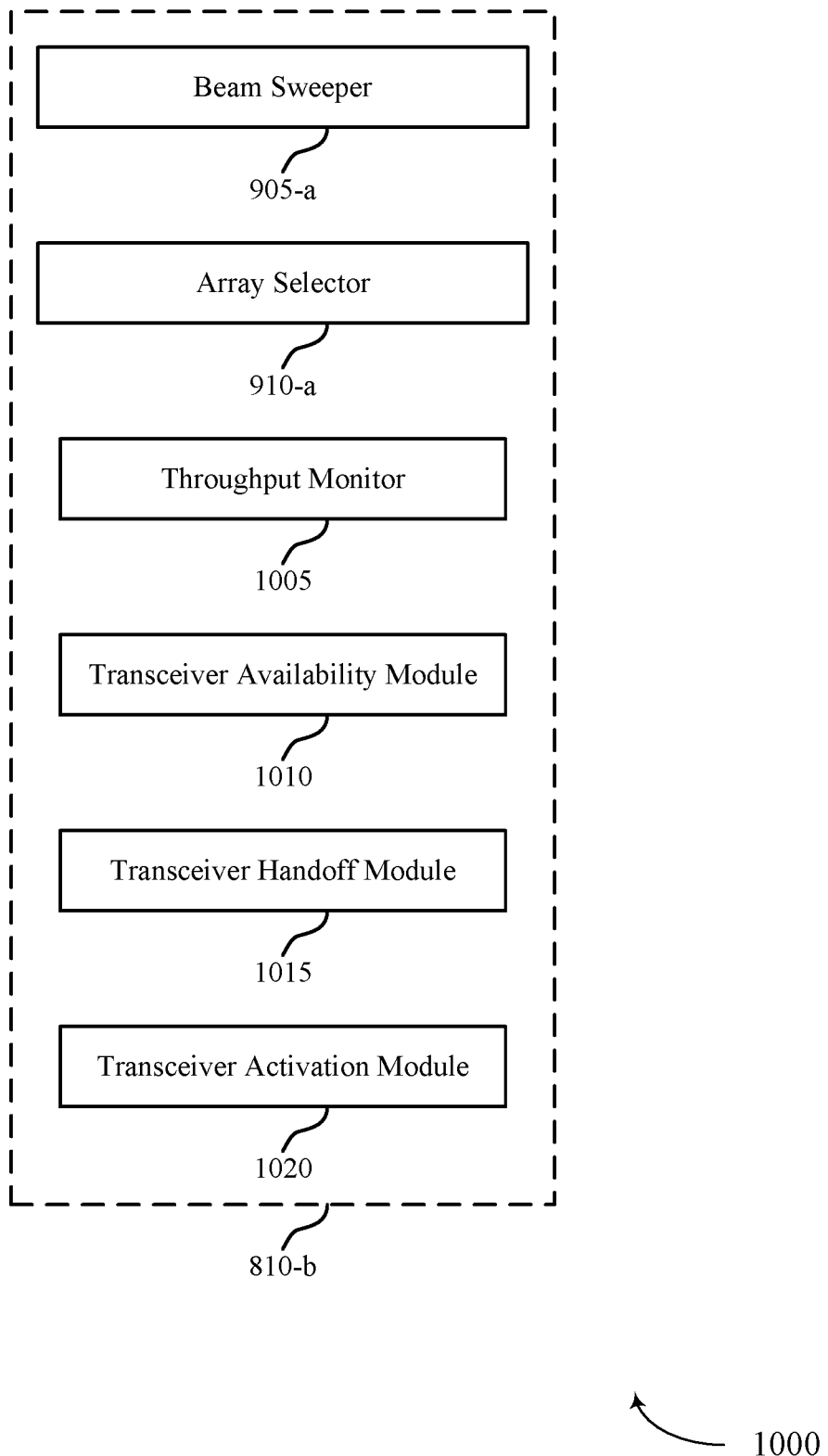
FIG. 10 shows a block diagram of a wireless device that supports multiple array mmW transceiver operation in accordance with various aspects of the present disclosure.

FIG. 10 shows a block diagram 1000 of a mmW transceiver controller 810-*b* which may be a component of a wireless device 800 or a wireless device 900 for multiple array mmW transceiver operation in accordance with various aspects of the present disclosure. The mmW transceiver controller 810-*b* may be an example of aspects of a mmW transceiver controller 810 described with reference to FIGS. 8-9. The mmW transceiver controller 810-*b* may include a beam sweeper 905-*a*, and an array selector 910-*a*. Each of these modules may perform the functions described herein with reference to FIG. 9. The mmW transceiver controller 810-b may also include a throughput monitor 1005, a transceiver availability module 1010, a transceiver handoff module 1015, and a transceiver activation module 1020.

The throughput monitor 1005 may determine that a target throughput is greater than a threshold as described herein with reference to FIGS. 13-16. In some examples, the threshold may be 1 Gbps.

The transceiver availability module 1010 may determine that a transceiver for the target wireless device is available, the transceiver operating in a first mmW frequency range as described herein with reference to FIGS. 13-16. In some examples, the first mmW frequency range may be a 60 GHz range.

The transceiver handoff module 1015 may transmit a handoff signal to the target wireless device based at least in part on the determination that the target throughput is greater than the threshold, the determination that the transceiver is available, and the beam sweep operation, wherein the handoff signal directs the target wireless device to use the transceiver for communication as described herein with reference to FIGS. 13-16.

The transceiver activation module 1020 may transmit an activation signal to the target wireless device directing the target wireless device to activate the transceiver as described herein with reference to FIGS. 13-16. In some examples, the activation signal may be transmitted using a second mmW frequency range, the second mmW frequency range being different from the first mmW frequency range.

Figure 11:
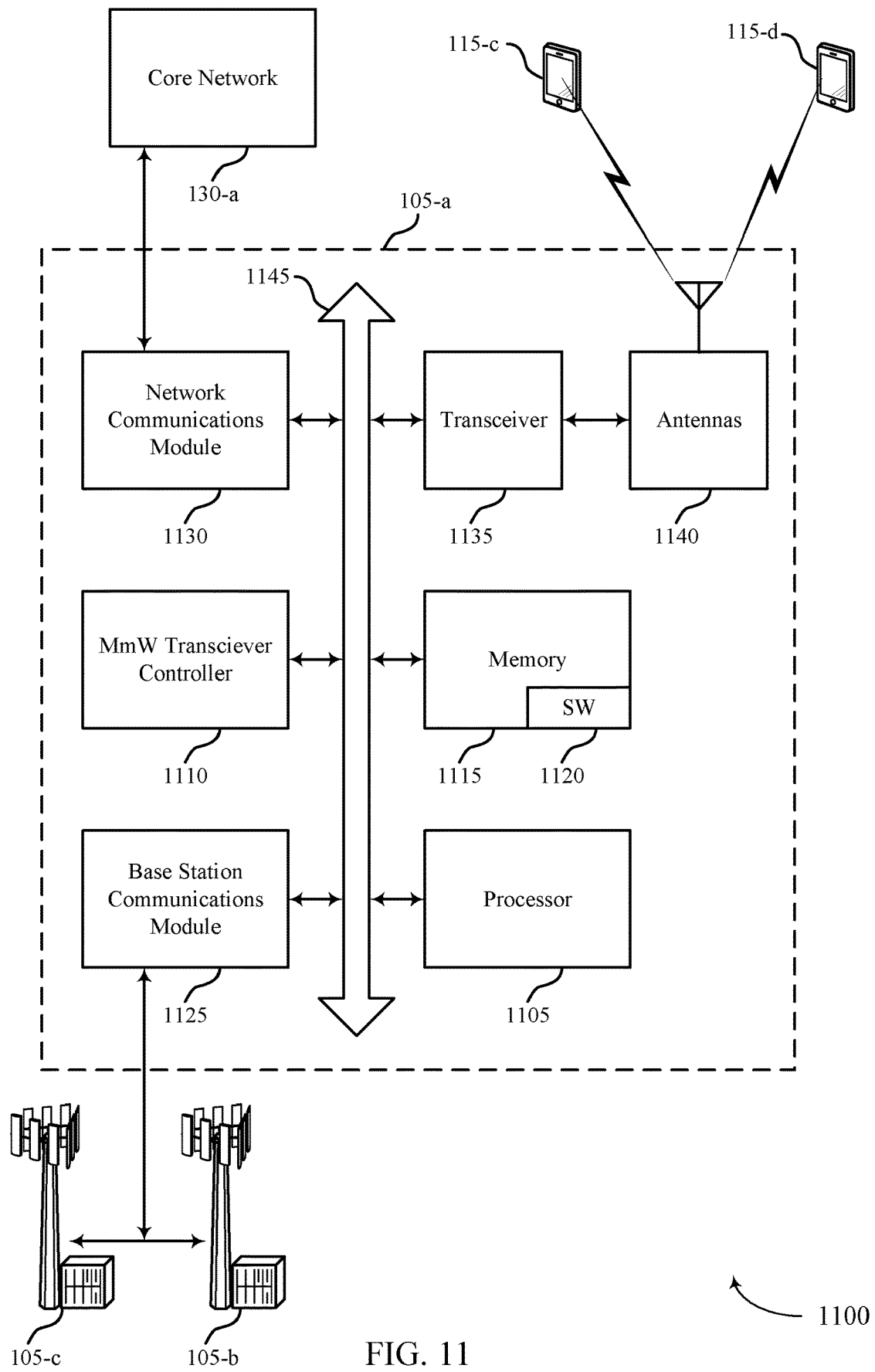
FIG. 11 illustrates a block diagram of a system including a base station that supports multiple array mmW transceiver operation in accordance with various aspects of the present disclosure.

FIG. 11 illustrates a block diagram of a system 1100 including a base station that supports multiple array mmW transceiver operation in accordance with various aspects of the present disclosure. System 1100 may include a base station 105-a which may be an example of a wireless device 800, a wireless device 900, or a base station 105 as described herein with reference to FIGS. 1,8,9,10, and 13-16. Base station 105-a may include a mmW transceiver controller 1110 as described herein with reference to FIGS. 14-16. Base station 105-a may communicate wirelessly with one or more UEs 115 such as UE 115-c or UE 115-d using one or more mmW antenna arrays.

In some cases, base station 105-a may have one or more wired backhaul links. Base station 105-a may have a wired backhaul link (e.g., S1 interface, etc.) to the core network 130. Base station 105-a may also communicate with other base stations 105, such as base station 105-b and base station 105-c via inter-base station backhaul links (e.g., an X2 interface). Each of the base stations 105 may communicate with UEs 115 using the same or different wireless communications technologies. In some cases, base station 105-a may communicate with other base stations such as 105-b or 105-c utilizing base station communication module 1125. In some examples, base station communication module 1125 may provide an X2 interface within an LTE/LTE-A wireless communication network technology to provide communication between some of the base stations 105. In some examples, base station 105-a may communicate with other base stations through core network 130. In some cases, base station 105-a may communicate with the core network 130 through network communications module 1130.

The base station 105-a may include a processor 1105, memory 1115 (including software (SW) 1120), transceiver 1135, and antenna(s) 1140, which each may be in communication, directly or indirectly, with one another (e.g., over bus system 1145). The transceivers 1135 may be configured to communicate bi-directionally, via the antenna(s) 1140, with the UEs 115, which may be multi-mode devices. The transceiver 1135 (or other components of the base station 105-a) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-a may include multiple transceivers 1135, each with one or more associated antennas 1140. The transceiver may be an example of a combined receiver 805 and transmitter 815 of FIG. 8.

The memory 1115 may include RAM and ROM. The memory 1115 may also store computer-readable, computer-executable software code 1120 containing instructions that are configured to, when executed, cause the processor 1105 to perform various functions described herein (e.g., multiple array mmW transceiver operation), selecting coverage enhancement techniques, call processing, database management, message routing, etc.). Alternatively, the software 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing modules, base band processors, radio head controllers, DSPs, and the like.

The base station communications module 1125 may manage communications with other base stations 105. The communications management module may include a controller or scheduler for controlling communications with UEs 115 in cooperation with other base stations 105. For example, the base station communications module 1125 may coordinate scheduling for transmissions to UEs 115 for various interference mitigation techniques such as beamforming or joint transmission.

The components of the wireless device 800, wireless device 900, mmW transceiver controller 810 or system 1100 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 12:
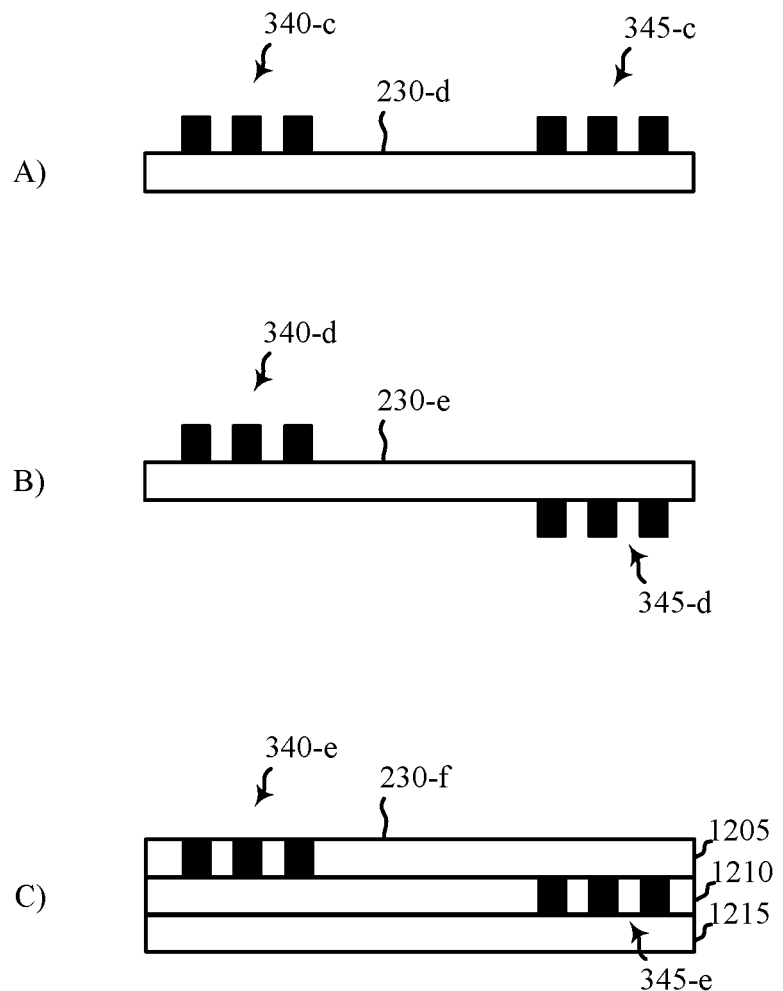
FIG. 12 shows example configurations for two antenna arrays on the dual-transceiver chip module for use in wireless communication, in accordance with various aspects of the present disclosure.

FIG. 12 shows a diagram 1200 of example configurations for two antenna arrays on the dual-transceiver chip module for use in wireless communication, in accordance with various examples. The example configurations for the first and second antenna arrays may illustrate aspects of the UEs 115 of FIG. 1, the devices 205 described with reference to FIGS. 2B and 3B, and/or the dual-transceiver chip modules 230 described with reference to FIGS. 4B and 5B. Generally, the diagram 1200 illustrates various configurations for implementing the first antenna array 340 and the second antenna array 345 of the dual-transceiver chip module.

As discussed above, the first antenna array 340 and the second antenna array 345 are positioned on the same module/PCB as the dual-band RFFE component 335. In some examples, the first antenna array 340 and the second antenna array 345 may be printed on the same die used to form the dual-transceiver chip module 230. The various configurations shown in diagram 1200 show just some examples of placement for the two antenna arrays.

For example, and referring first to configuration A), the dual-transceiver chip module 230-*d* may include the first antenna array 340-*c* and the second antenna array 345-*c*. In configuration A), the first and second antenna arrays are positioned on a same side (shown as the top side) of the dual-transceiver chip module 230-*d*. Moreover, the first and second antenna arrays are positioned on opposing ends of the top of the dual-transceiver chip module 230-*d*.

As another example and referring to configuration B), the dual-transceiver chip module 230-*e* may include the first antenna array 340-*d* and the second antenna array 345-*d*. In configuration B), the first and second antenna arrays are positioned on opposing sides (shown as the top and bottom) of the dual-transceiver chip module 230-*e*. Although configuration B) shows the first and second antenna arrays are positioned on opposing ends of the dual-transceiver chip module 230-*e*, it is to be understood that the first and second antenna arrays may be aligned on the opposing sides such that the first antenna array 340-*d* is directly above (or below) the second antenna array 345-*d*. Other spacing configurations may also be utilized.

As yet another example and referring to configuration C), the dual-transceiver chip module 230-*f* may include the first antenna array 340-*e* and the second antenna array 345-*e*. In configuration C), the dual-transceiver chip module 230-*f* may be formed of multiple layers, e.g., layers 1205, 1210, and 1215 (although more or fewer layer may also be used. In configuration C), the first and second antenna arrays are positioned on different layers (shown as layers 1205 and 1210) of the dual-transceiver chip module 230-*f*. Although configuration C) shows the first and second antenna arrays are positioned on layers 1205 and 1210 of the dual-transceiver chip module 230-*f*, it is to be understood that the first and second antenna arrays may be positioned on other layers, in one layer and on a surface, and the like, as well as being aligned such that the first antenna array 340-*e* is directly above (or below) the second antenna array 345-*e*. Other spacing configurations may also be utilized.

Figure 13:
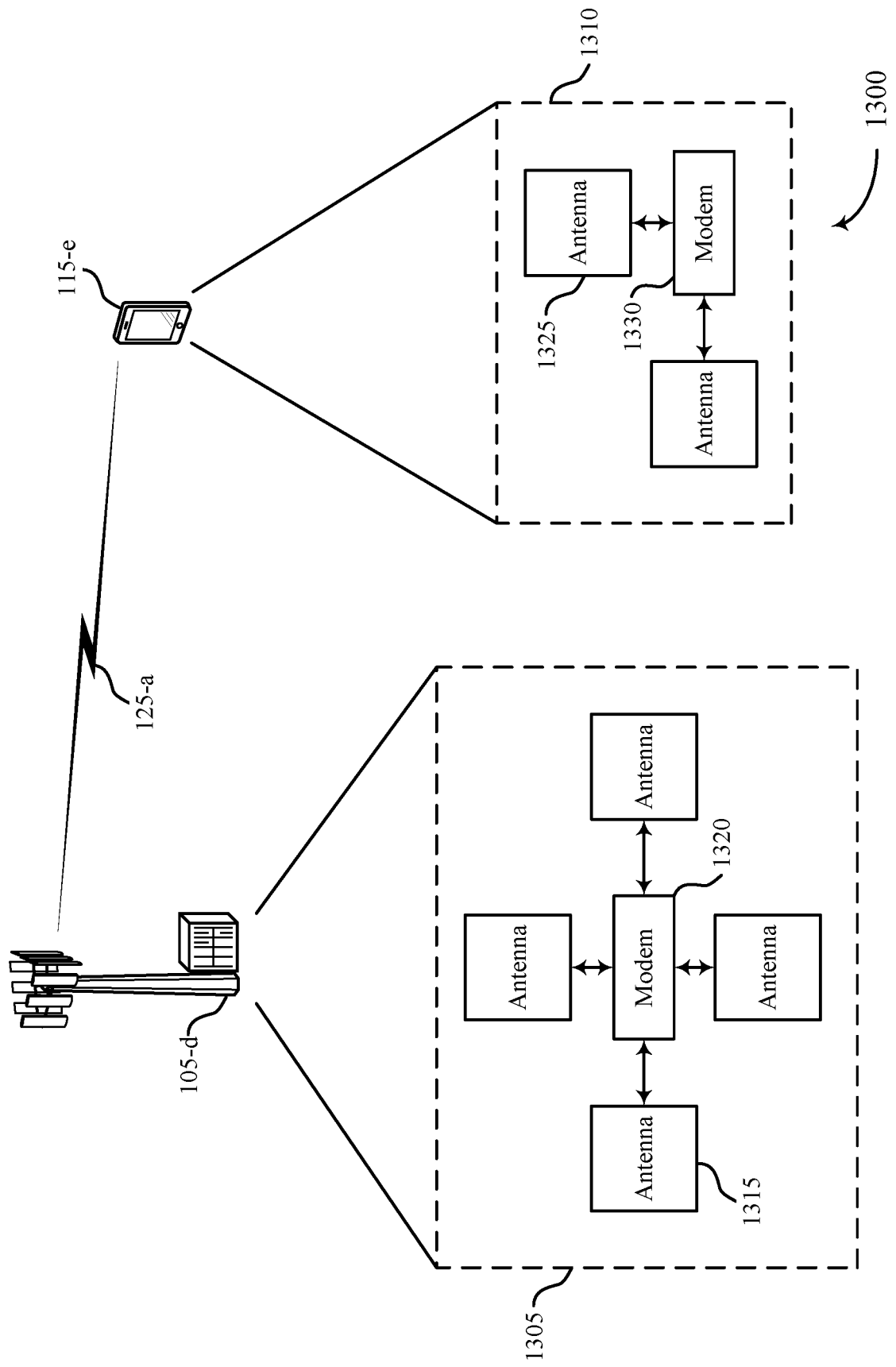
FIG. 13 illustrates an example of a wireless communications subsystem that supports multiple array mmW transceiver operation in accordance with various aspects of the present disclosure.

Accordingly, it can be appreciated that various placement options may be available for positioning the first and second antenna arrays of the dual-transceiver chip module. This may provide for flexibility in positioning the dual-transceiver chip module on or within the device (e.g., UE 115) to avoid interference caused by surrounding components and/or user interference. FIG. 13 illustrates an example of a wireless communications subsystem 1300 for multiple array mmW transceiver operation in accordance with various aspects of the present disclosure. Wireless communications subsystem 1300 may include a base station (BS) 105-*d*, which may be an example of a base station 105 described herein with reference to FIG. 1. Wireless communications subsystem 1300 may also include a UE 115-*e*, which may be an example of a UE 115 described herein with reference to FIG. 1.

The BS 105-*d* may include a BS transceiver 1305. In some cases, the BS transceiver 1305 may include a number of antenna arrays 1315, such as four, which may be arranged on different sides of the device for spatial diversity. The antenna arrays 1315 may be used to transmit/receive signals which may be modulated/demodulated using a modem 1320. In some cases, a single modem 1320 may be used for a number of antenna arrays 1315. Alternatively, a number of modems 1320 may be included in the BS transceiver 1305, such as to operate a number of antenna arrays 1315. The antenna arrays 1315 may be operable at a number of bands, such as 28 GHz, 40 GHz, and/or 60 GHz bands. In some cases, different arrays within the antenna array 1315 may operate, or be operable, using different frequency bands or the same frequency bands. The antenna arrays 1315 may each include a radio frequency front end bus (RFFE), such as for communication with the modem 1320 or other BS 105-*d* components, and/or a number of antennas, such as configured in an array. The modem 1320 may be operable at a number of bands, such as 28 GHz, 40 GHz, and/or 60 GHz bands. In some cases, the BS transceiver 1305 may include a number of modems 1320 to support multiple frequency bands. in some cases, each antenna array for one mmW frequency band (e.g., 28 GHz or 40 GHz) may be paired with another array designed for operation in another frequency band (such as 60 GHz).

The BS 105-*d* may communicate with the UE 115-*e* using a communication link 125-*a*, which may be an example of the communication links 125 of FIG. 1. In some cases, the UE 115-*e* may include a UE transceiver 1310. The UE transceiver 1310 may include a number of antenna arrays 1325, such as two. The antenna arrays 1325 may be used to transmit/receive signals which may be modulated/demodulated using a modem 1330. In some cases, a single modem 1330 may be used for a number of antenna arrays 1325. Alternatively, a number of modems 1330 may be included in the UE transceiver 1310, such as to operate a number of antenna arrays 1325. In some cases, the antenna arrays 1325 of the UE transceiver 1310 may include some or all of the features of characteristics of the antenna arrays 1315 of the BS transceiver 1305. In some cases, the modem 1330 of the UE transceiver 1310 may include some or all of the features or characteristics of the modem 1320 of the BS transceiver 1305. In some cases, the link throughput between the BS 105-*d* and UE 115-*e* may depend on both the number and arrangement of antennas at both devices.

The BS 105-*d* may establish or reestablish a connection with the UE 115-*e*. If the UE 115-*e* was previously in communication with the BS 105-*d*, the BS 105-*d* may attempt to reestablish the connection by starting with the most recently used antenna, or sector. If the UE 115-*e* and BS 105-*d* are attempting to establish a new connection, the BS 105-*d* may attempt to establish connection by starting with an initial antenna, or sector. The initial antenna array may be determined in a number of ways, such as in quasi-real-time, periodically, predefined, through signaling, or based on past performance, priorities (e.g., one antenna prioritized over another), etc. Upon choosing an antenna array to start with, a beam sweep may be performed, such as through all beams at the antenna array. Each link may be analyzed to determine whether link characteristics are sufficient for an expected or required throughput. If the link characteristics are sufficient, the array may be characterized as a preferred array, and may be used for communication between the BS 105-*d* and the UE 115-*e*. If the link characteristics are not sufficient, or preferred, another array may be chosen and a beam sweep through all beams of the new array may be performed, such as until an array meets the preferred or required link characteristics. The new array may be chosen in a number of ways, such as sequentially, in a predefined pattern, through signaling, based on past performance, etc.

In some cases, such as when a 60 GHz operating band is available, a certain band or antenna array 1315 or 1325 may be prioritized over others. For example, an antenna array operating at 60 GHz may be preferable to an antenna array operating at 28 GHz or 40 GHz. As a result, the antenna array operating at 60 GHz may be beam swept before the other antenna arrays, or if an antenna array is capable of operating across multiple bands, the antenna array may attempt to operate satisfactorily at a preferred band, such as 60 GHz, before attempting to operate satisfactorily at another band.

Figure 14:
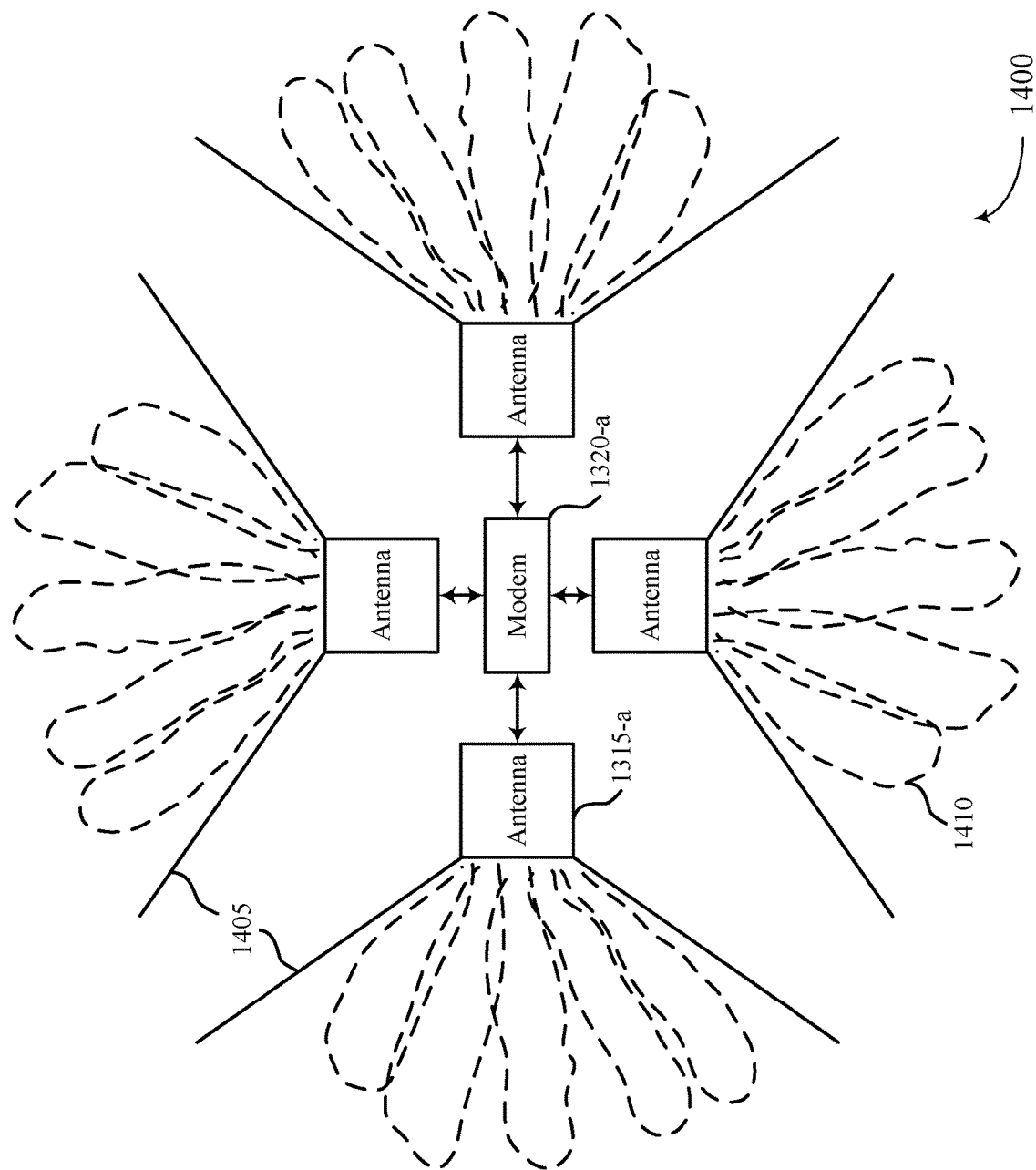
FIG. 14 illustrates an example of a beam configuration that supports multiple array mmW transceiver operation in accordance with various aspects of the present disclosure.

FIG. 14 illustrates an example of a beam configuration 1400 for multiple array mmW transceiver operation in accordance with various aspects of the present disclosure. Beam configuration 1400 may represent the antenna array configuration of a base station 105 or a UE 115 as described herein with reference to FIGS. 1 and 13.

In some cases, the antenna array 1315-a may be similar to, or the same as, the antenna arrays 1315 and/or the antenna arrays 1325 of FIG. 13. The modem 1320-a may be similar to, or the same as, the modem 1320 and/or the modem 1330 of FIG. 13. Further, the beam configuration 1400 may be included in a BS, such as BS 105 in FIG. 1, a UE, such as UE 115 in FIG. 1, or another network component. In some cases, antenna array 1315-a may be paired or collocated with another array designed for operation in another frequency band (e.g., it may be a 28 GHz or 40 GHz array paired with a 60 GHz array)

Each antenna array 1315-a may include a coverage area 1405. The coverage area 1405 may be predefined, signaled, determined, or based on capabilities of the antenna array 1315-a, past performance, etc. In some cases, the introduction of additional antenna arrays 1315-a may reduce the coverage area 1405 of each antenna array 1315-a. For example, with a small number of antenna arrays 1315-a, such as one or two, the coverage area 1405 may be large, such as 180°. Further, with additional antenna arrays 1315-a the coverage area 1405 may be reduced, such as to 102.8°.

The beam configuration 1400 may be used to perform beam sweeping, such as to detect link conditions and establish a connection with another wireless device. In some cases, an antenna array 1315-a performs beam sweeping. The antenna array 1315-a may create a number of beams 1410, which may be directional signals, such as signals which occupy a subset of the coverage area 1405 of the antenna array 1315-a. The antenna array 1315-a may sweep through a number of beams 1410, such as while monitoring link characteristics, and may determine whether a beam 1410 has the desired or required link characteristics. The spatial coverage of a beam 1410 and/or number of beams 1410 may be predefined, signaled, determined periodically, determined in quasi-real-time, or determined based on antenna array 1315-a capabilities, past performance, etc. An antenna array 1315-a may sweep through beams 1410 sequentially or may progress through beams 1410 in another way, such as non-sequentially.

Figure 15:
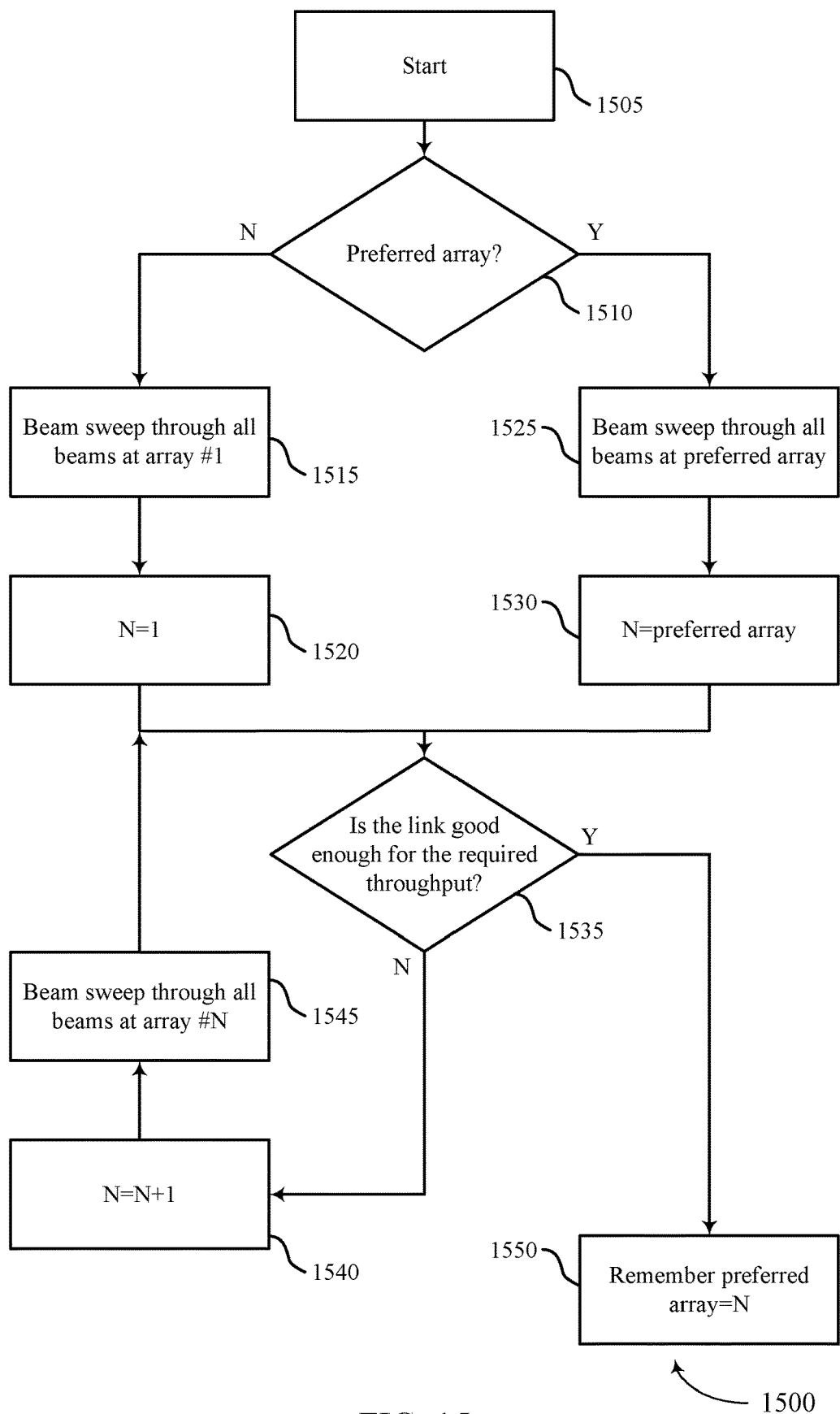
FIG. 15 illustrates an example of a beam sweeping decision flow that supports multiple array mmW transceiver operation in accordance with various aspects of the present disclosure.

FIG. 15 illustrates an example of a beam sweeping decision flow 1500 for multiple array mmW transceiver operation in accordance with various aspects of the present disclosure. Beam sweeping decision flow 1500 may be performed by a base station 105 or UE 115, as described herein with reference to FIGS. 1 and 13-14.

At block 1505, a wireless device may initiate a beam selection operation. In some examples a first array of the plurality of antenna arrays is located at an opposite side of the mmW base station relative to a second array of the plurality of antenna arrays based at least in part on a spatial diversity configuration. In some examples at least one array of the plurality of antenna arrays is configured for operation in a mmW frequency range. In some examples the at least one array is configured for operation in a first mmW frequency range that operates at or about 28 GHz or in a second mmW frequency range that operates at or about 40 GHz. In some examples the at least one array is paired with at least one adjacent array configured for operation in a third mmW frequency range that operates at or about 60 GHz. In some examples each of the plurality of antenna arrays is configured with an increased number of antenna elements. The device may then perform a beam sweep operation on beams created by one or more arrays of a set of antenna arrays.

At block 1510, a determination may be made, such as by a BS 105, a UE 115, or another network component, whether there is a preferred array to use. The preferred array may be an array most recently used, or an array which exhibited preferred link characteristics, if a connection has previously been established and is being reestablished. In some cases, it may be assumed that the receiving device, such as a UE 115, does not change sector often and therefore the preferred array is likely to exhibit the preferred link characteristics.

At block 1515, if it is determined that there is not a preferred array at block 1510, a beam sweep may be performed through beams at a first array.

At block 1520, a variable, N, may store an identifier of the first array to be swept.

At block 1525, if it is determined that there is a preferred array at block 1510, a beam sweep may be performed through beams of the preferred array.

At block 1530, the variable, N, may store an identifier of the preferred array.

At block 1535, a determination may be made, such as by a BS 105, a UE 115, or another network component, whether link characteristics of a link determined during the beam sweep of blocks 1515 or 1525 meet at least one criterion, such as exceeding a minimum value. For example, the minimum value may be a SNR, a channel quality information (CQI) value, a bandwidth, a throughput, etc.

At block 1540, if it is determined that the link characteristics do not meet the at least one criterion, N may be changed, such as incremented by one, to another array, such as array N+1.

At block 1545, a beam sweep may be performed through beams of array N. The process may return to block 1535.

At block 1550, if it is determined that the link characteristics meet the at least one criterion, the array may be remembered, such as stored in memory, as a preferred array. Subsequently, communications may occur using the preferred array. Thus, the device may select an array from the set of antenna arrays for communication with a target wireless device based on the beam sweep operation.

Figure 16:
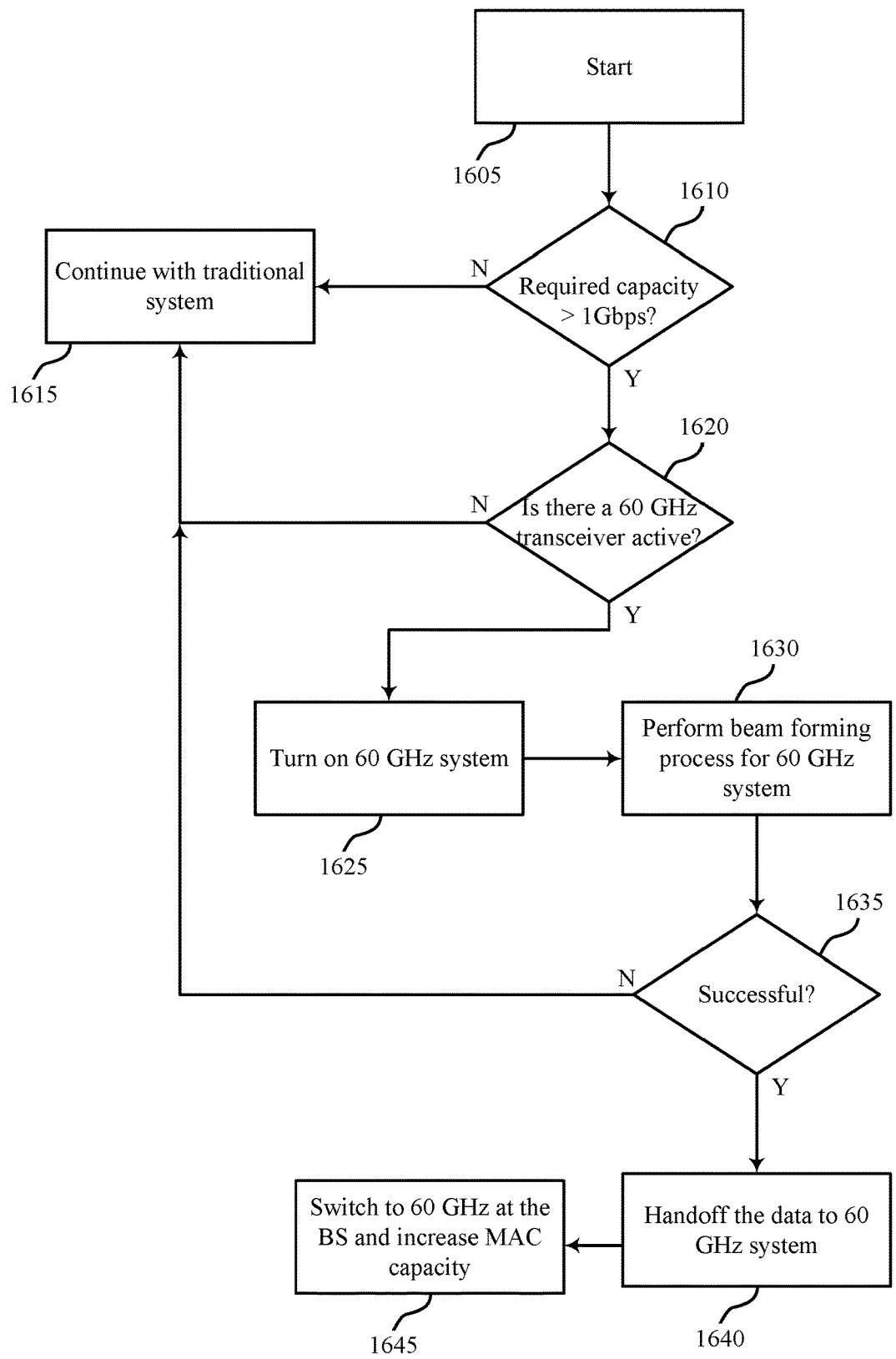
FIG. 16 illustrates an example of a transceiver selection process flow that supports multiple array mmW transceiver operation in accordance with various aspects of the present disclosure.

FIG. 16 illustrates an example of a transceiver selection process flow 1600 for multiple array mmW transceiver operation in accordance with various aspects of the present disclosure. Transceiver selection process flow 1600 may be performed by a base station 105 as described herein with reference to FIGS. 1 and 13-14.

At block 1605, a device may initiate a process for selecting a mmW transceiver. For example, a base station 105 may begin a process for determining whether to switch communications from one mmW frequency range to another in order to increase the throughput of a communications link.

At block 1610, a determination may be made, such as by a B S 105, a UE 115, or another network component, whether a required or preferred link characteristic involves use of an enhanced mmW antenna arrangement (e.g., a 60 GHz system), such as whether required capacity exceeds 1 Gbps. Thus, the device may determine that a target throughput is greater than a threshold.

At block 1615, if it is determined that a link characteristic does not involve use of an enhanced mmW antenna arrangement, then the process may continue with a traditional system. For example, if the required capacity is less than 1 Gbps then a connection may be established using a 28 GHz or 40 GHz system, similar to the process described in FIG. 14 or 15. For example, a base station 105 may select an initial array from the set of antenna arrays for the beam sweep operation, wherein performing the beam sweep operation includes sweeping through each of a first set of beams associated with the initial array. The base station 105 may select a subsequent array from the set of antenna arrays for the beam sweep operation, wherein performing the beam sweep operation includes sweeping through each of a second set of beams associated with the subsequent array. The base station 105 may determine that a channel parameter associated with the array satisfies a threshold condition based on the beam sweep operation, such that selecting the array based on the determination.

At block 1620, if it is determined that a required or preferred link characteristic involves the use of an enhanced mmW antenna arrangement, then a determination may be made, such as by a BS 105, a UE 115, or another network component, whether there is sufficient hardware to operate using the enhanced mmW antenna arrangement. For example, a BS 105 may determine whether a UE 115 has a transceiver active that operates at or about 60 GHz. If there is not sufficient hardware to operate using the enhanced mmW antenna arrangement, the process may return to block 1615. Thus, the device may determine that a transceiver for the target wireless device may be available, the transceiver operating in a first mmW frequency range.

At block 1625, if it is determined that there is sufficient hardware to operate using the enhanced mmW antenna arrangement, the hardware may be activated. For example, a UE 115 may be prompted to turn on, or initiate, a second transceiver such as one based on a 60 GHz system. In some cases, the device may transmit an activation signal to the target wireless device directing the target wireless device to activate the transceiver.

At block 1630, a beam forming process may be performed for the enhanced mmW antenna arrangement, such as for a 60 GHz system. In some cases, a beam forming process may be described in FIG. 14 or 15.

At block 1635, a determination may be made, such as by a BS 105, a UE 115, or another network component, whether the beam forming process of block 1630 was successful. If it is determined that the beam forming process of block 1630 was not successful, the process may return to block 1615.

At block 1640, if it is determined that the beam forming process of block 1630 was successful, a BS 105, a UE 115, or another network component may handoff data to the enhanced mmW antenna arrangement, such as a 60 GHz system. As such, the enhanced mmW antenna arrangement may be used for subsequent communications. Thus, the device may transmit a handoff signal to the target wireless device based on the determination that the target throughput may be greater than the threshold, the determination that the transceiver may be available, and the beam sweep operation, wherein the handoff signal directs the target wireless device to use the transceiver for communication.

Figure 17:
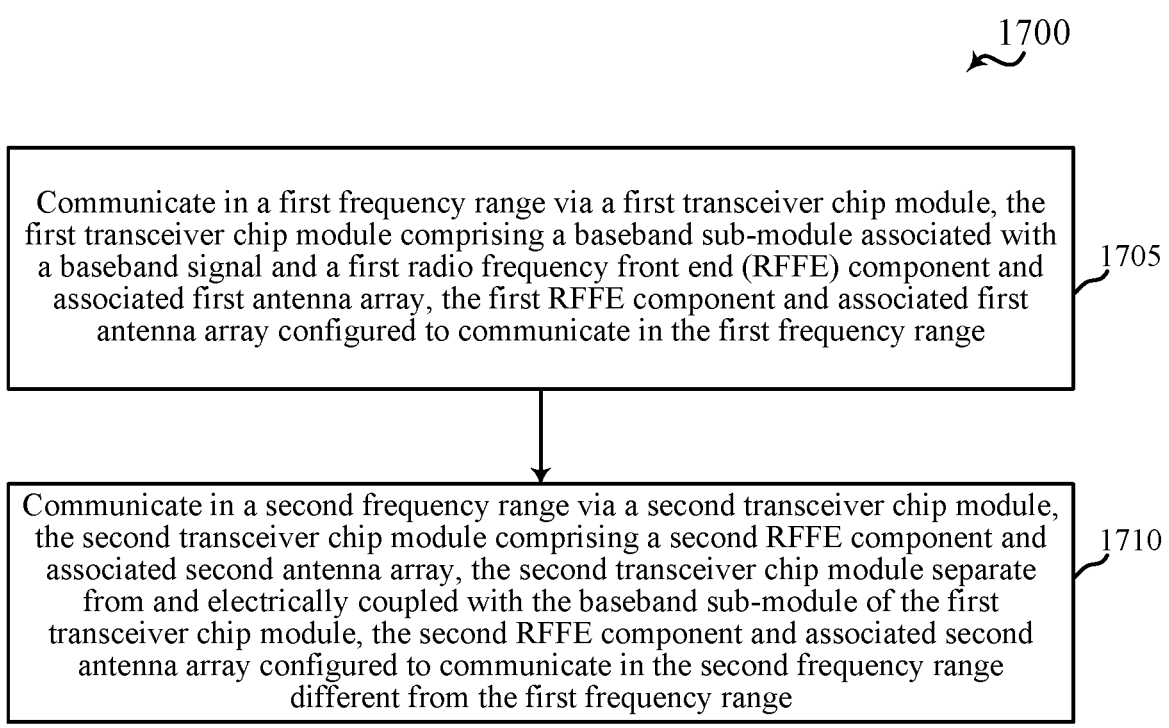
FIG. 17 is a flow chart illustrating an example of a method for wireless communication, in accordance with various aspects of the present disclosure.

At block 1645, a BS 105 or UE 115 may be switched to the enhanced mmW antenna arrangement. As such, the two communicating devices, such as a BS 105 and a UE 115, may communicate with one another using the enhanced mmW antenna arrangement. Further, communication parameters may be adjusted, such as based on operating using the enhanced mmW antenna arrangement. For example, the media access control (MAC) layer capacity may be increased by a BS 105, such as if a 60 GHz system is used. FIG. 17 is a flow chart illustrating an example of a method 1700 for wireless communication, in accordance with various aspects of the present disclosure. For clarity, the method 1700 is described below with reference to aspects of one or more of the UEs 115 described with reference to FIGS. 1 and 6, and/or aspects of one or more of the devices 205 described with reference to FIGS. 2A-5B. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include communicating in a first frequency range via a first transceiver chip module. The first transceiver chip module may include a baseband sub-module associated with a baseband signal and a first RFFE component and associated first antenna array. The first RFFE component and associated first antenna array may be configured to communicate in the first frequency range. The first RFFE component may be a ZIF transceiver architecture.

At block 1710, the method 1700 may include communicating in a second frequency range via a second transceiver chip module. The second transceiver chip module may include a second RFFE component and associated second antenna array. The second transceiver chip module may be separate from and electrically coupled with the baseband sub-module of the first transceiver chip module. The second RFFE component and associated second antenna array may be configured to communicate in the second frequency range. The second frequency range may be different from the first frequency range. The second RFFE component may be a SIF transceiver architecture.

The operation(s) at block 1705 and/or 1710 may be performed using the first transceiver chip module 215 and/or the second transceiver chip module 220 described with reference to FIGS. 2A, 3A, 4A, and 5A.

Thus, the method 1700 may provide for wireless communication. It should be noted that the method 1700 is just one implementation and that the operations of the method 1700 may be rearranged or otherwise modified such that other implementations are possible.

Figure 18:
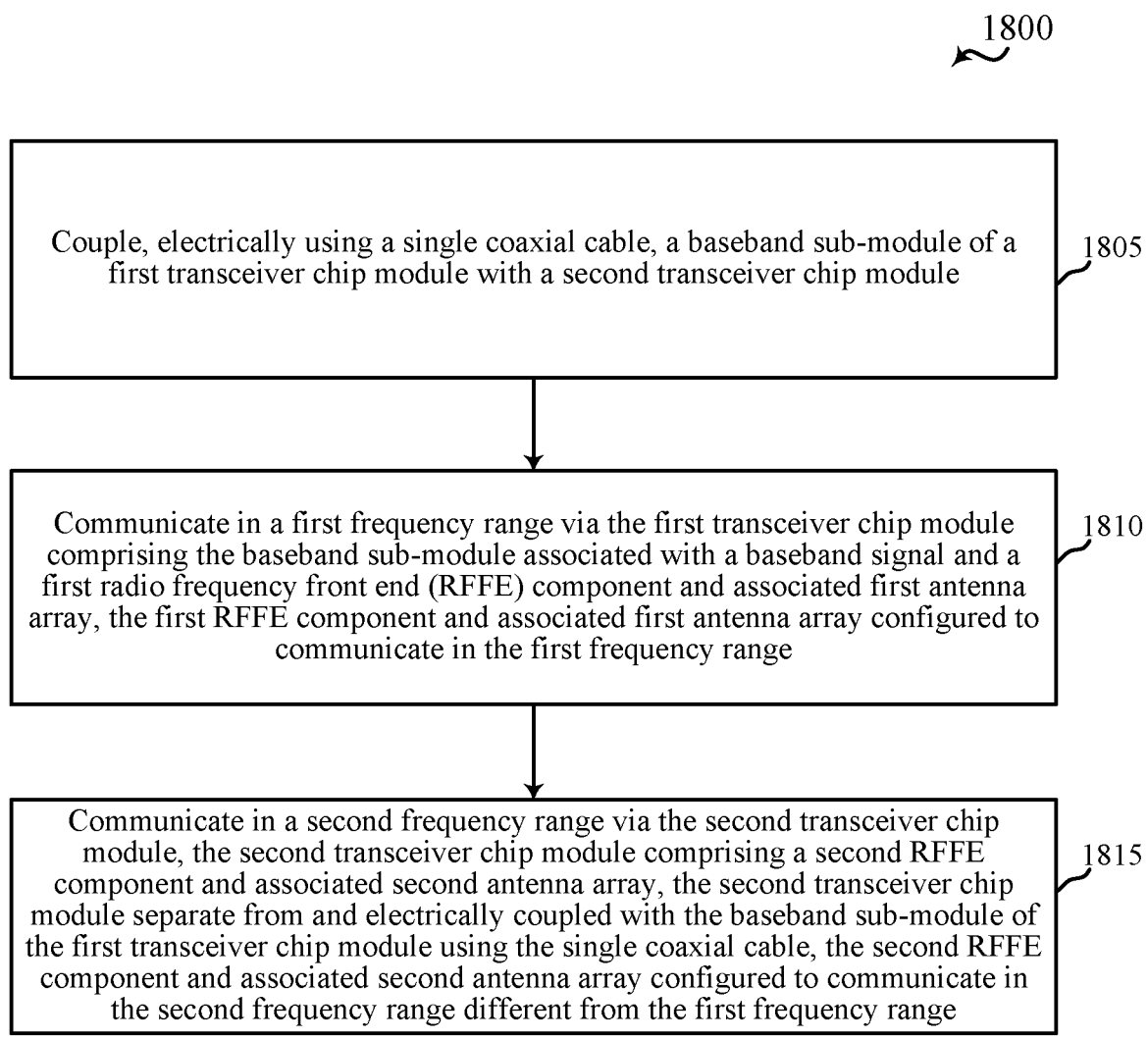
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the UEs 115 described with reference to FIGS. 1 and 6, and/or aspects of one or more of the devices 205 described with reference to FIGS. 2A-5B. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include coupling, electronically using a single coaxial cable, a baseband sub-module of a first transceiver chip module with a second transceiver chip module. The coaxial cable may be adapted to carry wideband signals.

At block 1810, the method 1800 may include communicating in a first frequency range via the first transceiver chip module. The first transceiver chip module may include the baseband sub-module associated with a baseband signal and a first RFFE component and associated first antenna array.

The first RFFE component and associated first antenna array may be configured to communicate in the first frequency range. The first RFFE component may be a ZIF transceiver architecture.

At block 1815, the method 1800 may include communicating in a second frequency range via the second transceiver chip module. The second transceiver chip module may include a second RFFE component and associated second antenna array. The second transceiver chip module may be separate from and electrically coupled with the baseband sub-module of the first transceiver chip module using the single coaxial cable. The second RFFE component and associated second antenna array may be configured to communicate in the second frequency range. The second frequency range may be different from the first frequency range. The second RFFE component may be a SIF transceiver architecture.

The operation(s) at block 1805, 1810 and/or 1815 may be performed using the first transceiver chip module 215 and/or the second transceiver chip module 220 described with reference to FIGS. 2A, 3A, 4A, and 5A.

Thus, the method 1800 may provide for wireless communication. It should be noted that the method 1800 is just one implementation and that the operations of the method 1800 may be rearranged or otherwise modified such that other implementations are possible.

In some examples, aspects from two or more of the methods 1700 and 1800 may be combined. It should be noted that the methods 1700 and 1800 are just example implementations, and that the operations of the methods 1700 and 1800 may be rearranged or otherwise modified such that other implementations are possible.

Figure 19:
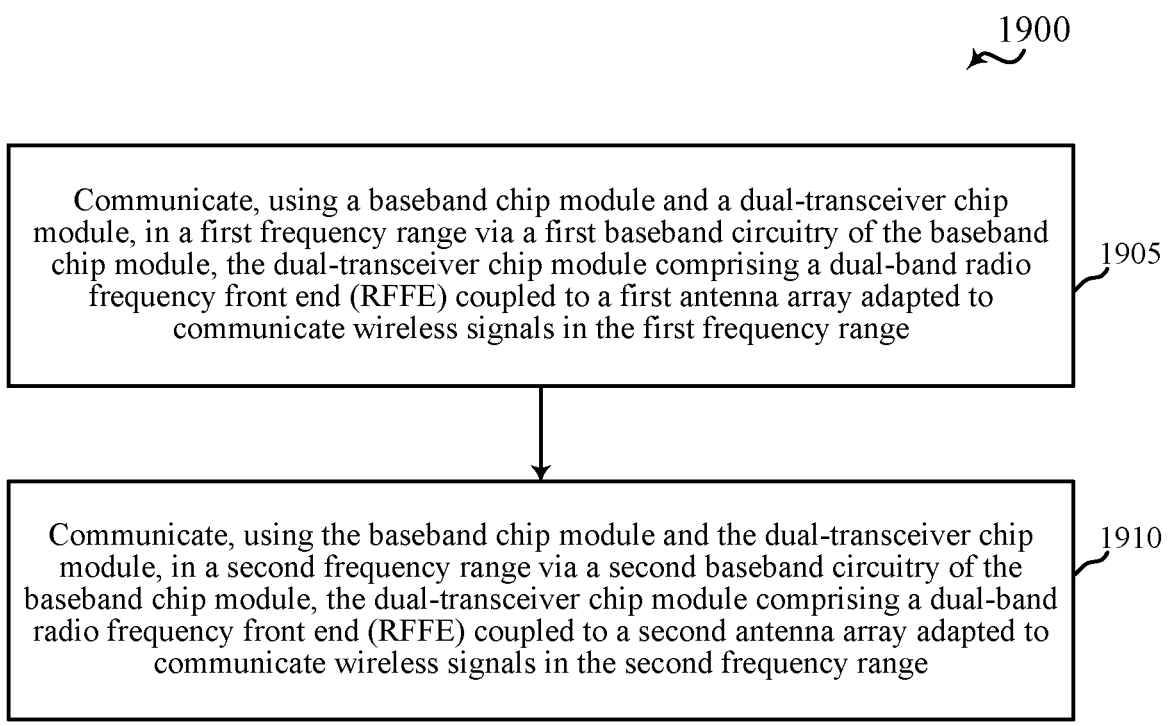
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the UEs 115 described with reference to FIGS. 1 and 7, and/or aspects of one or more of the devices 205 described with reference to FIGS. 2A-5B. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include communicating, using a baseband chip module and a dual-transceiver chip module, in a first frequency range via a first baseband circuitry of the baseband chip module. The dual-transceiver chip module may include a dual-band RFFE component coupled to a first antenna array adapted to communicate wireless signals in the first frequency range.

At block 1910, the method 1900 may include communicating, using the baseband chip module and the dual-transceiver chip module, in a second frequency range via a second baseband circuitry of the baseband chip module. The dual-transceiver chip module may include the dual-band RFFE component coupled to a second antenna array adapted to communicate wireless signals in the second frequency range.

The operation(s) at block 1905 and/or 1910 may be performed using the baseband chip module 225 and/or the dual-transceiver chip module 230 described with reference to FIGS. 2B, 3B, 4B, and 5B.

Thus, the method 1900 may provide for wireless communication. It should be noted that the method 1900 is just one implementation and that the operations of the method 1900 may be rearranged or otherwise modified such that other implementations are possible.

Figure 20:
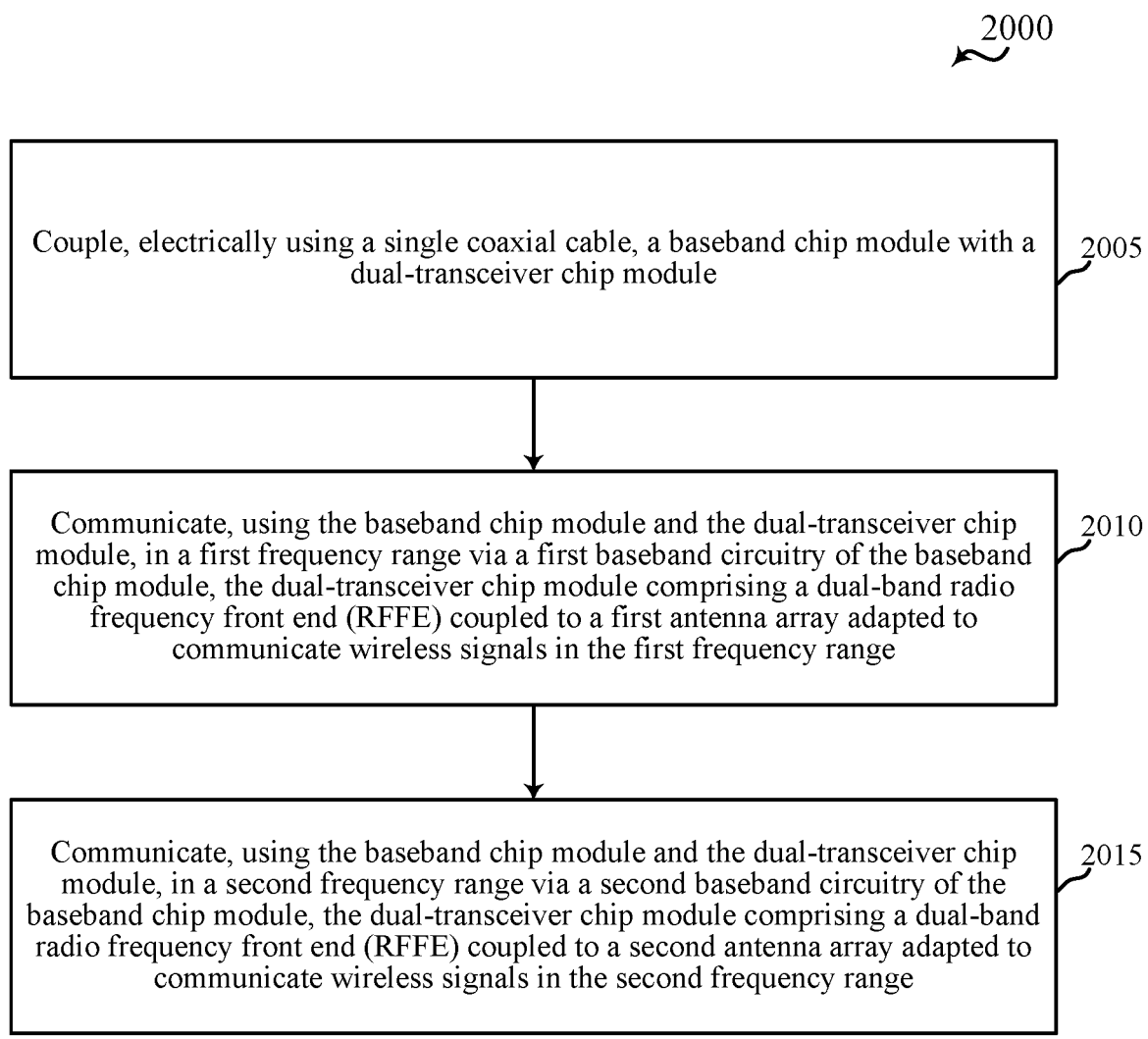
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the UEs 115 described with reference to FIGS. 1 and 7, and/or aspects of one or more of the devices 205 described with reference to FIGS. 2A-5B. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include coupling, electrically using a single coaxial cable, a baseband chip module with a dual-transceiver chip module. The coaxial cable may be adapted to carry high bandwidth signals between the baseband chip module and the dual-transceiver chip module.

At block 2010, the method 2000 may include communicating, using the baseband chip module and the dual-transceiver chip module, in a first frequency range via a first baseband circuitry of the baseband chip module. The dual-transceiver chip module may include a dual-band RFFE component coupled to a first antenna array adapted to communicate wireless signals in the first frequency range.

At block 2015, the method 2000 may include communicating, using the baseband chip module and the dual-transceiver chip module, in a second frequency range via a second baseband circuitry of the baseband chip module. The dual-transceiver chip module may include the dual-band RFFE component coupled to a second antenna array adapted to communicate wireless signals in the second frequency range.

The operation(s) at block 2005,2010, and/or 2015 may be performed using the baseband chip module 225 and/or the dual-transceiver chip module 230 described with reference to FIGS. 2B, 3B, 4B, and 5B.

Thus, the method 2000 may provide for wireless communication. It should be noted that the method 2000 is just one implementation and that the operations of the method 2000 may be rearranged or otherwise modified such that other implementations are possible.

In some examples, aspects from two or more of the methods 1900 and 2000 may be combined. It should be noted that the methods 1900 and 2000 are just example implementations, and that the operations of the methods 1900 and 2000 may be rearranged or otherwise modified such that other implementations are possible.

Figure 21:
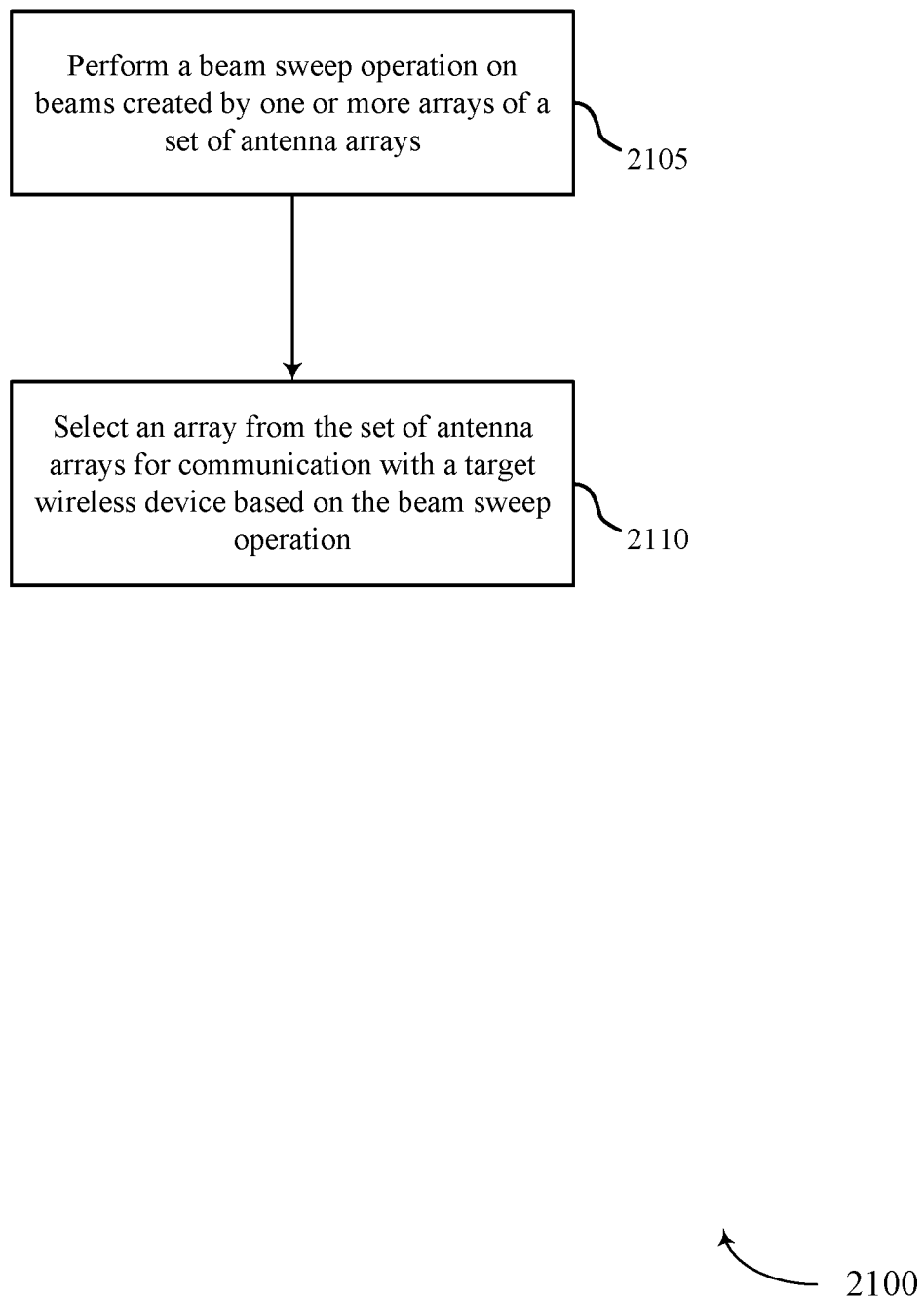
FIG. 21 illustrates a method for multiple array mmW transceiver operation in accordance with various aspects of the present disclosure.

FIG. 21 shows a flowchart illustrating a method 2100 for multiple array mmW transceiver operation in accordance with various aspects of the present disclosure. The operations of method 2100 may be implemented by a base station 105 or its components as described with reference to FIGS. 1,11, and 13-16. For example, the operations of method 2100 may be performed by the mmW transceiver controller 810 as described with reference to FIGS. 8-11. In some examples, a base station 105 may execute a set of codes to control the functional elements of the base station 105 to perform the functions described below. Additionally or alternatively, the base station 105 may perform aspects the functions described below using special-purpose hardware.

At block 2105, the base station 105 may perform a beam sweep operation on beams created by one or more arrays of a plurality of antenna arrays as described herein with reference to FIGS. 13-16. In certain examples, the operations of block 2105 may be performed by the beam sweeper 905 as described herein with reference to FIG. 9.

At block 2110, the base station 105 may select an array from the plurality of antenna arrays for communication with a target wireless device based at least in part on the beam sweep operation as described herein with reference to FIGS. 13-16. In certain examples, the operations of block 2110 may be performed by the array selector 910 as described herein with reference to FIG. 9.

Figure 22:
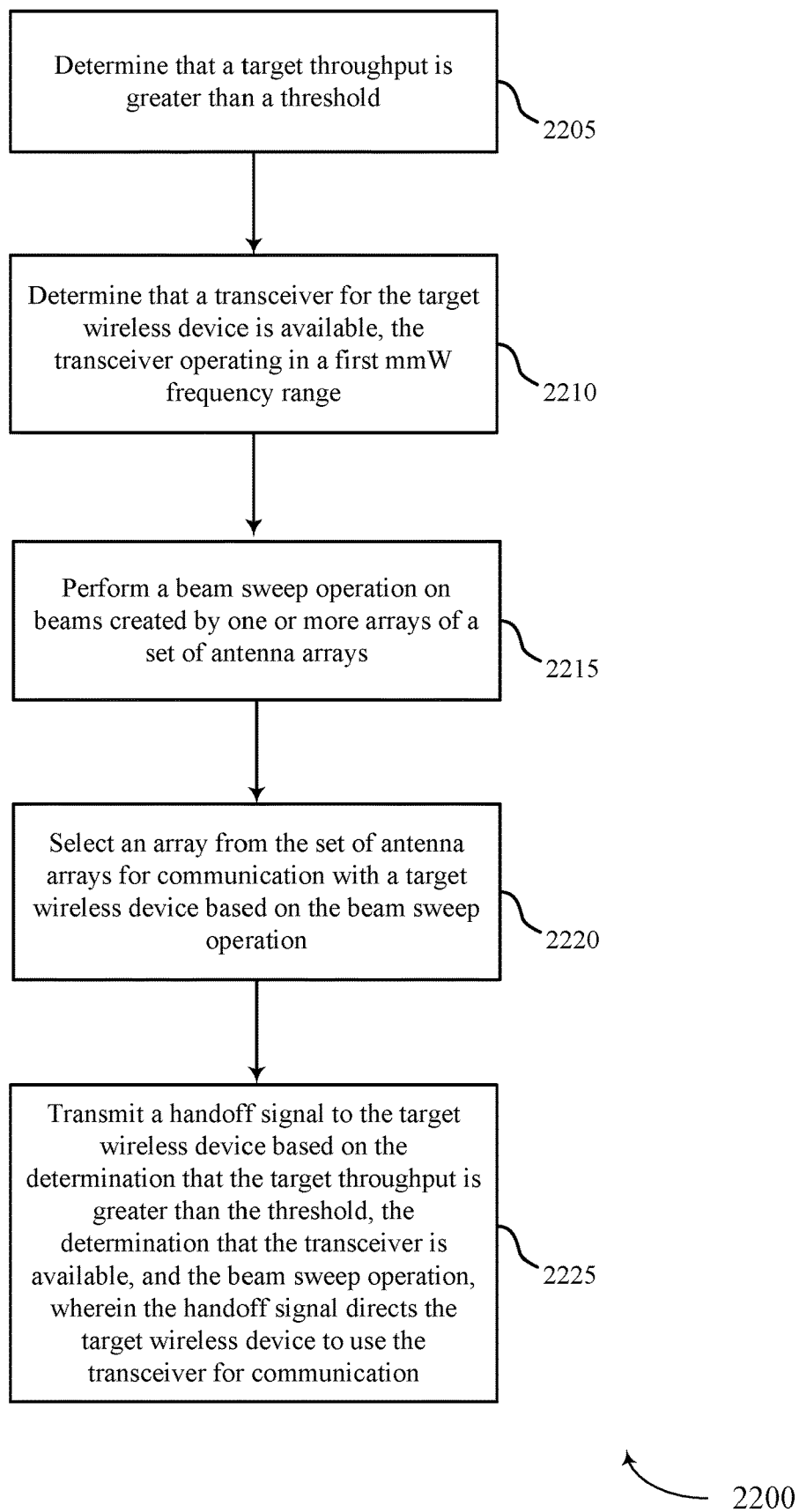
FIG. 22 illustrates a method for multiple array mmW transceiver operation in accordance with various aspects of the present disclosure.

FIG. 22 shows a flowchart illustrating a method 2200 for multiple array mmW transceiver operation in accordance with various aspects of the present disclosure. The operations of method 2200 may be implemented by a base station 105 or its components as described with reference to FIGS. 1,11, and 13-16. For example, the operations of method 2200 may be performed by the mmW transceiver controller 810 as described with reference to FIGS. 8-11. In some examples, a base station 105 may execute a set of codes to control the functional elements of the base station 105 to perform the functions described below. Additionally or alternatively, the base station 105 may perform aspects the functions described below using special-purpose hardware. The method 2200 may also incorporate aspects of method 2100 of FIG. 21.

At block 2205, the base station 105 may determine that a target throughput is greater than a threshold as described herein with reference to FIGS. 13-16. In certain examples, the operations of block 2205 may be performed by the throughput monitor 1005 as described herein with reference to FIG. 10.

At block 2210, the base station 105 may determine that a transceiver for the target wireless device is available, the transceiver operating in a first mmW frequency range as described herein with reference to FIGS. 13-16. In certain examples, the operations of block 2210 may be performed by the transceiver availability module 1010 as described herein with reference to FIG. 10.

At block 2215, the base station 105 may perform a beam sweep operation on beams created by one or more arrays of a plurality of antenna arrays as described herein with reference to FIGS. 13-16. In certain examples, the operations of block 2215 may be performed by the beam sweeper 905 as described herein with reference to FIG. 9.

At block 2220, the base station 105 may select an array from the plurality of antenna arrays for communication with a target wireless device based at least in part on the beam sweep operation as described herein with reference to FIGS. 13-16. In certain examples, the operations of block 2220 may be performed by the array selector 910 as described herein with reference to FIG. 9.

At block 2225, the base station 105 may transmit a handoff signal to the target wireless device based at least in part on the determination that the target throughput is greater than the threshold, the determination that the transceiver is available, and the beam sweep operation, wherein the handoff signal directs the target wireless device to use the transceiver for communication as described herein with reference to FIGS. 13-16. In certain examples, the operations of block 2225 may be performed by the transceiver handoff module 1015 as described herein with reference to FIG. 10.

Figure 23:
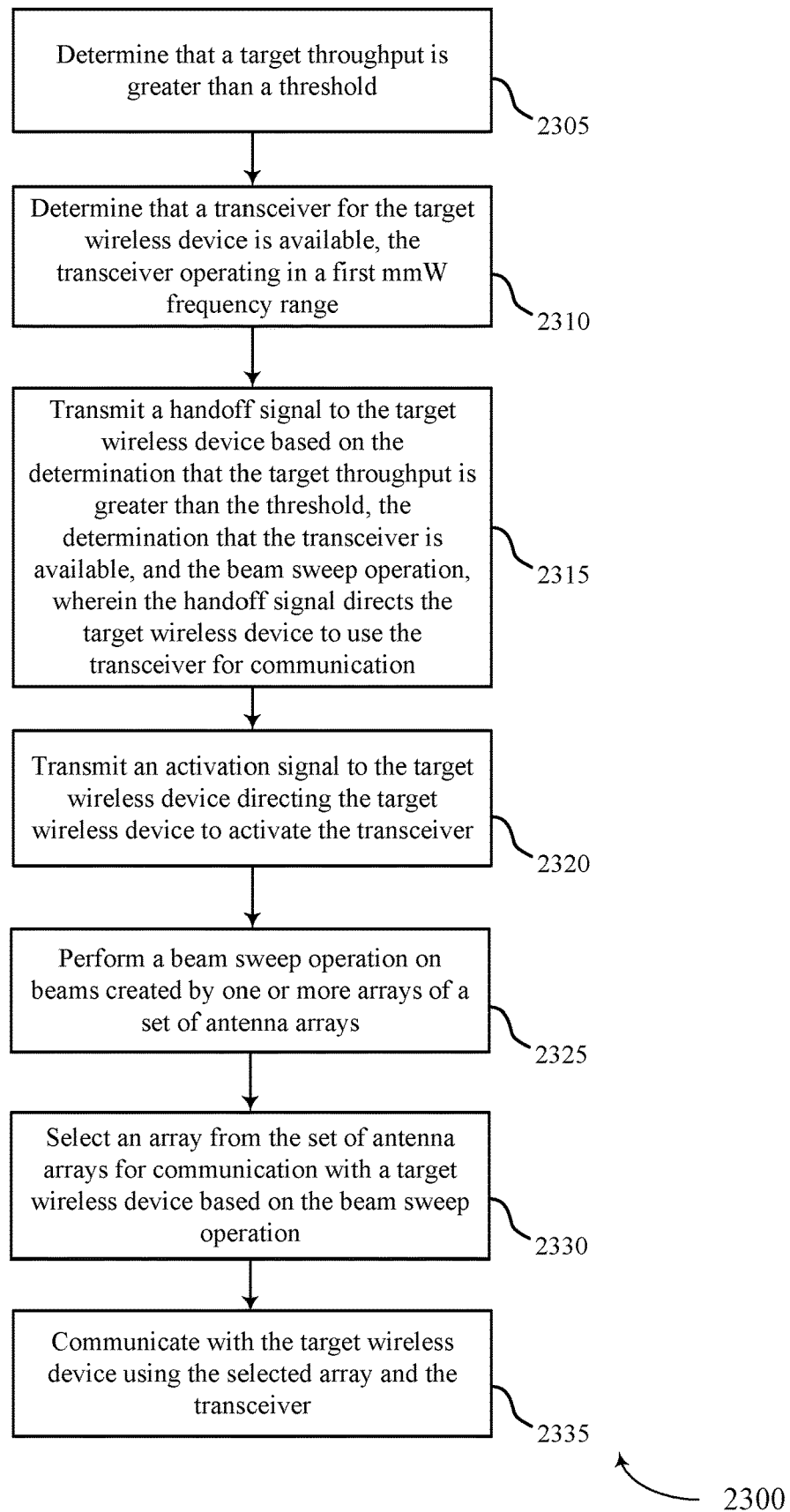
FIG. 23 illustrates a method for multiple array mmW transceiver operation in accordance with various aspects of the present disclosure.

FIG. 23 shows a flowchart illustrating a method 2300 for multiple array mmW transceiver operation in accordance with various aspects of the present disclosure. The operations of method 2300 may be implemented by a base station 105 or its components as described with reference to FIGS. 1,11, and 13-16. For example, the operations of method 2300 may be performed by the mmW transceiver controller 810 as described with reference to FIGS. 8-11. In some examples, a base station 105 may execute a set of codes to control the functional elements of the base station 105 to perform the functions described below. Additionally or alternatively, the base station 105 may perform aspects the functions described below using special-purpose hardware. The method 2300 may also incorporate aspects of methods 2100, and 2200 of FIGS. 21-22.

At block 2305, the base station 105 may determine that a target throughput is greater than a threshold as described herein with reference to FIGS. 13-16. In certain examples, the operations of block 2305 may be performed by the throughput monitor 1005 as described herein with reference to FIG. 10.

At block 2310, the base station 105 may determine that a transceiver for the target wireless device is available, the transceiver operating in a first mmW frequency range as described herein with reference to FIGS. 13-16. In certain examples, the operations of block 2310 may be performed by the transceiver availability module 1010 as described herein with reference to FIG. 10.

At block 2315, the base station 105 may transmit a handoff signal to the target wireless device based at least in part on the determination that the target throughput is greater than the threshold, the determination that the transceiver is available, and the beam sweep operation, wherein the handoff signal directs the target wireless device to use the transceiver for communication as described herein with reference to FIGS. 13-16. In certain examples, the operations of block 2315 may be performed by the transceiver handoff module 1015 as described herein with reference to FIG. 10.

At block 2320, the base station 105 may transmit an activation signal to the target wireless device directing the target wireless device to activate the transceiver as described herein with reference to FIGS. 13-16. In certain examples, the operations of block 2320 may be performed by the transceiver activation module 1020 as described herein with reference to FIG. 10.

At block 2325, the base station 105 may perform a beam sweep operation on beams created by one or more arrays of a plurality of antenna arrays as described herein with reference to FIGS. 13-16. In certain examples, the operations of block 2325 may be performed by the beam sweeper 905 as described herein with reference to FIG. 9.

At block 2330, the base station 105 may select an array from the plurality of antenna arrays for communication with a target wireless device based at least in part on the beam sweep operation as described herein with reference to FIGS. 13-16. In certain examples, the operations of block 2330 may be performed by the array selector 910 as described herein with reference to FIG. 9.

At block 2335, the base station 105 may communicate with the target wireless device using the selected array and the transceiver as described herein with reference to FIGS. 13-16. In certain examples, the operations of block 2335 may be performed by the transmitter 815 as described herein with reference to FIG. 8.

Figure 24:
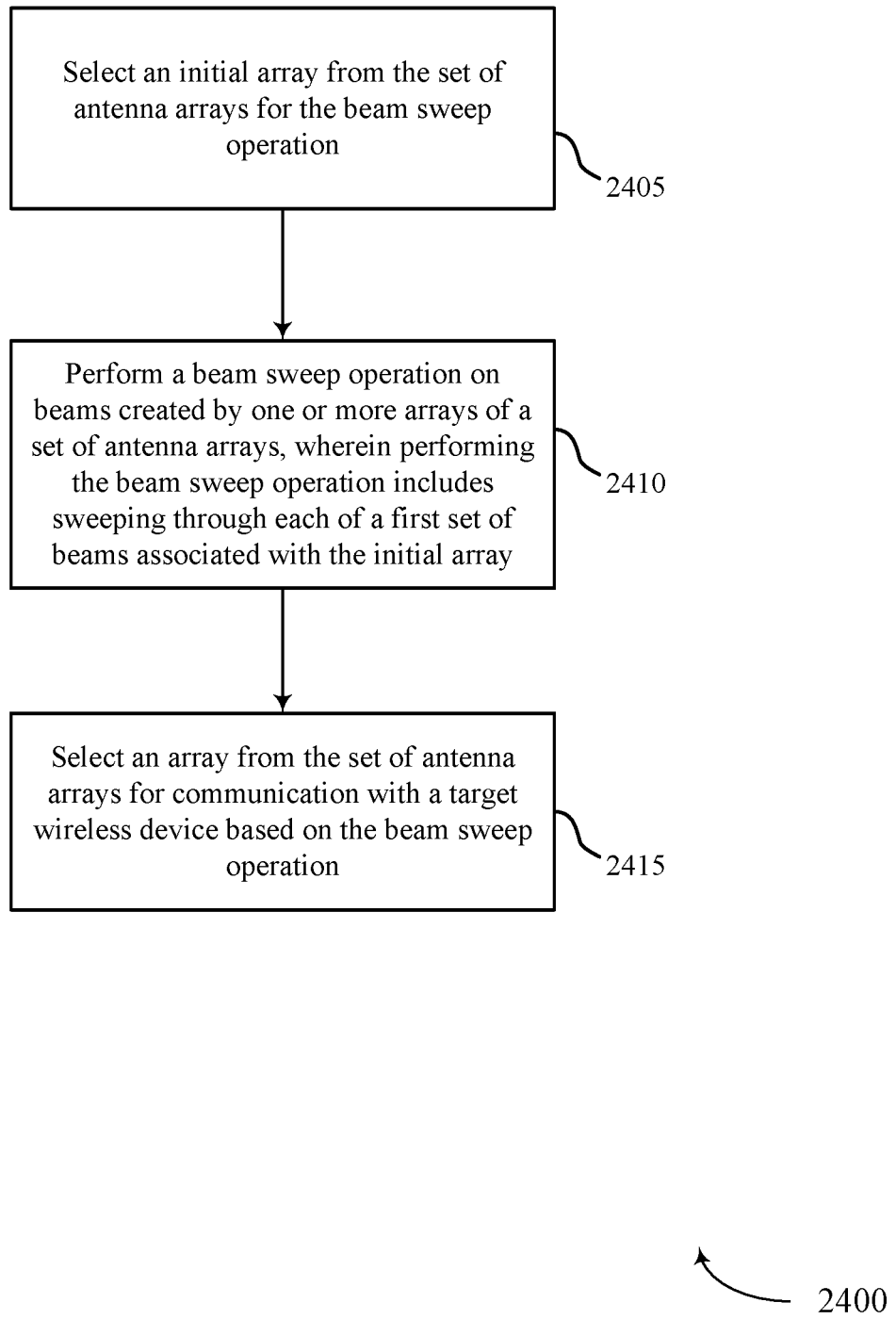
FIG. 24 illustrates a method for multiple array mmW transceiver operation in accordance with various aspects of the present disclosure.

FIG. 24 shows a flowchart illustrating a method 2400 for multiple array mmW transceiver operation in accordance with various aspects of the present disclosure. The operations of method 2400 may be implemented by a base station 105 or its components as described with reference to FIGS. 1,11, and 13-16. For example, the operations of method 2400 may be performed by the mmW transceiver controller 810 as described with reference to FIGS. 8-11. In some examples, a base station 105 may execute a set of codes to control the functional elements of the base station 105 to perform the functions described below. Additionally or alternatively, the base station 105 may perform aspects the functions described below using special-purpose hardware. The method 2400 may also incorporate aspects of methods 2100,2200, and 2300 of FIGS. 21-23.

At block 2405, the base station 105 may perform a beam sweep operation on beams created by one or more arrays of a plurality of antenna arrays as described herein with reference to FIGS. 13-16. In certain examples, the operations of block 2405 may be performed by the beam sweeper 905 as described herein with reference to FIG. 9.

At block 2410, the base station 105 may select an array from the plurality of antenna arrays for communication with a target wireless device based at least in part on the beam sweep operation as described herein with reference to FIGS. 13-16. In certain examples, the operations of block 2410 may be performed by the array selector 910 as described herein with reference to FIG. 9.

At block 2415, the base station 105 may select an initial array from the plurality of antenna arrays for the beam sweep operation, wherein performing the beam sweep operation comprises sweeping through each of a first plurality of beams associated with the initial array as described herein with reference to FIGS. 13-16. In certain examples, the operations of block 2415 may be performed by the beam sweeper 905 as described herein with reference to FIG. 9.

Thus, methods 2100, 2200, 2300, and 2400 may provide for multiple array mmW transceiver operation. It should be noted that methods 2100, 2200, 2300, and 2400 describe possible implementation, and that the operations and the steps may be rearranged or otherwise modified such that other implementations are possible. In some examples, aspects from two or more of the methods 2100, 2200, 2300, and 2400 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a millimeter wave (mmW) base station, comprising:
   determining that a target throughput is greater than a threshold;
   determining that a transceiver for a target wireless device is available, the transceiver operating in a first mmW frequency range;
   performing a beam sweep operation on beams created by two or more arrays of a plurality of antenna arrays;
   selecting an array from the plurality of antenna arrays for communication with the target wireless device based at least in part on the beam sweep operation; and
   transmitting a handoff signal to the target wireless device based at least in part on the determination that the target throughput is greater than the threshold, the determination that the transceiver is available, and the beam sweep operation, wherein the handoff signal directs the target wireless device to use the transceiver for communication.

2. The method of claim 1, further comprising:
   transmitting an activation signal to the target wireless device directing the target wireless device to activate the transceiver; and
   communicating with the target wireless device using the selected array and the transceiver.

3. The method of claim 1, further comprising:
   selecting an initial array from the plurality of antenna arrays for the beam sweep operation, wherein performing the beam sweep operation comprises sweeping through each of a first plurality of beams associated with the initial array.

4. The method of claim 1, further comprising:
   determining that a channel parameter associated with the array satisfies a threshold condition based at least in part on the beam sweep operation, wherein selecting the array is based at least in part on the determination.

5. The method of claim 1, wherein a first array of the plurality of antenna arrays is located at an opposite side of the mmW base station relative to a second array of the plurality of antenna arrays based at least in part on a spatial diversity configuration.

6. The method of claim 1, wherein at least one array of the plurality of antenna arrays is configured for operation in a mmW frequency range.

7. An apparatus for wireless communications at a millimeter wave (mmW) base station, comprising:
   a processor, memory coupled with the processor;
   and instructions stored in the memory and executable by the processor to cause the apparatus to:
      determine that a target throughput is greater than a threshold;
      determine that a transceiver for a target wireless device is available, the transceiver operating in a first mmW frequency range;
      perform a beam sweep operation on beams created by two or more arrays of a plurality of antenna arrays;
      select an array from the plurality of antenna arrays for communication with the target wireless device based at least in part on the beam sweep operation; and
      transmit a handoff signal to the target wireless device based at least in part on the determination that the target throughput is greater than the threshold, the determination that the transceiver is available, and the beam sweep operation, wherein the handoff signal directs the target wireless device to use the transceiver for communication.

8. The apparatus of claim 7, wherein the instructions are further executable by the processor to cause the apparatus to:
   transmit an activation signal to the target wireless device directing the target wireless device to activate the transceiver; and
   communicate with the target wireless device using the selected array and the transceiver.

9. The apparatus of claim 7, wherein the instructions are further executable by the processor to cause the apparatus to:
   select an initial array from the plurality of antenna arrays for the beam sweep operation, wherein performing the beam sweep operation comprises sweeping through each of a first plurality of beams associated with the initial array.

* * * * *